US009115247B2

(12) United States Patent
Shikano et al.

(10) Patent No.: US 9,115,247 B2
(45) Date of Patent: *Aug. 25, 2015

(54) POLYAMIDE, POLYAMIDE COMPOSITION, AND METHOD FOR PRODUCING POLYAMIDE

(71) Applicant: ASAHI KASEI CHEMICALS CORPORATION, Tokyo (JP)

(72) Inventors: Yasukazu Shikano, Tokyo (JP); Teruaki Sakuma, Tokyo (JP); Hiroki Matsui, Tokyo (JP); Masaaki Aramaki, Tokyo (JP); Yu Nitto, Tokyo (JP); Shinji Ieda, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 13/921,702

(22) Filed: Jun. 19, 2013

(65) Prior Publication Data
US 2013/0281655 A1 Oct. 24, 2013

Related U.S. Application Data

(63) Continuation of application No. 12/921,815, filed as application No. PCT/JP2009/054693 on Mar. 11, 2009, now Pat. No. 8,487,024.

(30) Foreign Application Priority Data

Mar. 12, 2008 (JP) ................................ 2008-062811
Mar. 24, 2008 (JP) ................................ 2008-075926
Oct. 10, 2008 (JP) ................................ 2008-264182

(51) Int. Cl.
*C08K 5/02* (2006.01)
*C08G 69/26* (2006.01)
*C08G 69/28* (2006.01)
*C08G 69/36* (2006.01)
*C08K 5/098* (2006.01)
*C08K 5/5313* (2006.01)

(52) U.S. Cl.
CPC .............. *C08G 69/265* (2013.01); *C08G 69/28* (2013.01); *C08G 69/36* (2013.01); *C08K 5/02* (2013.01); *C08K 5/098* (2013.01); *C08K 5/5313* (2013.01)

(58) Field of Classification Search
CPC ....... C08G 69/265; C08G 69/36; C08K 5/098
USPC ......................................................... 524/126
See application file for complete search history.

(56) References Cited

U.S. PATENT DOCUMENTS

| 4,471,088 A | 9/1984 | Chiba et al. |
| 4,698,083 A | 10/1987 | Shioura et al. |
| 4,759,784 A | 7/1988 | Shono et al. |
| 5,378,800 A | 1/1995 | Mok et al. |
| 5,780,534 A | 7/1998 | Kleiner et al. |
| 5,965,689 A | 10/1999 | Koning et al. |
| 6,121,388 A | 9/2000 | Umetsu et al. |
| 6,133,406 A | 10/2000 | Kosaka et al. |
| 6,172,178 B1 | 1/2001 | Koning et al. |
| 6,297,345 B1 | 10/2001 | Okushita et al. |
| 7,166,687 B2 | 1/2007 | Venderbosch et al. |
| 2002/0055589 A1 | 5/2002 | Matsuoka et al. |
| 2002/0077403 A1 | 6/2002 | Gittinger et al. |
| 2003/0045621 A1 | 3/2003 | Aramaki et al. |
| 2004/0049006 A1 | 3/2004 | Aramaki et al. |
| 2004/0068090 A1 | 4/2004 | Ogawa et al. |
| 2005/0113496 A1 | 5/2005 | Saga |
| 2006/0142443 A1 | 6/2006 | Aramaki et al. |
| 2006/0264542 A1 | 11/2006 | Schneider |
| 2009/0069478 A1 | 3/2009 | Seki et al. |
| 2009/0275682 A1 | 11/2009 | Furukawa et al. |
| 2009/0281210 A1 | 11/2009 | Aramaki |
| 2009/0302272 A1 | 12/2009 | Sakata et al. |
| 2010/0098946 A1 | 4/2010 | Tashiro et al. |
| 2010/0173139 A1 | 7/2010 | Miyoshi et al. |
| 2012/0165466 A1 | 6/2012 | Terada et al. |
| 2012/0178876 A1 | 7/2012 | Sasaki et al. |

FOREIGN PATENT DOCUMENTS

| CA | 2065640 | 10/1992 |
| EP | 0 699 708 | 3/1996 |
| JP | 58-002327 | 1/1983 |
| JP | 64-002131 | 1/1989 |
| JP | 03-059019 | 3/1991 |
| JP | 04-013300 | 1/1992 |
| JP | 04-032775 | 2/1992 |
| JP | 5-17413 | 1/1993 |
| JP | 5-125184 | 5/1993 |
| JP | 6-32980 | 2/1994 |
| JP | 6-503590 | 4/1994 |

(Continued)

OTHER PUBLICATIONS

Official Action issued with respect to U.S Appl. No. 12/921,815, mail date is Mar. 14, 2011.
Official Action issued with respect to U.S. Appl. No. 12/921,815, mail date is Oct. 14, 2011.
Final Official Action issued with respect to U.S. Appl. No. 12/921,815, mail date is May 1, 2012.
US Office Action issued with respect to U.S. Appl. No. 13/393,604, mail date is Jun. 13, 2014.
US Office Action issued with respect to U.S. Appl. No. 13/393,299, mail date is Jun. 16, 2014.
U.S. Office Action issued with respect to U.S. Appl. No. 13/393,604, mail date is Oct. 16, 2013.
European Search Report issued with respect to counterpart European Application No. 10815339.6, dated Nov. 29, 2012.
European Office Action issued with respect to counterpart European Application No. 10815339.6, dated Dec. 11, 2012.
U.S. Office Action issued with respect to related U.S. Appl. No. 13/393,299, dated Jun. 19, 2012.

(Continued)

*Primary Examiner* — Doris Lee
(74) *Attorney, Agent, or Firm* — Greenblum & Bernstein, P.L.C.

(57) ABSTRACT

The present invention relates to a polyamide obtainable by polymerizing an (a) dicarboxylic acid comprising at least 50 mol % of an alicyclic dicarboxylic acid and a (b) diamine comprising at least 50 mol % of a diamine having a substituent branched from a main chain.

6 Claims, No Drawings

(56) References Cited

FOREIGN PATENT DOCUMENTS

| | | |
|---|---|---|
| JP | 08-73720 | 3/1996 |
| JP | 8-503018 | 4/1996 |
| JP | 08-333511 | 12/1996 |
| JP | 9-12868 | 1/1997 |
| JP | 10-292113 | 11/1998 |
| JP | 11-512476 | 10/1999 |
| JP | 2000-336167 | 12/2000 |
| JP | 2001-514695 | 9/2001 |
| JP | 2002-097265 | 4/2002 |
| JP | 2002-309083 | 10/2002 |
| JP | 2003-2966 | 1/2003 |
| JP | 2003-119378 | 4/2003 |
| JP | 2003-138012 | 5/2003 |
| JP | 2003-292612 | 10/2003 |
| JP | 2003-292614 | 10/2003 |
| JP | 2004-75932 | 3/2004 |
| JP | 2004-149769 | 5/2004 |
| JP | 2004-211083 | 7/2004 |
| JP | 2004-075932 | 11/2004 |
| JP | 2006-273945 | 10/2006 |
| JP | 2006-522842 | 10/2006 |
| JP | 2007-291250 | 11/2007 |
| JP | 2008-38125 | 2/2008 |
| JP | 2008-221574 | 9/2008 |
| JP | 2010-111843 | 5/2010 |
| JP | 2011-225830 | 11/2011 |
| KR | 10-2002-0008152 | 1/2002 |
| WO | 92/08754 | 5/1992 |
| WO | 94/11418 | 5/1994 |
| WO | 97/11108 | 3/1997 |
| WO | 00/58248 | 10/2000 |
| WO | 02/48239 | 6/2002 |
| WO | 2006/112205 | 10/2006 |
| WO | 2008/149862 | 12/2008 |
| WO | 2009/113590 | 9/2009 |
| WO | 2011/030742 | 3/2011 |

OTHER PUBLICATIONS

Japanese Office action that issued with respect to corresponding Japanese Patent Application No. 2009-097477, mail date is Apr. 3, 2012.

Japanese Office action that issued with respect to corresponding Japanese Patent Application No. 2009-097479, mail date is Apr. 11, 2012.

Search report from International Application No. PCT/JP2010/065408, mail date is Dec. 14, 2011.

International Preliminary Report on Patentability and Written Opinion for International Application No. PCT/JP2010/065408, mail date is Apr. 11, 2012.

Search report from International Application No. PCT/JP2010/065284, mail date is Nov. 2, 2010.

International Preliminary Report on Patentability and Written Opinion for International Application No. PCT/JP2010/065284, mail date is Apr. 11, 2012.

International Search Report for PCT/JP2009/054693, mailed May 12, 2009.

International Preliminary Report on Patentability issued with respect to PCT/JP2009/054693, mailed Nov. 11, 2010.

Korean Office action that issued with respect to corresponding Korean Patent Application No. 09-5-2012-010464251, mail date is Feb. 22, 2012.

POLYAMIDE, POLYAMIDE COMPOSITION, AND METHOD FOR PRODUCING POLYAMIDE

CLAIM FOR PRIORITY

This application is a continuation of U.S. application Ser. No. 12/921,815, which is a National Phase of PCT/JP2009/054693 filed Mar. 11, 2009, and claims the priority benefit of Japanese Applications No. 2008-062811, filed Mar. 12, 2008, No. 2008-075926, filed Mar. 24, 2008, and No. 2008-264182, filed Oct. 10, 2008, the contents of each of which are expressly incorporated by reference in their entireties.

TECHNICAL FIELD

The present invention relates to a polyamide, a polyamide composition, and a method for producing polyamide.

BACKGROUND ART

Polyamides represented by polyamide 6 and polyamide 66 (hereinafter, sometimes referred to as "PA6" and "PA66", respectively) and the like have excellent molding processability, mechanical properties, or chemical resistance. Therefore, polyamides are widely used as a material for various parts, such as for automobiles, electric and electronic parts, industrial materials, and daily and household articles.

In the automotive industry, as an environmental measure, there is a need to lighten the weight of the automobile body by using a metal substitute in order to reduce exhaust gases. To respond to this need, polyamides are being increasingly used for exterior materials, interior materials and the like. Further, the level of the properties required for polyamide materials, such as heat resistance, strength, and appearance, is dramatically increasing. However, the temperature in the engine room is also tending to increase, so that the need to increase the heat resistance of polyamide materials is growing stronger.

Further, in the electric and electronics industry, such as household appliances, there is a need for increased heat resistance for polyamide materials which are capable of withstanding the increased melting point of the solder required for lead-free solder for using surface mounting technology (SMT).

PA6 and PA66 polyamides are unable to satisfy these requirements in terms of heat resistance, since their melting point is low.

To resolve the above-described problems with conventional polyamides such as PA6 and PA66, a high-melting-point polyamide has been proposed. Specifically, a polyamide formed from terephthalic acid and hexamethylenediamine (hereinafter, sometimes referred to as "PA6T") has been proposed.

However, PA6T is a high-melting-point polyamide having a melting point of about 370° C. Therefore, even if a molded product is obtained by melt kneading, pyrolysis of the polyamide is severe, which makes it difficult to obtain a molded product having sufficient properties.

To resolve the above-described problem with PA6T, a high-melting-point semi-aromatic polyamide (hereinafter, sometimes referred to as "6T-based copolyamide") and the like comprising terephthalic acid and a hexamethylenediamine as main components has been proposed. This high-melting-point semi-aromatic polyamide has a melting point lowered to about 220 to 340° C. by copolymerizing an aliphatic polyamide, such as PA6 and PA66, and the amorphous aromatic polyamide formed from hexamethylendiamine and isophthalic acid (hereinafter, sometimes referred to as "PA6I") and the like with PA6T.

As a 6T-based copolyamide, Patent Document 1 describes an aromatic polyamide (hereinafter, sometimes referred to as "PA6T/2 MPDT") which is formed from an aromatic dicarboxylic acid and an aliphatic diamine, in which the aliphatic diamine is a mixture of hexamethylenediamine and 2-methylpentamethylenediamine.

Further, in contrast to an semi-aromatic polyamide formed from an aromatic dicarboxylic acid and an aliphatic diamine, a high-melting-point aliphatic polyamide (hereinafter, sometimes referred to as "PA46") formed from adipic acid and tetramethylenediamine, and an alicyclic polyamide formed from an alicyclic dicarboxylic acid and an aliphatic diamine, and the like have been proposed.

Patent Documents 2 and 3 describe a semi-alicyclic polyamide (hereinafter, sometimes referred to as "PA6C copolyamide") which is formed from an alicyclic polyamide (hereinafter, sometimes referred to as "PA6C") formed from 1,4-cyclohexanedicarboxylic acid and hexamethylenediamine, and another polyamide.

Patent Document 2 describes that electric and electronic parts formed from a semi-alicyclic polyamide blended with 1 to 40% of 1,4-cyclohexanedicarboxylic acid as a dicarboxylic acid unit have improved solder heat resistance. Patent Document 3 describes that for automobile components, fluidity, toughness and the like are excellent.

In addition, Patent Document 4 describes that a polyamide formed from a dicarboxylic acid unit comprising 1,4-cyclohexanedicarboxylic acid and a diamine unit comprising 2-methyl-1,8-octanediamine has excellent light fastness, toughness, moldability, low weight, heat resistance and the like. Moreover, as a production method for such a polyamide, Patent Document 4 describes that a polyamide having a melting point of 311° C. is produced by reacting 1,4-cyclohexanedicarboxylic acid and 1,9-nonanediamine at 230° C. or less to produce a prepolymer, which is then subjected to solid phase polymerization at 230° C.

Further, Patent Document 5 describes that a polyamide using 1,4-cyclohexanedicarboxylic acid having a trans/cis ratio of from 50/50 to 97/3 as a raw material has excellent heat resistance, low water absorbance, and light fastness.

Patent Document 1: National Publication of International Patent Application No. 1994 (Hei 6)-503590
Patent Document 2: National Publication of International Patent Application No. 1999 (Hei 11)-512476
Patent Document 3: National Publication of International Patent Application No. 2001-514695
Patent Document 4: Japanese Patent Laid-Open No. 9-12868
Patent Document 5: WO 2002/048239 pamphlet

DISCLOSURE OF THE INVENTION

Problems to be Solved by the Invention

Although 6T-based copolyamides certainly have properties such as low water absorbance, high heat resistance, and high chemical resistance, their fluidity is low, and their moldability and the surface appearance of the molded product is insufficient. In addition, their toughness and light fastness is poor. Consequently, there is a need for improvement for applications which require a good molded product appearance, such as an exterior component, or which are exposed to sunlight and the like. Moreover, 6T-based copolyamides have a large specific weight, so that there is a need for improvement in terms of reducing weight as well.

Although the PA6/2 MPDt described in Patent Document 1 can partially improve on the problems of conventional PA6T copolymers, the level of improvement in terms of fluidity, moldability, toughness molded product surface appearance, and light fastness is insufficient.

Although PA46 has good heat resistance and moldability, PA46 suffers from the problems of high water absorbance. Further, the dimensional change and deterioration in mechanical properties due to water absorbance is very large. Thus, in some cases PA46 cannot satisfy the dimensional change requirement required for automobile applications.

The PA6C copolyamide described in Patent Documents 2 and 3 also suffers from problems such as having a high water absorbance and insufficient fluidity.

For the polyamides described in Patent Documents 4 and 5 too, the improvement in terms of toughness, rigidity, and fluidity is insufficient.

It is an object of the present invention to provide a polyamide having a high melting point, which has excellent heat resistance, fluidity, toughness, low water absorbance, and rigidity.

Means for Solving the Problems

As a result of continued intensive investigations into resolving the above-described problems, the present inventors discovered that a polyamide obtained by polymerizing, as the main constituent components, an alicyclic dicarboxylic acid and a diamine having a substituent branched from a main chain can resolve the above-described problems, thereby arriving at the present invention.

More specifically, the present invention is as follows.

(1) A polyamide obtainable by polymerizing (a) dicarboxylic acid comprising at least 50 mol % of an alicyclic dicarboxylic acid and (b) diamine comprising at least 50 mol % of a diamine having a substituent branched from a main chain.

(2) The polyamide according to (1), wherein the diamine having the substituent branched from the main chain is 2-methylpentamethylenediamine.

(3) The polyamide according to (1) or (2), wherein the alicyclic dicarboxylic acid is 1,4-cyclohexanedicarboxylic acid.

(4) The polyamide according to any one of (1) to (3), wherein the dicarboxylic acid further comprises an aliphatic dicarboxylic acid having 10 or more carbon atoms.

(5) The polyamide according to any one of (1) to (4), which is obtainable by further copolymerizing with a (c) lactam and/or aminocarboxylic acid.

(6) The polyamide according to any one of (1) to (5), which has a melting point of from 270 to 350° C.

(7) The polyamide according to any one of (1) to (6), which has a trans isomer ratio of from 50 to 85%.

(8) The polyamide according to any one of (1) to (7), which has a b value of 0 or less.

(9) A polyamide composition comprising:
  (A) a polyamide according to any one of (1) to (8); and
  (B) an inorganic filler.

(10) A polyamide composition comprising:
  (A) a polyamide according to any one of (1) to (8); and
  (C) a copper compound and a metal halide.

(11) A polyamide composition comprising:
  a polyamide according to any one of (1) to (8); and
  (D) a halogen-based flame retardant.

(12) A polyamide composition comprising:
  (A) a polyamide according to any one of (1) to (8); and
  (E) a phosphinate and/or diphosphinate.

(13) A polyamide composition comprising:
  (A) a polyamide according to any one of (1) to (8); and
  (F) a stabilizer.

(14) An automobile component, comprising a polyamide composition according to any one of (9) to (13).

(15) The automobile component according to (14), which is an automobile air intake system component or an automobile cooling system component.

(16) A method for producing a polyamide, comprising a step of polymerizing an (a) dicarboxylic acid comprising at least 50 mol % of an alicyclic dicarboxylic acid and a (b) diamine comprising at least 50 mol % of an aliphatic diamine having a substituent branched from a main chain.

(17) The method for producing the polyamide according to (16), wherein the polymerization is carried out while maintaining a trans isomer ratio at from 50 to 80%.

(18) A polyamide obtainable by the method of (16) or (17).

Advantages of the Invention

According to the present invention, a high-melting-point polyamide can be provided, which has excellent heat resistance, fluidity, toughness, low water absorbance, and rigidity.

BEST MODE FOR CARRYING OUT THE INVENTION

A best mode for carrying out the present invention (hereinafter referred to as "the present embodiment") is described below in more detail. However, the present invention is not limited to the following embodiment, and can be variously modified within the scope of the intent of the invention.

Polyamide

The polyamide according to the present embodiment is a polyamide obtained by polymerizing the following (a) and (b):
  an (a) dicarboxylic acid comprising at least 50 mol % of an alicyclic dicarboxylic acid, and
  a (b) diamine comprising at least 50 mol % of a diamine having a substituent branched from a main chain.

In the present embodiment, "polyamide" means a polymer which has an amide (—NHCO—) bond in a main chain.

(a) Dicarboxylic acid

The (a) dicarboxylic acid used in the present embodiment comprises at least 50 mol % of an alicyclic dicarboxylic acid.

By comprising at least 50 mol % of the alicyclic dicarboxylic acid as the (a) dicarboxylic acid, the polyamide can be obtained which simultaneously satisfies heat resistance, fluidity, toughness, low water absorbance, rigidity and the like.

Examples of the (a-1) alicyclic dicarboxylic acid (also referred to as cycloaliphatic dicarboxylic acid) include alicyclic dicarboxylic acids having an alicyclic structure with 3 to 10 carbon atoms, and preferably 5 to 10 carbon atoms, such as 1,4-cyclohexanedicarboxylic acid, 1,3-cyclohexanedicarboxylic acid, and 1,3-cyclopentanedicarboxylic acid. The alicyclic dicarboxylic acid may optionally have a substituent.

In the present embodiment, examples of the substituent include an alkyl group having 1 to 4 carbon atoms, such as a methyl group, an ethyl group, a n-propyl group, an isopropyl group, a n-butyl group, an isobutyl group, and a tert-butyl group.

From perspectives such as heat resistance, fluidity, and rigidity, 1,4-cyclohexanedicarboxylic acid is preferred as the alicyclic dicarboxylic acid.

As the alicyclic dicarboxylic acid, one kind may be used, or two or more kinds may be used in combination.

Alicyclic dicarboxylic acids have trans and cis geometric isomers.

The alicyclic dicarboxylic acid used as a raw material monomer may be either a trans or a cis isomer. The alicyclic dicarboxylic acid may also be used as a mixture of trans and cis isomers in various ratios.

Since alicyclic dicarboxylic acids isomerize in a fixed ratio at high temperatures, and the cis isomer has a higher water solubility than the trans isomer in an equivalent amount of salt with a diamine, as the raw material monomer, a trans isomer/cis isomer ratio is, based on molar ratio, preferably 50/50 to 0/100, more preferably 40/60 to 10/90, and still more preferably 35/65 to 15/85.

The alicyclic dicarboxylic acid trans isomer/cis isomer ratio (molar ratio) can be determined by liquid chromatography (HPLC) or NMR.

Examples of an (a-2) dicarboxylic acid other than the alicyclic dicarboxylic acid in the (a) dicarboxylic acid used in the present embodiment include aliphatic dicarboxylic acids and aromatic dicarboxylic acids.

Examples of the aliphatic dicarboxylic acid include straight-chain or branched saturated aliphatic dicarboxylic acids having 3 to 20 carbon atoms, such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyl adipic acid, pimelic acid, suberic acid, azelaic acid, sebacic acid, dodecanedioic acid, tetradecanedioic acid, hexadecanedioic acid, octadecanedioic acid, eicosane diacid, and diglycolic acid.

Examples of the aromatic dicarboxylic acid include aromatic dicarboxylic acids, which are unsubstituted or substituted with various substituents, having 8 to 20 carbon atoms, such as terephthalic acid, isophthalic acid, naphthalene dicarboxylic acid, 2-chloroterephthalic acid, 2-methylterephthalic acid, 5-methylisophthalic acid, and 5-sodium sulfoisophthalic acid.

Examples of the various substituents include an alkyl group having 1 to 6 carbon atoms, an aryl group having 6 to 12 carbon atoms, an arylalkyl group having 7 to 20 carbon atoms, a halogen group such as a chloro group or a bromo group, an alkylsilyl group having 3 to 10 carbon atoms, and a sulfonic acid group or salt thereof, such as a sodium salt.

As the dicarboxylic acid other than the alicyclic dicarboxylic acid, from perspectives such as heat resistance, fluidity, toughness, low water absorbance, and rigidity, an aliphatic dicarboxylic acid is preferred, and more preferred is an aliphatic dicarboxylic acid having 6 or more carbon atoms.

Of these, from perspectives such as heat resistance and low water absorbance, an aliphatic dicarboxylic acid having 10 or more carbon atoms is preferred.

Examples of the aliphatic dicarboxylic acids having 10 or more carbon atoms include sebacic acid, dodecanedioic acid, tetradecanedioic acid, hexadecanedioic acid, octadecanedioic acid, and eicosanedioic acid.

Of these, from perspectives such as heat resistance, sebacic acid and dodecanedioic acid are preferred.

As the dicarboxylic acid other than the alicyclic dicarboxylic acid, one kind may be used, or two or more kinds may be used in combination.

To the extent that the object of the present embodiment is not harmed, the (a) dicarboxylic acid may further include a trivalent or higher polyvalent carboxylic acid, such as trimellitic acid, trimesic acid, and pyromellitic acid.

As the polyvalent carboxylic acid, one kind may be used, or two or more kinds may be used in combination.

A ratio of the (a-1) alicyclic dicarboxylic acid in the (a) dicarboxylic acid is at least 50 mol %. The ratio of the alicyclic dicarboxylic acid is 50 to 100 mol %, and preferably 60 to 100%. By setting the ratio of the alicyclic dicarboxylic acid to be at least 50 mol %, the polyamide can be obtained which simultaneously satisfies heat resistance, fluidity, toughness, low water absorbance, rigidity and the like.

A ratio of the (a-2) dicarboxylic acid other than the alicyclic dicarboxylic acid in the (a) dicarboxylic acid is 0 to 50 mol %, and preferably 0 to 40%.

It is preferred that the (a-1) alicyclic dicarboxylic acid is 50.0 to 99.9 mol % and the (a-2) aliphatic dicarboxylic acid having 10 or more carbon atoms is 0.1 to 50.0 mol %. It is more preferred that the (a-1) alicyclic dicarboxylic acid is 60.0 to 90.0 mol % and the (a-2) aliphatic dicarboxylic acid having 10 or more carbon atoms is 10.0 to 40.0 mol %. It is still more preferred that the (a-1) alicyclic dicarboxylic acid is 70.0 to 85.0 mol % and the (a-2) aliphatic dicarboxylic acid having 10 or more carbon atoms is 15.0 to 30.0 mol %.

In the present embodiment, the (a) dicarboxylic acid is not limited to the compounds described above as dicarboxylic acids. The dicarboxylic acid may be a compound equivalent to those described above.

Examples of compounds equivalent to those described above are not especially limited, as long as such compound can have the same dicarboxylic acid structure as a dicarboxylic acid structure derived from the above-described dicarboxylic acids. Examples thereof include anhydrides and halides of the dicarboxylic acid.

(b) Diamine

The (b) diamine used in the present embodiment comprises at least 50 mol % of a diamine having a substituent branched from a main chain.

By comprising at least 50 mol % of the diamine having the substituent branched from the main chain in the (b) diamine, the polyamide can be obtained which simultaneously satisfies fluidity, toughness, rigidity and the like.

Examples of the substituent branched from the main chain include an alkyl group having 1 to 4 carbon atoms, such as a methyl group, an ethyl group, a n-propyl group, an isopropyl group, a n-butyl group, an isobutyl group, and a tert-butyl group.

Examples of the (b-1) diamine having the substituent branched from the main chain include branched saturated aliphatic diamines having 3 to 20 carbon atoms, such as 2-methylpentamethylenediamine (also referred to as 2-methyl-1,5-diaminopentane), 2,2,4-trimethylhexamethylenediamine, 2,4,4-trimethylhexamethylenediamine, 2-methyloctamethylenediamine, and 2,4-dimethyloctamethylenediamine.

From perspectives such as rigidity, the diamine having the substituent branched from the main chain is preferably 2-methylpentamethylenediamine.

As the diamine having the substituent branched from the main chain, one kind may be used, or two or more kinds may be used in combination.

Examples of a (b-2) diamine other than the diamine having the substituent branched from the main chain in the (b) diamine used in the present embodiment include aliphatic diamines, alicyclic diamines, and aromatic diamines.

Examples of the aliphatic diamines include straight-chain saturated aliphatic diamines having 2 to 20 carbon atoms, such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine.

Examples of the alicyclic diamines (also referred to as cycloaliphatic diamines) include 1,4-cyclohexanediamine, 1,3-cyclohexanediamine, and 1,3-cyclopentanediamine.

Examples of aromatic diamines include meta-xylylenediamine.

From perspectives such as heat resistance, fluidity, toughness, low water absorbance, and rigidity, an aliphatic diamine and an alicyclic diamine are preferred as the diamine other than the diamine having the substituent branched from the main chain. More preferred is a straight-chain saturated aliphatic diamine having 4 to 13 carbon atoms, still more preferred is a straight-chain saturated aliphatic diamine having 6 to 10 carbon atoms, and even still more preferred is hexamethylenediamine.

As the diamine other than the diamine having the substituent branched from the main chain, one kind may be used, or two or more kinds may be used in combination.

To the extent that the object of the present embodiment is not harmed, the (b) diamine may further include a trivalent or higher polyvalent aliphatic amine, such as bishexamethylenetriamine.

As the polyvalent aliphatic amine, one kind may be used, or two or more kinds may be used in combination.

A ratio of the (b-1) diamine having the substituent branched from the main chain in the (b) diamine is at least 50 mol %. The ratio of the diamine having the substituent branched from the main chain is 50 to 100 mol %, and preferably 60 to 100%. By setting the ratio of the diamine having the substituent branched from the main chain to be at least 50 mol %, the polyamide can be obtained which has excellent fluidity, toughness, rigidity and the like.

A ratio of the (b-2) diamine other than the diamine having the substituent branched from the main chain in the (b) diamine is 0 to 50 mol %, and preferably 0 to 40%.

An added amount of the (a) dicarboxylic acid is preferably about the same molar amount as an added amount of the (b) diamine. Considering escape out of the (b) diamine reaction system during the polymerization reaction, based on an (a) dicarboxylic acid molar amount of 1.00, the total (b) diamine molar amount is preferably 0.90 to 1.20, more preferably 0.95 to 1.10, and still more preferably 0.98 to 1.05.

(c) Lactam and/or Aminocarboxylic Acid

From the perspective of toughness, it is preferred to obtain the polyamide according to the present embodiment by further copolymerizing with a (c) lactam and/or aminocarboxylic acid.

The term "(c) lactam and/or aminocarboxylic acid" used in the present embodiment means a lactam and/or aminocarboxylic acid capable of polycondensation.

The lactam and/or aminocarboxylic acid is preferably a lactam and/or aminocarboxylic acid having 4 to 14 carbon atoms, and more preferably a lactam and/or aminocarboxylic acid having 6 to 12 carbon atoms.

Examples of the lactam include butyrolactam, pivalolactam, ε-caprolactam, capryolactam, enantholactam, undecanonelactam, and laurolactam (dodecanolactam).

Of these, from the perspective of toughness, ε-caprolactam, laurolactam and the like are preferred, and ε-caprolactam is more preferred.

Examples of the aminocarboxylic acid include ω-aminocarboxylic acid and α,ω-aminocarboxylic acid, which are compounds obtained by opening the ring of the above-described lactams.

As the aminocarboxylic acid, a straight-chain or branched saturated aliphatic carboxylic acid having 4 to 14 carbon atoms substituted at the ω position with an amino group is preferred. Examples thereof include 6-aminocaproic acid, 11-aminoundecanoic acid, and 12-aminododecanoic acid. Further examples of the aminocarboxylic acid include para-aminomethylbenzoic acid.

As the lactam and/or aminocarboxylic acid, one kind may be used, or two or more kinds may be used in combination.

An added amount of the (c) lactam and/or aminocarboxylic acid is preferably 0 to 20 mol % based on a total molar amount of the respective monomers of (a), (b), and (c).

When polymerizing the polyamide from the (a) dicarboxylic acid and the (b) diamine, a known end-capping agent can be added for molecular weight regulation.

Examples of the end-capping agent include monocarboxylic acids, monoamines, acid anhydrides such as phthalic anhydride, monoisocyanates, monoacid halides, monoesters, and monoalcohols. From the perspective of thermal stability of the polyamide, monocarboxylic acids and monoamines are preferred.

As the end-capping agent, one kind may be used, or two or more kinds may be used in combination.

Examples of monocarboxylic acids which can be used as the end-capping agent are not especially limited, as long as the monocarboxylic acid is reactive with an amino group. Examples thereof include: aliphatic monocarboxylic acids such as formic acid, acetic acid, propionic acid, butyric acid, valeric acid, caproic acid, caprylic acid, lauric acid, tridecyl acid, myristic acid, pulmitic acid, stearic acid, pivalic acid, and isobutyric acid; alicyclic monocarboxylic acids such as cyclohexane carboxylic acid; and aromatic monocarboxylic acids such as benzoic acid, toluic acid, α-naphthalene carboxylic acid, β-naphthalene carboxylic acid, methylnaphthalene carboxylic acid, and phenylacetic acid.

As the monocarboxylic acid, one kind may be used, or two or more kinds may be used in combination.

Examples of monoamines which can be used as the end-capping agent are not especially limited, as long as the monoamine is reactive with a carboxyl group. Examples thereof include: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

As the monoamine, one kind may be used, or two or more kinds may be used in combination.

Preferred combinations of the (a) dicarboxylic acid and (b) diamine include, but are not limited to, (a-1) at least 50 mol % or more of alicyclic dicarboxylic acid and (b-1) at least 50 mol % or more of 2-methylpentamethylenediamine. More preferred is (a-1) at least 50 mol % or more of 1,4-cyclohexanedicarboxylic acid and (b-1) at least 50 mol % or more of 2-methylpentamethylenediamine.

By polymerizing these combinations as the polyamide components, a high-melting-point polyamide can be obtained which simultaneously satisfies heat resistance, fluidity, toughness, low water absorbance, and rigidity.

In the polyamide according to the present embodiment, the alicyclic dicarboxylic acid structure exists as cis and trans geometric isomers.

The trans isomer ratio of the alicyclic dicarboxylic acid structure in the polyamide represents the ratio of trans isomers based on the whole alicyclic dicarboxylic acid in the polyamide. The trans isomer ratio is preferably 50 to 85 mol %, more preferably 50 to 80 mol %, and still more preferably 60 to 80 mol %.

As the (a-1) alicyclic dicarboxylic acid, it is preferred to use an alicyclic dicarboxylic acid having a trans/cis ratio (molar ratio) of 50/50 to 0/100. However, as the polyamide obtained by polymerization of the (a) dicarboxylic acid and (b) diamine, the trans isomer ratio is preferably 50 to 85 mol %.

By setting the trans isomer ratio in the above-described range, in addition the characteristics of a high melting point and excellent toughness and rigidity, the polyamide has qualities which simultaneously satisfy rigidity during heating due to a high glass transition temperature, fluidity, which is generally a quality that conflicts with heat resistance, a high crystallinity, and low water absorbance.

These characteristics of the polyamide are especially pronounced for a polyamide formed from the combination of (a) at least 50 mol % or more of 1,4-cyclohexanedicarboxylic acid and (b) at least 50 mol % or more of 2-methylpentamethylenediamine, and which has a trans isomer ratio of from 50 to 85 mol %.

In the present embodiment, the trans isomer ratio can be measured by the method described in the below examples.

A method for producing the polyamide according to the present embodiment is not especially limited, as long as it is a polyamide production method which comprises a step of polymerizing an (a) dicarboxylic acid comprising at least 50 mol % of an alicyclic dicarboxylic acid and a (b) diamine comprising at least 50 mol % of a diamine having a substituent branched from a main chain.

It is preferred that a method for producing the polyamide further comprises a step of increasing the degree of polymerization of the polyamide.

As illustrated by the following production method examples, there are various methods for producing the polyamide.

1) Heating an aqueous solution or an aqueous suspension of the dicarboxylic acid and the diamine, or an aqueous solution or an aqueous suspension of a mixture of the dicarboxylic acid, the diamine salt, and another component (hereinafter, abbreviated as "that mixture" in the following paragraphs), and polymerizing while maintaining the melt state (hereinafter, sometimes abbreviated as "hot melt polymerization").

2) Increasing the degree of polymerization while maintaining a solid state at a temperature at or below the melting point of the polyamide obtained by hot melt polymerization (hereinafter, sometimes abbreviated as "hot melt polymerization/solid phase polymerization")

3) Heating an aqueous solution or an aqueous suspension of the dicarboxylic acid and the diamine or a mixture thereof, and increasing the degree of polymerization by further re-melting the precipitated prepolymer with an extruder such as a kneader (hereinafter, sometimes abbreviated as "prepolymer/extrusion polymerization").

4) Heating an aqueous solution or an aqueous suspension of the dicarboxylic acid and the diamine or a mixture thereof, and increasing the degree of polymerization while maintaining the precipitated prepolymer in a solid state at a temperature at or below the melting point of the polyamide (hereinafter, sometimes abbreviated as "prepolymer/solid phase polymerization").

5) Polymerizing the dicarboxylic acid and the diamine, or a mixture thereof, while maintaining a solid state (hereinafter, sometimes abbreviated as "solid phase polymerization").

6) A "solution method" in which polymerization is carried out using a dicarboxylic acid halide equivalent to the dicarboxylic acid and the diamine.

In the polyamide production method, it is preferred to carry out polymerization while maintaining the trans isomer ratio of the alicyclic dicarboxylic acid at from 50 to 85%. From the perspective of fluidity of the polyamide, it is more preferred to carry out polymerization while maintaining at from 50 to 80%

By maintaining the trans isomer ratio in the above-described range, especially at 80% or less, a high-melting-point polyamide having excellent color tone and tensile elongation can be obtained.

In the polyamide production method, to increase the melting point of the polyamide by increasing the degree of polymerization, it is necessary to increase the heating temperature and/or lengthen the heating time. However, in such a case, the polyamide may color due to the heating and the tensile elongation may deteriorate due to thermal degradation. Further, a rate of increase of the molecular weight may also dramatically deteriorate.

To prevent deterioration in the coloration of the polyamide and deterioration in tensile elongation due to thermal degradation, the polymerization is preferably carried out while maintaining the trans isomer ratio of the alicyclic dicarboxylic acid at 80% or less.

Since it is easy to maintain the trans isomer ratio at 80% or less, and since the obtained polyamide has excellent color tone, it is preferred to produce the polyamide by 1) hot melt polymerization and 2) hot melt polymerization/solid phase polymerization.

In the polyamide production method, the polymerization mode may be either a batch method or a continuous method.

The polymerization apparatus is not especially limited. Examples of the polymerization apparatus include known apparatuses, such as an autoclave type reactor, a tumbler type reactor, and an extruder type reactor such as a kneader.

The polyamide production method is not especially limited. For example, the polyamide can be produced by the batch hot melt polymerization method described below.

Batch hot melt polymerization may be carried out by, for example, with water as a solvent, concentrating an approximately 40 to 60 mass % solution containing the polyamide components ((a) dicarboxylic acid, (b) diamine, and optionally (c) lactam and/or aminocarboxylic acid) in a concentration tank operated at a temperature of 110 to 180° C. and a pressure of about 0.035 to 0.6 MPa (gauge pressure) to about 65 to 90 mass % to obtain a concentrated solution. Then, this concentrated solution is transferred to an autoclave, and heating is continued until the pressure in the vessel reaches 1.5 to 5.0 MPa (gauge pressure). Subsequently, the pressure is kept at 1.5 to 5.0 MPa (gauge pressure) while extracting water and/or the gas component. When the temperature reaches about 250 to 350° C., the pressure is reduced to atmospheric pressure (gauge pressure of 0 MPa). After reducing the pressure to atmospheric pressure, the water produced as a byproduct can be effectively removed by reducing the pressure as necessary. Then, the pressure is increased with an inert gas such as nitrogen, and a polyamide melt product is extruded as a strand. This strand is cooled and cut to obtain a pellet.

The polyamide production method is not especially limited. For example, the polyamide can be produced by the continuous hot melt polymerization method described below.

Continuous hot melt polymerization can be carried out by, for example, with water as a solvent, pre-heating an approximately 40 to 60 mass % solution containing the polyamide components in the vessel of a preliminary apparatus to a temperature of 40 to 100° C. Then, the pre-heated solution is transferred to a concentration tank/reactor, and concentrated to about 70 to 90% at a pressure of about 0.1 to 0.5 MPa (gauge pressure) and a temperature of about 200 to 270° C. to obtain a concentrated solution. This concentrated solution is discharged into a flusher having a temperature maintained at about 200 to 350° C. Subsequently, the pressure is reduced to atmospheric pressure (gauge pressure of 0 MPa). After reducing the pressure to atmospheric pressure, the pressure is reduced as necessary. Then, a polyamide melt product is extruded as a strand. This strand is cooled and cut to obtain a pellet.

A molecular weight of the polyamide in the present embodiment is determined by using relative viscosity $\eta r$ at 25° C. as an index.

From the perspectives of mechanical properties such as toughness and rigidity, and of moldability, the polyamide according to the present embodiment preferably has a molecular weight at a relative viscosity $\eta r$ at 25° C. at a 1% concentration in 98% sulfuric acid as measured based on JIS-K6810 of 1.5 to 7.0, more preferably 1.7 to 6.0, and still more preferably 1.9 to 5.5.

Measurement of the relative viscosity at 25° C. can be carried out based on JIS-K6810 as described in the below examples.

From the perspective of heat resistance, the polyamide according to the present embodiment preferably has a melting point, referred to as Tm2, of from 270 to 350° C. The melting point Tm2 is preferably 270° C. or more, more preferably 275° C. or more, and still more preferably 280° C. or more. Further, the melting point Tm2 is preferably 350° C. or less, more preferably 340° C. or less, and still more preferably 330° C. or less.

By setting the polyamide melting point Tm2 to be 270° C. or more, a polyamide having excellent heat resistance can be obtained. By setting the polyamide melting point Tm2 to be 350° C. or less, pyrolysis of the polyamide during melt processing such as extrusion and molding can be suppressed.

From the perspective of heat resistance, a heat of fusion $\Delta H$ of the polyamide according to the present embodiment is preferably 10 or more J/g, more preferably 14 or more J/g, still more preferably 18 or more J/g, and even still more preferably 20 or more J/g.

Measurement of the melting point (Tm1 or Tm2) and the heat of fusion $\Delta H$ of the polyamide according to the present embodiment can be carried out based on JIS-K7121 as described in the below examples.

Examples of the melting point and heat of fusion measurement apparatus include the Diamond-DSC, manufactured by PERKIN-ELMER Inc.

The polyamide according to the present embodiment preferably has a glass transition temperature Tg of from 90 to 170° C. The glass transition temperature is preferably 90° C. or more, more preferably 100° C. or more, and still more preferably 110° C. or more. Further, the glass transition temperature is preferably 170° C. or less, more preferably 165° C. or less, and still more preferably 160° C. or less.

By setting the polyamide glass transition temperature to be 90° C. or more, a polyamide having excellent heat resistance and chemical resistance can be obtained. By setting the polyamide glass transition temperature to be 170° C. or less, a molded product having a good appearance can be obtained.

Measurement of the glass transition temperature can be carried out based on JIS-K7121 as described in the below examples.

Examples of the glass transition temperature measurement apparatus include the Diamond-DSC, manufactured by PERKIN-ELMER Inc.

The polyamide according to the present embodiment preferably has a melt shear viscosity $\eta s$ of 20 to 140 Pa·s, more preferably 25 to 115 Pa·s, and still more preferably 30 to 90 Pa·s.

The melt shear viscosity can be measured based on the method described in the below examples.

By setting the melt shear viscosity to be in the above-described range, a polyamide having excellent fluidity can be obtained.

The polyamide according to the present embodiment preferably has a tensile strength of 70 MPa or more, more preferably 80 MPa or more, and still more preferably 85 MPa or more.

Measurement of the tensile strength can be carried out based on ASTM D638 as described in the below examples.

By setting the tensile strength to be 70 MPa or more, a polyamide having excellent rigidity can be obtained.

The polyamide according to the present embodiment preferably has a tensile elongation of 3.0% or more, more preferably 5.0% or more, and still more preferably 7.0% or more.

Measurement of the tensile elongation can be carried out based on ASTM D638 as described in the below examples.

By setting the tensile elongation to be 3.0% or more, a polyamide having excellent toughness can be obtained.

The polyamide according to the present embodiment preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

The polyamide according to the present embodiment preferably has a color tone b value of 0 or less, and more preferably −2 or less.

The color tone b value can be measured by the method described in the below examples.

By setting the color tone b value to be 0 or less, a polyamide composition having excellent resistance to heat discoloration can be obtained.

(B) Inorganic Filler

The polyamide composition according to the present embodiment is a polyamide composition comprising the above-described (A) polyamide and a (B) inorganic filler.

As a polyamide composition, by comprising the (B) inorganic filler, a polyamide composition can be obtained having especially excellent rigidity while satisfying heat resistance, fluidity, toughness, and low water absorbance, without harming the polyamide qualities of having excellent heat resistance, fluidity, toughness, low water absorbance, rigidity and the like.

Polyamides such as PA6 and PA66 cannot satisfy these requirements in terms of heat resistance, since their melting point is low.

The polyamide composition also has excellent light fastness and color tone as a polyamide composition, despite comprising the inorganic filler.

The (B) inorganic filler used in the present embodiment is not especially limited. Examples thereof include a glass fiber, a carbon fiber, a calcium silicate fiber, a potassium titanate fiber, an aluminum borate fiber, glass flakes, talc, kaolin, mica, hydrotalcite, calcium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, Ketchen black, acetylene black, furnace black, carbon nanotubes, graphite, brass, copper, silver, aluminum, nickel, iron, calcium fluoride, isinglass, montmorillonite, expandable fluorine mica, and an apatite.

As the inorganic filler, one kind may be used, or two or more kinds may be used in combination.

From perspectives such as rigidity and strength, a glass fiber, a carbon fiber, glass flakes, talc, kaolin, mica, calcium carbonate, calcium monohydrogen phosphate, wollastonite, silica, carbon nanotubes, graphite, calcium fluoride, montmorillonite, expandable fluorine mica, and an apatite are preferred as the (B) inorganic filler.

More preferably, the (B) inorganic filler is a glass fiber or a carbon fiber. Among glass fibers and carbon fibers, those having a number average fiber diameter of 3 to 30 μm, a weight average fiber length of 100 to 750 μm, and an aspect ratio (L/D) of number average fiber length to number average fiber diameter of from 10 to 100 may be preferably used from the perspective of exhibiting high properties.

Further, wollastonite is more preferred as the (B) inorganic filler. Among wollastonites, a wollastonite having a number average fiber diameter of 3 to 30 μm, a weight average fiber length of 10 to 500 μm, and an aspect ratio (L/D) of from 3 to 100 may be more preferably used.

In addition, as the (B) inorganic filler, talc, mica, kaolin, silicon nitride and the like are more preferred. Even among talc, mica, kaolin, silicon nitride and the like, those having a number average fiber diameter of 0.1 to 3 μm may be more preferably used.

Measurement of the number average fiber diameter and the weight average fiber length of the inorganic filler may be determined by dissolving a molded product of the polyamide composition in a solvent in which the polyamide dissolves, such as formic acid, arbitrarily selecting 100 or more, for example, of the inorganic filler particles from the obtained insoluble component, and observing these selected particles with an optical microscope, a scanning electron microscope or the like.

A method for producing the polyamide composition according to the present embodiment is not especially limited, as long as it is a method which mixes the above-described (A) polyamide and (B) inorganic filler.

Examples of the method for mixing the polyamide and the inorganic filler include mixing the polyamide and the inorganic filler using a Henschel mixer or the like, then feeding the resultant mixture to a melt kneader and kneading, and blending the inorganic filler in the polyamide turned into a melt state by a single-screw or twin-screw extruder from a side feeder.

The method for feeding the components constituting the polyamide composition may be carried out by feeding all of the constituent components all at once to the same feed opening, or by feeding from different feed openings for each constituent component.

The melt kneading temperature is preferably about 250 to 375° C. at a resin temperature.

The melt kneading time is preferably about 0.5 to 5 minutes.

The apparatus for performing the melt kneading is not especially limited. Known apparatuses, for example, a melt kneader such as a single-screw or twin-screw extruder, a Banbury mixer, and a mixing roll, may be used.

A blend amount of the (B) inorganic filler is preferably 0.1 to 200 parts by mass, more preferably 1 to 180 parts by mass, and still more preferably 5 to 150 parts by mass, based on 100 parts by mass of the (A) polyamide.

By setting the blend amount to 0.1 parts by mass or more, mechanical properties such as toughness and rigidity of the polyamide composition improve in a good manner. Further, by setting the blend amount to 200 parts by mass or less, a polyamide composition having excellent moldability can be obtained.

To the extent that the object of the present embodiment is not harmed, the polyamide composition comprising the (B) inorganic filler may comprise additives which are customarily used in polyamides, such as a pigment, a dye, a fire retardant, a lubricant, a fluorescent bleaching agent, a plasticizing agent, an organic antioxidant, a stabilizer, an ultraviolet absorber, a nucleating agent, rubber, and a reinforcement.

A relative viscosity $\eta r$ at 25° C., A melting point Tm2, and A glass transition temperature Tg of the polyamide composition comprising the (B) inorganic filler according to the present embodiment can be measured by the same methods as the measurement methods for the above-described polyamide. Further, by setting the measurement values for the polyamide composition comprising the (B) inorganic filler in the same ranges as the ranges preferred for the measurement values of the above-described polyamide, a polyamide composition having excellent heat resistance, moldability, and chemical resistance can be obtained.

The polyamide composition comprising the (B) inorganic filler preferably has a melt shear viscosity $\eta s$ of 30 to 200 Pa·s, more preferably 40 to 180 Pa·s, and still more preferably 50 to 150 Pa·s.

The melt shear viscosity can be measured based on the method described in the below examples.

By setting the melt shear viscosity to be in the above-described range, a polyamide composition having excellent fluidity can be obtained.

The polyamide composition comprising the (B) inorganic filler preferably has a tensile strength of 140 MPa or more, more preferably 150 MPa or more, and still more preferably 160 MPa or more.

Measurement of the tensile strength can be carried out based on ASTM D638 as described in the below examples.

By setting the tensile strength to be 140 MPa or more, a polyamide composition having excellent rigidity can be obtained.

The polyamide composition comprising the (B) inorganic filler preferably has a tensile elongation of 1.0% or more, more preferably 1.5% or more, and still more preferably 2.0% or more.

Measurement of the tensile elongation can be carried out based on ASTM D638 as described in the below examples.

By setting the tensile elongation to be 1.0% or more, a polyamide composition having excellent toughness can be obtained.

The polyamide composition comprising the (B) inorganic filler preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

(C) Copper Compound and Metal Halide

The polyamide composition according to the present embodiment is a polyamide composition which comprises the above-described (A) polyamide and a (C) copper compound and metal halide.

As a polyamide composition, by comprising a (C) copper compound and metal halide, a polyamide composition can be obtained having excellent heat resistance, fluidity, toughness, low water absorbance, and rigidity, as well as excellent heat aging resistance, without harming the polyamide qualities of having excellent heat resistance, fluidity, toughness, low water absorbance, rigidity and the like.

Examples of the copper compound used in the present embodiment include copper halide, copper acetate, copper propionate, copper benzoate, copper adipate, copper terephthalate, copper isophthalate, copper salicylate, copper nicotinate, copper stearate, and copper complex salts coordinated to a chelating agent such as ethylenediamine, and ethylenediaminetetraacetic acid.

As the copper compound, preferred are copper iodide, copper(I) bromide, copper(II) bromide, copper(I) chloride, and copper acetate, and more preferred are copper iodide and/or copper acetate, due to their excellent heat aging resistance and ability to suppress metal corrosion of the screw and cylinder parts (hereinafter, sometimes referred to as "metal corrosion") during extrusion.

As the copper compound, one kind may be used, or two or more kinds may be used in combination.

A blend amount of the copper compound in the polyamide composition is preferably 0.01 to 0.6 parts by mass, and more preferably 0.02 to 0.4 parts by mass, based on 100 parts by mass of the (A) polyamide.

By setting the blend amount of the copper compound in the above-described range, sufficient heat aging resistance improves and copper precipitation and metal corrosion can be suppressed.

It is preferred to comprise the copper compound so that, based on $10^6$ parts by mass of the polyamide, the copper content is preferably 50 to 2,000 parts by mass, more preferably 100 to 1,500 parts by mass, and still more preferably 150 to 1,000 parts by mass.

By comprising 50 to 2,000 parts by mass of copper in the polyamide composition, a polyamide composition having excellent heat aging resistance can be obtained.

Examples of the metal halide used in the present embodiment exclude copper halides.

The metal halide is a salt of a Group 1 or 2 metal element in the periodic table with a halogen. Examples thereof include potassium iodide, potassium bromide, potassium chloride, sodium iodide, and sodium chloride. Potassium iodide and potassium bromide are preferred.

As the metal halide, one kind may be used, or two or more kinds may be used in combination.

Potassium iodide is preferred as the metal halide, due to its excellent heat aging resistance and ability to suppress metal corrosion.

A blend amount of the metal halide in the polyamide composition is preferably 0.05 to 20 parts by mass, and more preferably 0.2 to 10 parts by mass, based on 100 parts by mass of the (A) polyamide.

By setting the blend amount of the metal halide in the above-described range, sufficient heat aging resistance improves and copper precipitation and metal corrosion can be suppressed.

It is preferred to comprise the copper compound and the metal halide in the polyamide composition so that the ratio between the copper compound and the metal halide has a halogen and copper molar ratio (halogen/copper) of from 2/1 to 50/1. The halogen and copper molar ratio (halogen/copper) is more preferably 2/1 to 40/1, and still more preferably 5/1 to 30/1.

It is preferred that the halogen and copper molar ratio is 2/1 or more, because copper precipitation and metal corrosion can be suppressed. Further, if the halogen and copper molar ratio is 50/1 or less, the problem of corrosion of the molding machine screw and the like can be suppressed, without harming mechanical properties such as toughness and rigidity.

Although advantageous effects can be obtained even if the copper compound and the metal halide are respectively used by themselves, in the present embodiment it is preferred to blend both of these components in order to improve the performance of the obtained polyamide composition.

Examples of the method for producing the polyamide composition according to the present embodiment include, for example, adding the (C) copper compound and metal halide individually or as a mixture during the polymerization step of the (A) polyamide (hereinafter, sometimes abbreviated as "production method 1"), and adding the (C) copper compound and metal halide individually or as a mixture to the (A) polyamide using melt kneading (hereinafter, sometimes abbreviated as "production method 2").

In the method for producing the polyamide composition, when adding the (C) copper compound and metal halide, these may be added as is as a solid or in an aqueous solution state.

The "polymerization step of the polyamide" in production method 1 refers to any of the steps until completion of polymerization of the polyamide from the raw material monomers. The addition may be carried out at any stage.

The apparatus for performing the melt kneading in production method 2 is not especially limited. Known apparatuses, for example, a melt kneader such as single-screw or twin-screw extruder, a Banbury mixer, and a mixing roll, may be used.

Of these, it is preferred to use a twin-screw extruder.

The melt kneading temperature is preferably a temperature about 1 to 100° C. higher than the melting point of the (A) polyamide, and more preferably about 10 to 50° C. higher.

A shear rate in the kneader is preferably about 100 $\sec^{-1}$ or more. An average dwell time during the kneading is preferably about 0.5 to 5 minutes.

To the extent that the object of the present embodiment is not harmed, other additives may be added for dispersing the copper compound and the metal halide in the polyamide.

Examples of these other additives include, as a lubricant, higher fatty acids such as lauryl acid, higher fatty acid metal salts of a higher fatty acid and a metal such as aluminum, higher fatty acid amides such as N,N-ethylenebis(stearamide), and waxes such as polyethylene wax.

Further examples thereof include organic compounds having at least one amide group.

By further comprising the (B) inorganic filler in the polyamide composition comprising the (C) copper compound and metal halide, a polyamide composition having even better mechanical properties, such as toughness and rigidity, can be obtained.

A blend amount of the inorganic filler is preferably 0.1 to 200 parts by mass, more preferably 1 to 180 parts by mass, and still more preferably 5 to 150 parts by mass, based on 100 parts by mass of the polyamide.

By setting the blend amount of the inorganic filler to 0.1 parts by mass or more, mechanical properties such as toughness and rigidity of the polyamide composition improve in a good manner. Further, by setting the blend amount of the inorganic filler to 200 parts by mass or less, a polyamide composition having excellent moldability can be obtained.

To the extent that the object of the present embodiment is not harmed, the polyamide composition comprising the (C) copper compound and metal halide may comprise additives which are customarily used in polyamides, such as a pigment, a dye, a fire retardant, a lubricant, a fluorescent bleaching agent, a plasticizing agent, an organic antioxidant, a stabilizer, an ultraviolet absorber, a nucleating agent, rubber, and a reinforcement.

A relative viscosity it at 25° C., a melting point Tm2, and a glass transition temperature Tg of the polyamide composition comprising the (C) copper compound and metal halide according to the present embodiment can be measured by the same methods as the measurement methods for the above-described polyamide. Further, by setting the measurement values for the polyamide composition comprising the (C) copper compound and metal halide in the same ranges as the ranges preferred for the measurement values of the above-described polyamide, a polyamide composition having excellent heat resistance, moldability, and chemical resistance can be obtained.

The polyamide composition comprising the (C) copper compound and metal halide preferably has a melt shear viscosity ηs of 30 to 200 Pa·s, more preferably 40 to 180 Pa·s, and still more preferably 50 to 150 Pa·s.

The melt shear viscosity can be measured based on the method described in the below examples.

By setting the melt shear viscosity to be in the above-described range, a polyamide composition having excellent fluidity can be obtained.

The polyamide composition comprising the (C) copper compound and metal halide preferably has a tensile strength of 140 MPa or more, more preferably 150 MPa or more, and still more preferably 160 MPa or more.

Measurement of the tensile strength can be carried out based on ASTM D638 as described in the below examples.

By setting the tensile strength to be 140 MPa or more, a polyamide composition having excellent rigidity can be obtained.

The polyamide composition comprising the (C) copper compound and metal halide preferably has a tensile elongation of 1.0% or more, more preferably 1.5% or more, and still more preferably 2.0% or more.

Measurement of the tensile elongation can be carried out based on ASTM D638 as described in the below examples.

By setting the tensile elongation to be 1.0% or more, a polyamide composition having excellent toughness can be obtained.

The polyamide composition comprising the (C) copper compound and metal halide preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

The polyamide composition comprising the (C) copper compound and metal halide preferably has, as a molded product, a strength half-life of 40 days or more, more preferably 45 days or more, and still more preferably 50 days or more.

Measurement of the strength half-life can be carried out based on the method described in the below examples.

By setting the strength half-life to be 40 days or more, a polyamide composition having excellent heat resistance, and especially excellent heat aging resistance, can be obtained.

The polyamide composition comprising the (C) copper compound and metal halide preferably has a breaking stress of 45 MPa or more, more preferably 50 MPa or more, and still more preferably 55 MPa or more.

Measurement of the breaking stress can be carried out based on the method described in the below examples.

By molding a polyamide composition having a breaking stress of 45 MPa or more, a polyamide composition having excellent vibration fatigue resistance can be obtained.

The polyamide composition comprising the (C) copper compound and metal halide preferably has a tensile strength retention rate after dipping of 60% or more, more preferably 75% or more, and still more preferably 80% or more.

Measurement of the tensile strength retention rate after dipping can be carried out based on the method described in the below examples.

By molding a polyamide composition having a tensile strength retention rate after dipping of 60% or more, a polyamide composition having excellent LLC resistance can be obtained.

(D) Halogen-Based Flame Retardant

The polyamide composition according to the present embodiment is a polyamide composition which comprises the above-described (A) polyamide and a (D) halogen-based flame retardant.

As the polyamide composition according to the present embodiment, by comprising the (D) halogen-based flame retardant, a polyamide composition can be obtained having excellent heat resistance, fluidity, toughness, rigidity, and low water absorbance, as well as excellent flame resistance, without harming the polyamide qualities of having excellent heat resistance, fluidity, toughness, rigidity, and low water absorbance.

Further, even though the polyamide composition according to the present embodiment comprises a halogen-based flame retardant, it has excellent light fastness, and even has excellent color tone as a polyamide composition.

The (D) halogen-based flame retardant used in the present embodiment is not especially limited, as long as it is a flame retardant which comprises a halogen element. Examples thereof include chlorine-based flame retardants and bromine-based flame retardants, for example.

As such a flame retardant, one kind may be used, or two or more kinds may be used in combination.

Examples of chlorine-based flame retardants include chlorinated paraffin, chlorinated polyethylene, dodecachloropentacyclooctadeca-7,15-diene (Dechlorane Plus 25®, manufactured by Occidental Corporation), and HET anhydride.

Examples of bromine-based flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenoxy)ethane (BPBPE), a tetrabromobisphenol A epoxy resin (TBBA epoxy), a tetrabromobisphenol A carbonate (TBBA-PC), ethylene(bistetrabromophthal)imide (EBT-BPI), ethylenebispentabromodiphenyl, tris(tribromophenoxy)triazine (TTBPTA), bis(dibromopropyl)tetrabromobisphenol A (DBP-TBBA), bis(dibromopropyl)tetrabromobisphenol S (DBP-TBBS), brominated polyphenylene ether (including poly(di)bromophenylene ether etc.) (BrPPE), brominated polystyrene (including polydibromostyrene, polytribromostyrene, crosslinked brominated polystyrene etc.) (BrPS), brominated crosslinked aromatic polymers, brominated epoxy resins, brominated phenoxy resins, brominated styrene-maleic anhydride polymers, tetrabromobisphenol S (TBBS), tris(tribromoneopentyl)phosphate (TTBNPP), polybromotrimethylphenylindan (PBPI), and tris(dibromopropyl)-isocyanurate (TDBPIC).

From the perspective that an amount of corrosive gases produced during melt processing such as extrusion and molding is low, exhibition of flame resistance, and mechanical properties such as toughness and rigidity, the (D) halogen-based flame retardant is preferably a brominated polyphenylene ether (including poly(di)bromophenylene ether etc.) and a brominated polystyrene (including polydibromostyrene, polytribromostyrene, crosslinked brominated polystyrene etc.). A brominated polystyrene is more preferred.

The brominated polystyrene is not especially limited, and may be produced, for example, by polymerizing a styrene monomer to produce a polystyrene, and then brominating a benzene ring on the polystyrene. Alternatively, the brominated polystyrene may be produced by polymerizing a brominated styrene monomer (bromostyrene, dibromostyrene, tribromostyrene etc.).

A bromine content in the brominated polystyrene is preferably 55 to 75 mass %. By setting the bromine content to 55 mass % or more, the bromine amount required for achieving flame resistance can be satisfied with a small brominated polystyrene blend amount, and a polyamide composition having excellent heat resistance, fluidity, toughness, low water absorbance, and rigidity, as well as excellent flame resistance, can be obtained without harming the qualities possessed by a polyamide. Further, by setting the bromine content to 75 mass % or less, a polyamide composition can be obtained which is not easily pyrolyzed during melt processing such as extrusion and molding, can suppress gas occurrence and the like, and has excellent resistance to heat discoloration.

The polyamide composition comprising the (D) halogen-based flame retardant may also further comprise any of a (G) flame retardant auxiliary, a (H) polymer comprising an α,β-unsaturated dicarboxylic acid anhydride, and the (B) inorganic filler.

By further comprising the (G) flame retardant auxiliary in the polyamide composition comprising the (D) halogen-based flame retardant, a polyamide composition having even better flame resistance can be obtained.

The (G) flame retardant auxiliary used in the present embodiment is not especially limited. Examples thereof may include antimony oxides such as diantimony trioxide, diantimony tetroxide, diantimony pentoxide, and sodium antimonate; tin oxides such as tin monoxide and tin dioxide; iron oxides such as iron(II) oxide and γ-iron oxide; other metal oxides such as zinc oxide, zinc borate, calcium oxide, aluminum oxide (alumina), aluminum oxide (boehmite), silicon oxide (silica), titanium oxide, zirconium oxide, manganese oxide, molybdenum oxide, cobalt oxide, bismuth oxide, chromium oxide, tin oxide, nickel oxide, copper oxide, and tungsten oxide; metal hydroxides such as magnesium hydroxide and aluminum hydroxide; metal powders of aluminum, iron, titanium, manganese, zinc, molybdenum, cobalt, bismuth, chromium, tin, antimony, nickel, copper, tungsten and the like; metal carbonates such as zinc carbonate, calcium carbonate, magnesium carbonate, and barium carbonate; metal borates such as magnesium borate, calcium borate, aluminum borate; and silicone.

As the (G) flame retardant auxiliary, one kind may be used, or two or more kinds may be used in combination.

From the perspective of the flame resistance effect, the (G) flame retardant auxiliary used along with the (D) halogen-based flame retardant is preferably an antimony oxide such as diantimony trioxide, diantimony tetroxide, diantimony pentoxide, and sodium antimonate, a tin oxide such as tin monoxide and tin dioxide, an iron oxide such as iron(II) oxide and γ-iron oxide, zinc oxide, and zinc borate. More preferred are an antimony oxide such as diantimony trioxide, diantimony tetroxide, and diantimony pentoxide, and zinc borate, and still more preferred is diantimony trioxide.

To increase the flame retardance effect, it is preferred to use a (G) flame retardant auxiliary having an average particle size of 0.01 to 10 μm.

The average particle size may be measured using a laser diffraction/scattering type particle size distribution analyzer or a precise particle size distribution analyzer.

By further comprising the (H) polymer comprising the α,β-unsaturated dicarboxylic acid anhydride in the polyamide composition comprising the (D) halogen-based flame retardant, a polyamide composition having excellent flame resistance and also mechanical properties such as toughness and rigidity can be obtained.

Examples of the (H) polymer comprising the α,β-unsaturated dicarboxylic acid anhydride used in the present embodiment include a polymer comprising the α,β-unsaturated dicarboxylic acid anhydride as a copolymer component, and a polymer modified with the α,β-unsaturated dicarboxylic acid anhydride.

Examples of the α,β-unsaturated dicarboxylic acid anhydride include the compounds represented by the following general formula (1).

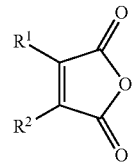

General formula (1)

In general formula (1), $R^1$ and $R^2$ are each independently a hydrogen or an alkyl group having 1 to 3 carbon atoms.

Examples of the α,β-unsaturated dicarboxylic acid anhydride include maleic anhydride and methyl maleic anhydride. Maleic anhydride is preferred.

Examples of the polymer comprising the α,β-unsaturated dicarboxylic acid anhydride as a copolymer component include a copolymer of an aromatic vinyl compound and an α,β-unsaturated dicarboxylic acid anhydride.

Examples of the polymer modified with the α,β-unsaturated dicarboxylic acid anhydride include a polyphenylene ether resin and a polypropylene resin modified with an α,β-unsaturated dicarboxylic acid anhydride.

From the perspective of efficiency in improving flame retardance (exhibiting flame retardance with a small added amount), a copolymer of an aromatic vinyl compound and an α,β-unsaturated dicarboxylic acid anhydride is preferred as the (H) polymer comprising an α,β-unsaturated dicarboxylic acid anhydride.

Examples of the aromatic vinyl compound used in the present embodiment include the compounds represented by the following general formula (2).

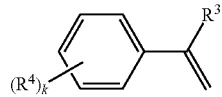

General formula (2)

In general formula (2), $R^3$ and $R^4$ are each independently a hydrogen or an alkyl group having 1 to 3 carbon atoms, and k denotes an integer of 1 to 5.

Examples of the aromatic vinyl compound include styrene, α-methylstyrene, and p-methylstyrene. Styrene is preferred.

In the present embodiment, when the polymer comprising the α,β-unsaturated dicarboxylic acid anhydride comprises the aromatic vinyl compound component, it is thought that the aromatic vinyl compound component has an affinity with the halogen-based flame retardant (brominated polystyrene etc.), and assists in the dispersion of the halogen-based flame retardant in the polyamide matrix, thereby allowing finer dispersion of the halogen-based flame retardant, due to the α,β-unsaturated dicarboxylic acid anhydride component having an affinity with or reacting with the polyamide.

From perspectives such as flame resistance, fluidity, and resistance to pyrolysis, the ratio of the aromatic vinyl compound component and the α,β-unsaturated dicarboxylic acid anhydride component in the copolymer of the aromatic vinyl compound and the α,β-unsaturated dicarboxylic acid anhydride is preferably set so that the aromatic vinyl compound component is 50 to 99 mass %, and the α,β-unsaturated dicarboxylic acid anhydride component is 1 to 50 mass %. The ratio of the α,β-unsaturated dicarboxylic acid anhydride component is more preferably 5 to 20 mass %, and still more preferably 8 to 15 mass %.

By setting the ratio of the α,β-unsaturated dicarboxylic acid anhydride component to 1 mass % or more, a polyamide composition having excellent mechanical properties such as toughness and rigidity as well as excellent flame resistance can be obtained. Further, by setting the ratio of the α,β-unsaturated dicarboxylic acid anhydride component to 50 mass % or less, deterioration of the polyamide composition due to the α,β-unsaturated dicarboxylic acid anhydride can be prevented.

By comprising the above-described (B) inorganic filler in the polyamide composition comprising the (D) halogen-based flame retardant, a polyamide composition having excellent mechanical properties such as toughness and rigidity can be obtained.

A method for producing the polyamide composition according to the present embodiment is not especially limited, as long as the method mixes the above-described (A) polyamide and the (D) halogen-based flame retardant. Further, examples of the method for producing the polyamide composition comprising the (D) halogen-based flame retardant include a method in which the (G) flame retardant auxiliary and the (H) polymer comprising the α,β-unsaturated dicarboxylic acid anhydride and/or the (B) inorganic filler are further mixed.

Examples of the method for mixing the polyamide and the halogen-based flame retardant include mixing the polyamide and the halogen-based flame retardant, and optionally the flame retardant auxiliary, the polymer comprising the α,β-unsaturated dicarboxylic acid anhydride, and/or the inorganic filler, using a Henschel mixer and the like, feeding the resultant mixture to a melt kneader, and kneading. Another example thereof includes forming in advance using a Henschel mixer and the like a mixture of the polyamide and the halogen-based flame retardant, and optionally the flame retardant auxiliary and/or the polymer comprising the α,β-unsaturated dicarboxylic acid anhydride with a single-screw or a twin-screw extruder, feeding the resultant mixture to a melt kneader, kneading, and then, optionally, adding the inorganic filler from a side feeder.

The method for feeding the components constituting the polyamide can be carried out by feeding all of the constituent components all at once to the same feed opening, or by feeding from different feed openings for each constituent component.

The melt kneading temperature is preferably about 250 to 375° C. at a resin temperature.

The melt kneading time is preferably about 0.5 to 5 minutes.

As the apparatus for performing the melt kneading, it is preferred to use a known apparatus, for example a melt kneader such as a single-screw or twin-screw extruder, a Banbury mixer, and a mixing roll.

A blend amount of the (D) halogen-based flame retardant, and a blend amounts of the optional (G) flame retardant auxiliary, (H) polymer comprising an α,β-unsaturated dicarboxylic acid anhydride and/or (B) inorganic filler, are not especially limited.

The blend amount of the halogen-based flame retardant in the polyamide composition is preferably 30 to 60 parts by mass, more preferably 35 to 55 parts by mass, and still more preferably 40 to 50 parts by mass, based on 100 parts by mass of the polyamide.

By setting the blend amount of the halogen-based flame retardant to be 30 parts by mass or more, a polyamide composition having excellent heat resistance can be obtained. Further, by setting the blend amount of the halogen-based flame retardant to be 60 parts by mass or less, the occurrence of decomposition gases during melt kneading, deterioration in fluidity during molding processing, and adherence of a contaminating substance to the mold die can be suppressed. In addition, deterioration in mechanical properties such as toughness and rigidity and deterioration in the molded product appearance can be suppressed.

A blend amount of the flame retardant auxiliary in the polyamide composition is preferably 0 to 30 parts by mass, more preferably 1 to 30 parts by mass, still more preferably 2 to 20 parts by mass, and even still more preferably 4 to 15 parts by mass, based on 100 parts by mass of the polyamide.

By blending the flame retardant auxiliary, a polyamide composition having even better flame resistance can be obtained. Further, by setting the blend amount of the flame retardant auxiliary to be 30 parts by mass or less, the viscosity during melt processing can be controlled in a suitable range, an increase in torque during extrusion can be suppressed, and deterioration in moldability during molding processing and deterioration in the molded product appearance can be suppressed. Moreover, a polyamide composition having excellent toughness and the like can be obtained without harming the polyamide qualities of having excellent mechanical properties such as toughness and rigidity.

A blend amount of the polymer comprising an α,β-unsaturated dicarboxylic acid anhydride in the polyamide composition is preferably 0 to 20 parts by mass, more preferably 0.5 to 20 parts by mass, still more preferably 1 to 15 parts by mass, and even still more preferably 2 to 10 parts by mass, based on 100 parts by mass of the polyamide.

By blending the polymer comprising the α,β-unsaturated dicarboxylic acid anhydride, the fine dispersion effects of the halogen-based flame retardant in the polyamide due to compatibilizing effect can be increased, so that a polyamide composition having an excellent effect in improving flame resistance and strength can be obtained. Further, by setting the blend amount of the polymer comprising the α,β-unsaturated dicarboxylic acid anhydride to be 20 parts by mass or less, a polyamide composition having excellent strength and the like can be obtained without harming the polyamide qualities of having excellent mechanical properties such as toughness and rigidity.

A blend amount of the inorganic filler in the polyamide composition is preferably 0 to 200 parts by mass, more preferably 0.1 to 200 parts by mass, still more preferably 1 to 180 parts by mass, and even still more preferably 5 to 150 parts by mass based on 100 parts by mass of the polyamide.

By blending the inorganic filler, mechanical properties such as toughness and rigidity of the polyamide composition improve in a good manner. Further, by setting the blend amount of the inorganic filler to 200 parts by mass or less, a polyamide composition having excellent moldability can be obtained.

To the extent that the object of the present embodiment is not harmed, the polyamide composition comprising the (D) halogen-based flame retardant may comprise additives which are customarily used in polyamides, such as a pigment, a dye, a fire retardant, a lubricant, a fluorescent bleaching agent, a plasticizing agent, an organic antioxidant, a stabilizer, an ultraviolet absorber, a nucleating agent, rubber, and a reinforcement.

A relative viscosity ηr at 25° C., a melting point Tm2, and a glass transition temperature Tg of the polyamide composition comprising the (D) halogen-based flame retardant according to the present embodiment can be measured by the same methods as the measurement methods for the above-described polyamide. Further, by setting the measurement values for the polyamide composition comprising the (D) halogen-based flame retardant in the same ranges as the ranges preferred for the measurement values of the above-described polyamide, a polyamide composition having excellent heat resistance, moldability, mechanical properties such as toughness and rigidity, and chemical resistance can be obtained.

The polyamide composition comprising the (D) halogen-based flame retardant preferably has a tensile strength of 140 MPa or more, more preferably 150 MPa or more, and still more preferably 160 MPa or more.

Measurement of the tensile strength can be carried out based on ASTM D638 as described in the below examples.

By setting the tensile strength to be 140 MPa or more, a polyamide composition having excellent rigidity can be obtained.

The polyamide composition comprising the (D) halogen-based flame retardant preferably has a tensile elongation of 1.0% or more, more preferably 1.5% or more, and still more preferably 2.0% or more.

Measurement of the tensile elongation can be carried out based on ASTM D638 as described in the below examples.

By setting the tensile elongation to be 1.0% or more, a polyamide composition having excellent toughness can be obtained.

The polyamide composition comprising the (D) halogen-based flame retardant preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

The flame resistance of the polyamide composition comprising the (D) halogen-based flame retardant is measured based on UL-94VB.

The polyamide composition preferably has a flame resistance of V-2 or more, more preferably V-1 or more, and more preferably V-0.

The polyamide composition comprising the (D) halogen-based flame retardant preferably has a flow length of 15 cm or more, more preferably 17 cm or more, and still more preferably 20 cm or more.

The flow length can be measured by the method described in the below examples.

By setting the flow length to 15 cm or more, a polyamide composition having excellent fluidity can be obtained.

(E) Phosphinate and/or Diphosphinic Acid

The polyamide composition according to the present embodiment is a polyamide composition comprising the above-described (A) polyamide and an (E) phosphinate and/or diphosphinate (hereinafter, sometimes collectively referred to as "phosphinate").

Examples of phosphinic acid include the compounds represented by the following general formula (I).

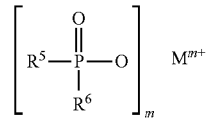

General formula (I)

Examples of diphosphinic acid include the compounds represented by the following general formula (II).

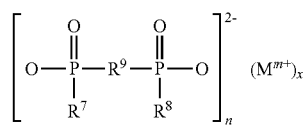

General formula (II)

In general formulae (I) and (II), $R^5$ and $R^6$, and $R^7$ and $R^8$, are each independently selected from the group consisting of an alkyl group having 1 to 6 carbon atoms, an aryl group having 6 to 12 carbon atoms, and an arylalkyl group having 7 to 20 carbon atoms. $R^9$ is selected from the group consisting of an alkylene group having 1 to 10 carbon atoms, an arylene group having 6 to 10 carbon atoms, an alkylarylene group having 7 to 20 carbon atoms, and an arylalkylene group having 7 to 20 carbon atoms. M is selected from the group consisting of calcium (ion), magnesium (ion), aluminum (ion), and zinc (ion), m is 2 or 3, n is 1 or 3, and x is 1 or 2.

In the present embodiment, examples of the alkyl group include straight-chain or branched saturated aliphatic groups.

In the present embodiment, examples of the aryl group include aromatic groups, which are unsubstituted or substituted with various substituents, having 6 to 20 carbon atoms, such as a phenyl group, a benzyl group, an o-toluoyl group, and a 2,3-xylyl group.

As the polyamide composition according to the present embodiment, by comprising the (E) phosphinate, a polyamide composition can be obtained having excellent heat resistance, fluidity, toughness, low water absorbance, and rigidity, as well as having excellent flame resistance, without harming the polyamide qualities of having excellent heat resistance, fluidity, toughness, low water absorbance, and rigidity.

Further, the polyamide composition according to the present embodiment also has excellent light fastness and color tone as a polyamide composition, despite inclusion of the phosphinate.

The (E) phosphinate used in the present embodiment can be produced in an aqueous solution using phosphinic acid and a metal component, such as a metal carbonate, a metal hydroxide, or a metal oxide, as described in European Patent Application Publication No. 699708 and Japanese Patent Laid-Open No. 8-73720.

Although such compounds are essentially monomeric compounds, depending on the reaction conditions, polymeric phosphinates having a degree of condensation of 1 to 3 based on the environment are also included.

Examples of the phosphinic acid and diphosphinic acid for the (E) phosphinate include dimethylphosphinic acid, ethylmethylphosphinic acid, diethylphosphinic acid, methyl-n-propylphosphinic acid, methanedi(methylphosphinic acid), benzene-1,4-di(methylphosphinic acid), methylphenylphosphinic acid, and diphenylphosphinic acid.

Examples of the metal component for the (E) phosphinate include a calcium ion, a magnesium ion, an aluminum ion, and a zinc ion.

Examples of the (E) phosphinate include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylenebis(methylphosphinate), magnesium methylenebis(methylphosphinate), aluminum methylenebis(methylphosphinate), zinc methylenebis(methylphosphinate), calcium phenylene-1,4-bis(methylphosphinate), magnesium phenylene-1,4-bis(methylphosphinate), aluminum phenylene-1,4-bis(methylphosphinate), zinc phenylene-1,4-bis(methylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

As the (E) phosphinate, one kind may be used, or two or more kinds may be used in combination.

From the perspectives of the flame resistance and the electric properties of the polyamide composition, and also from the perspective of phosphinate synthesis, the (E) phosphinate is preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, and zinc diethylphosphinate.

From the perspectives of mechanical properties such as toughness and rigidity and of the appearance of the molded product obtained by molding the polyamide composition, it is preferred to use the (E) phosphinate as a powder ground to a particle size of 100 μm or less, and more preferably as a powder ground to a particle size of from 50 μm or less.

It is preferred to use the (E) phosphinate as a powder having a particle size of 0.5 to 20 μm, because not only does this allow a polyamide composition which exhibits high flame resistance to be obtained, but the strength of the molded product is also substantially increased.

The average particle size may be measured using a laser diffraction/scattering type particle size distribution analyzer or a precise particle size distribution analyzer.

The (E) phosphinate does not have to be a completely pure. It is acceptable for certain amounts of unreacted products or byproducts to remain.

The polyamide composition comprising the (E) phosphinate may also further comprise any of the (G) flame retardant auxiliary and the (B) inorganic filler.

By further comprising the (G) flame retardant auxiliary in the polyamide composition comprising the (E) phosphinate, a polyamide composition having even better flame resistance can be obtained.

The (G) flame retardant auxiliary is not especially limited, as long as it a flame retardant auxiliary described above. Of those, preferred are metal oxides such as zinc oxide, iron oxide, calcium oxide, aluminum oxide (alumina), aluminum oxide (boehmite), silicon oxide (silica), titanium oxide, zirconium oxide, manganese oxide, molybdenum oxide, cobalt oxide, bismuth oxide, chromium oxide, tin oxide, antimony oxide, nickel oxide, copper oxide, and tungsten oxide, metal hydroxides such as magnesium hydroxide and aluminum hydroxide, metal powders of aluminum, iron, titanium, manganese, zinc, molybdenum, cobalt, bismuth, chromium, tin, antimony, nickel, copper, tungsten and the like, metal carbonates such as zinc carbonate, calcium carbonate, magnesium carbonate, and barium carbonate, metal borates such as zinc borate, magnesium borate, calcium borate, aluminum borate, and silicone.

As the (G) flame retardant auxiliary, one kind may be used, or two or more kinds may be used in combination.

From the perspective of flame resistance, as the (G) flame retardant auxiliary used with the (E) phosphinate, preferred are calcium oxide, aluminum oxide (alumina), aluminum hydroxide (boehmite), magnesium hydroxide, and zinc borate.

As the zinc borate, more preferred is a zinc borate represented by $xZnO.yB_2O_3.zH_2O$ (wherein x>0, y>0, and z≥0). Still more preferred are $2ZnO.3B_2O_3.3.5H_2O$, $4ZnO.B_2O_3$—$H_2O$, and $2ZnO.3B_2O$.

These zinc borate compounds may be treated with a surface treatment agent such as a silane coupling agent and a titanate coupling agent.

The flame retardant auxiliary preferably has a particle size of 30 μm or less, more preferably 15 μm or less, and still more preferably 7 μm or less.

A blend amount of the (E) phosphinate and a blend amounts of the optional (G) flame retardant auxiliary and/or (B) inorganic filler, in the polyamide composition according to the present embodiment are not especially limited.

The blend amount of the phosphinate in the polyamide composition is preferably 20 to 90 parts by mass, more preferably 25 to 80 parts by mass, and still more preferably 30 to 60 parts by mass, based on 100 parts by mass of the polyamide.

By setting the blend amount of the phosphinate to be 20 parts by mass or more, a polyamide composition having excellent flame resistance can be obtained. Further, by setting the blend amount of the phosphinate to be 90 parts by mass or less, deterioration in fluidity during molding processing can be suppressed. In addition, deterioration in mechanical properties such as toughness and rigidity and deterioration in the molded product appearance can be suppressed.

A blend amount of the flame retardant auxiliary in the polyamide composition is preferably 0 to 30 parts by mass, more preferably 1 to 30 parts by mass, still more preferably 1 to 20 parts by mass, and even still more preferably 2 to 15 parts by mass, based on 100 parts by mass of the polyamide.

By blending the flame retardant auxiliary, a polyamide composition having even better flame resistance can be obtained. Further, by setting the blend amount of the flame retardant auxiliary to be 30 parts by mass or less, the viscosity during melt processing can be controlled in a suitable range, an increase in torque during extrusion can be suppressed, and deterioration in moldability during molding processing and deterioration in the molded product appearance can be suppressed. Moreover, a polyamide composition having excellent toughness can be obtained without harming the polyamide qualities of having excellent mechanical properties such as toughness and rigidity.

A blend amount of the inorganic filler in the polyamide composition is preferably 0 to 200 parts by mass, more preferably 0.1 to 200 parts by mass, still more preferably 1 to 180 parts by mass, and even still more preferably 5 to 150 parts by mass, based on 100 parts by mass of the polyamide.

By further blending the inorganic filler, mechanical properties such as toughness and rigidity of the polyamide composition improve in a good manner. Further, by setting the blend amount of the inorganic filler to 200 parts by mass or less, a polyamide composition having excellent moldability can be obtained.

To the extent that the object of the present embodiment is not harmed, the polyamide composition comprising the (E) phosphinate may comprise additives which are customarily used in polyamides, such as a pigment, a dye, a fire retardant, a lubricant, a fluorescent bleaching agent, a plasticizing agent, an organic antioxidant, a stabilizer, an ultraviolet absorber, a nucleating agent, rubber, and a reinforcement.

A relative viscosity $\eta r$ at 25° C., a melting point Tm2, and a glass transition temperature Tg of the polyamide composition comprising the (E) phosphinate can be measured by the same methods as the measurement methods for the above-described polyamide. Further, by setting the measurement values for the polyamide composition comprising the (E) phosphinate in the same ranges as the ranges preferred for the measurement values of the above-described polyamide, a polyamide composition having excellent heat resistance, moldability, mechanical properties such as toughness and rigidity, and chemical resistance can be obtained.

The polyamide composition comprising the (E) phosphinate preferably has a tensile strength of 140 MPa or more, more preferably 150 MPa or more, and still more preferably 160 MPa or more.

Measurement of the tensile strength can be carried out based on ASTM D638 as described in the below examples.

By setting the tensile strength to be 140 MPa or more, a polyamide composition having excellent rigidity can be obtained.

The polyamide composition comprising the (E) phosphinate preferably has a tensile elongation of 1.0% or more, more preferably 1.5% or more, and still more preferably 2.0% or more.

Measurement of the tensile elongation can be carried out based on ASTM D638 as described in the below examples.

By setting the tensile elongation to be 1.0% or more, a polyamide composition having excellent toughness can be obtained.

The polyamide composition comprising the (E) phosphinate preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

A flame resistance of the polyamide composition comprising the (E) phosphinate is measured based on UL-94VB. The polyamide composition preferably has a flame resistance of V-2 or more, more preferably V-1 or more, and more preferably V-0.

The polyamide composition comprising the (E) phosphinate preferably has a full filling pressure of 15 to 50%, more preferably 18 to 48%, and still more preferably 20 to 45%.

The full filling pressure can be measured by the method described in the below examples.

By setting the full filling pressure in the above-described range, a polyamide composition having excellent fluidity can be obtained.

(F) Stabilizer

The polyamide composition according to the present embodiment is a polyamide composition which comprises the above-described (A) polyamide and an (F) stabilizer.

As the polyamide composition according to the present embodiment, by comprising the (F) stabilizer, a polyamide composition can be obtained having excellent heat resistance, fluidity, toughness, low water absorbance, and rigidity, as well as excellent resistance to heat discoloration and weatherability, without harming the polyamide qualities of having excellent heat resistance, fluidity, toughness, low water absorbance, and rigidity.

The (F) stabilizer used in the present embodiment is at least one kind selected from the group consisting of phenolic-based stabilizers, phosphite-based stabilizers, hindered amine-based stabilizers, triazine-based stabilizers, sulfur-based stabilizers, and inorganic phosphorus-based stabilizers.

As the stabilizer, one kind may be used, or two or more kinds may be used in combination.

Examples of phenolic-based stabilizers are not especially limited, and may include hindered phenol compounds.

Examples of hindered phenol compounds include N,N'-hexane-1,6-diylbis[3-(3,5-di-t-butyl-4-hydroxyphenylpropionamide)], pentaerythrityl-tetrakis[3-(3,5-di-t-butyl-4-hydroxyphenyl)propionate], N,N'-hexamethylenebis(3,5-di-t-butyl-4-hydroxy-hydrocinnamamide), triethyleneglycol-bis[3-(3-t-butyl-5-methyl-4-hydroxyphenyl) propionate], 3,9-bis{2-[3-(3-t-butyl-4-hydroxy-5-methylphenyl) propionyloxy]-1,1-dimethylethyl}-2,4,8,10-tetraoxaspiro[5,5]undecane, 3,5-di-t-butyl-4-hydroxybenzylphosphonate-diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl) isocyanurate.

As the phenolic-based stabilizer, one kind may be used, or two or more kinds may be used in combination.

Examples of phosphite-based stabilizers are not especially limited, and may include trioctyl phosphite, trilauryl phosphite, tridecyl phosphite, octyldiphenyl phosphite, trisisodecyl phosphite, phenyl diisodecyl phosphite, phenyl di(tridecyl) phosphite, diphenyl isooctyl phosphite, diphenyl isodecyl phosphite, diphenyl(tridecyl) phosphite, triphenyl phosphite, tris(nonylphenyl) phosphite, tris(2,4-di-t-butylphenyl) phosphite, tris(2,4-di-t-butyl-5-methylphenyl) phosphite, tris(butoxyethyl) phosphite, 4,4'-butylidene-bis(3-methyl-6-t-butylphenyl-tetra-tridecyl) diphosphite, tetra (C12 to C15 mixed alkyl)-4,4'-isopropylidenediphenyl diphosphite, 4,4'-isopropylidenebis(2-t-butylphenyl)-di(nonylphenyl) phosphite, tris(biphenyl) phosphite, tetra(tridecyl)-1,1,3-tris(2-methyl-5-t-butyl-4-hydroxyphenyl) butane diphosphite, tetra(tridecyl)-4,4'-butylidenebis(3-methyl-6-t-butylphenyl) diphosphite, tetra(C1 to C15 mixed alkyl)-4,4'-isopropylidenediphenyl diphosphite, tris(mono-di mixed nonylphenyl) phosphite, 4,4'-isopropylidenebis(2- t-butylphenyl)-di(nonylphenyl) phosphite, 9,10-di-hydro-9-oxa-10-phosphorphenanthrene-10-oxide, tris(3,5-di-t-butyl-4-hydroxyphenyl) phosphite, hydrogenated-4,4'-isopropylidenediphenyl polyphosphite, bis(octylphenyl)-bis(4,4'-butylidenebis(3-methyl-6-t-butylphenyl)-1,6-hexanol diphosphite, hexa(tridecyl)-1,1,3-tris(2-methyl-4-hydroxy-5-t-butylphenyl) butane triphosphite, tris(4,4'-isopropylidenebis(2-t-butylphenyl) phosphite, tris(1,3-stearoyloxy-isopropyl) phosphite, 2,2-methylenebis(4,6-di-t-butylphenyl)octyl phosphite, 2,2-methylenebis(3-methyl-4,6-di-t-butylphenyl)-2-ethylhexyl phosphite, tetrakis(2,4-di-t-butyl-5-methylphenyl)-4,4'-biphenylene diphosphite, and tetrakis(2,4-di-t-butylphenyl)-4,4'-biphenylene diphosphite.

As the phosphite-based stabilizer, one kind may be used, or two or more kinds may be used in combination.

Examples of phosphite-based stabilizers may also include pentaerythritol-type phosphite compounds.

Examples of pentaerythritol-type phosphite compounds include 2,6-di-t-butyl-4-methylphenyl-phenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenyl-cyclohexyl-pentaerythritol diphosphite, 2,6-di-t-butyl-4-methylphenyl-benzyl-pentaerythritol diphosphite, 2,6-di-t-butyl-4-methylphenyl-ethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite.

As the pentaerythritol-type phosphate-based stabilizer, one kind may be used, or two or more kinds may be used in combination.

As the pentaerythritol-type phosphite compound, bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite are preferable. Bis(2,6-di-t-butyl-4-methylphenyl)pentaerythritol diphosphite is more preferable.

Examples of the hindered amine-based stabilizer are not especially limited, and may include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensation product of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol.

As the hindered amine-based stabilizer, one kind may be used, or two or more kinds may be used in combination.

Examples of the triazine-based stabilizers are not especially limited, and may include hydroxyphenyl triazines.

Examples of the hydroxyphenyl triazines include 2,4,6-tris(2'-hydroxy-4'-octyloxy-phenyl)-1,3,5-triazine, 2-(2'-hydroxy-4'-hexyloxy-phenyl)-4,6-diphenyl-1,3,5-triazine, 2-(2'-hydroxy-4'-octyloxyphenyl)-4,6-bis(2',4-dimethylphenyl)-1,3,5-triazine, 2-(2',4'-dihydroxyphenyl)-4,6-bis(2',4'-dimethylphenyl)-1,3,5-triazine, 2,4-bis(2'-hydroxy-4'-propyloxy-phenyl)-6-(2',4'-dimethylphenyl)-1,3,5-triazine, 2-(2-hydroxy-4-octyloxyphenyl)-4,6-bis(4'-methylphenyl)-1,3,5-triazine, 2-(2'-hydroxy-4'-dodecyloxyphenyl)-4,6-bis(2',4'-dimethylphenyl)-1,3,5-triazine, 2,4,6-tris(2'-hydroxy-4'-isopropyloxyphenyl)-1,3,5-triazine, 2,4,6-tris(2'-hydroxy-4'-n-hexyloxyphenyl)-1,3,5-triazine, and 2,4,6-tris(2'-hydroxy-4'-ethoxycarbonylmethoxyphenyl)-1,3,5-triazine.

As the triazine-based stabilizer, one kind may be used, or two or more kinds may be used in combination.

Examples of sulfur-based stabilizers are not especially limited, and may include pentaerythrityltetrakis(3-laurylthiopropionate), dilauryl-3,3'-thiodipropionate, dimyristyl-3,3'-thiodipropionate, and distearyl-3,3'-thiodipropionate.

As the sulfur stabilizer, one kind may be used, or two or more kinds may be used in combination.

Examples of inorganic phosphorus-based stabilizers are not especially limited, and may include phosphoric acids, phosphorous acids, hypophosphorous acids, phosphoric acid metal salts, phosphorous acid metal salts, and hypophosphorous acid metal salts.

Examples of phosphoric acids, phosphorous acids, and hypophosphorous acids include phosphoric acid, phosphorous acid, hypophosphorous acid, pyrophosphorous acid, and diphosphorous acid.

Examples of the phosphoric acid metal salts, phosphorous acid metal salts, and hypophosphorous acid metal salts include salts formed from compounds of the above-described phosphoric acids and the like with Group 1 metals in the periodic table.

It is preferred that the inorganic phosphorus-based stabilizer is a soluble compound. Examples thereof include sodium phosphate, sodium phosphite, and sodium hypophosphite. More preferred is sodium phosphite and sodium hypophosphite, and still more preferred is sodium hypophosphite.

The inorganic phosphorus-based stabilizer may also be a hydrate (preferably, a hydrate of sodium hypophosphite ($NaH_2PO_2 \cdot nH_2O$)).

As the inorganic phosphorus-based stabilizer, one kind may be used, or two or more kinds may be used in combination.

A blend amount of the (F) stabilizer in the polyamide composition according to the present embodiment is preferably 0.01 to 5 parts by mass, more preferably 0.02 to 1 part by mass, and still more preferably 0.1 to 1 part by mass, based on 100 parts by mass of the polyamide.

By blending 0.01 parts by mass or more of the (F) stabilizer a polyamide composition which has excellent resistance to heat discoloration and weatherability can be obtained. In addition, by blending 5 parts by mass or more of the (F) stabilizer, silver streaks on the surface of the molded product during molding of the polyamide composition can be suppressed, and a molded product having excellent mechanical properties such as toughness and rigidity can be obtained.

A method for producing the polyamide composition comprising the (F) stabilizer according to the present embodiment is not especially limited, as long as it is a method which mixes the above-described (A) polyamide and the (F) stabilizer. Examples thereof include blending the stabilizer in the polyamide, blending the stabilizer during polymerization of the polyamide, blending the stabilizer when mixing the polyamide with another resin, adhering the stabilizer to the surface of a powder or pellet of the polyamide, blending the stabilizer in the polyamide by melt kneading, and blending a master batch of the stabilizer in the polyamide. Alternatively, a combination of these blending methods may be employed.

Examples of the method for mixing the polyamide and the stabilizer include mixing the polyamide and the stabilizer using a Henschel mixer or the like, then feeding the resultant mixture to a melt kneader and kneading, and blending the stabilizer in a polyamide turned into a melt state by a single-screw or twin-screw extruder from a side feeder.

The method for feeding the components constituting the polyamide composition can be carried out by feeding all of the constituent components all at once to the same feed opening, or by feeding from different feed openings for each constituent component.

The melt kneading temperature is preferably about 250 to 375° C. at a resin temperature.

The melt kneading time is preferably about 0.5 to 5 minutes.

As the apparatus for performing the melt kneading, it is preferred to use a known apparatus, for example a melt kneader such as a single-screw or twin-screw extruder, a Banbury mixer, and a mixing roll.

To the extent that the object of the present embodiment is not harmed, the polyamide composition comprising the (F) stabilizer may comprise additives which are customarily used in polyamides, such as an inorganic filler, a pigment, a dye, a fire retardant, a lubricant, a fluorescent bleaching agent, a plasticizing agent, an organic antioxidant, an ultraviolet absorber, nucleating agent, rubber, and a reinforcement.

A relative viscosity $\eta r$ at 25° C., a melting point Tm2, and a glass transition temperature Tg of the polyamide composition comprising the (F) stabilizer according to the present embodiment can be measured by the same methods as the measurement methods for the above-described polyamide. Further, by setting the measurement values for the polyamide composition comprising the (F) stabilizer in the same ranges as the ranges preferred for the measurement values of the above-described polyamide, a polyamide composition having excellent heat resistance, moldability, and chemical resistance can be obtained.

The polyamide composition comprising the (F) stabilizer according to the present embodiment preferably has a melt shear viscosity $\eta s$ of 20 to 110 Pa·s, more preferably 25 to 90 Pa·s, and still more preferably 30 to 80 Pa·s.

The melt shear viscosity can be measured based on the method described in the below examples.

By setting the melt shear viscosity to be in the above-described range, a polyamide composition having excellent fluidity can be obtained.

The polyamide composition preferably has a tensile strength of 80 MPa or more, more preferably 85 MPa or more, and still more preferably 90 MPa or more.

Measurement of the tensile strength can be carried out based on ASTM D638 as described in the below examples.

By setting the tensile strength to be 80 MPa or more, a polyamide composition having excellent rigidity can be obtained.

The polyamide composition preferably has a tensile elongation of 1.0% or more, more preferably 2.0% or more, and still more preferably 3.0% or more.

Measurement of the tensile elongation can be carried out based on ASTM D638 as described in the below examples.

By setting the tensile elongation to be 3.0% or more, a polyamide composition having excellent toughness can be obtained.

The polyamide composition preferably has a water absorbance of 5.0% or less, more preferably 4.0% or less, and still more preferably 3.0% or less.

Measurement of the water absorbance can be carried out based on the method described in the below examples.

By setting the water absorbance to be 5.0% or less, a polyamide composition having excellent low water absorbance can be obtained.

The polyamide composition comprising the (F) stabilizer according to the present embodiment preferably has a change in color tone $\Delta b$ before and after reworking of 9 or less, and more preferably 6 or less.

Measurement of the change in color tone $\Delta b$ can be carried out based on the method described in the below examples.

By setting the change in color tone $\Delta b$ to be 9 or less, a polyamide composition having excellent resistance to heat discoloration can be obtained.

The polyamide composition comprising the (F) stabilizer preferably has a color difference $\Delta E$ of 9 or less, and more preferably 5 or less.

Measurement of the color difference $\Delta E$ can be carried out based on the method described in the below examples.

By setting the color difference $\Delta E$ to be 9 or less, a polyamide composition having excellent weatherability can be obtained.

Molding

The polyamide or polyamide composition according to the present embodiment can be used to obtain various kinds of molded products using known molding methods, such as press molding, injection molding, gas-assisted injection molding, welding molding, extrusion, blow molding, film molding, hollow molding, multilayer molding, and melt spinning.

The polyamide or polyamide composition according to the present embodiment can be preferably used as a raw material for automobile components. Examples of automobile components include an air intake system component, a cooling system component, an interior component, an exterior component, and an electronic component.

Examples of the automobile air intake system component are not especially limited, and may include an air intake manifold, an intercooler inlet, an exhaust pipe cover, an inner bushing, a bearing retainer, an engine mount, an engine head cover, a resonator, and a slot body.

Examples of the automobile cooling system component are not especially limited, and may include a chain cover, a thermostat housing, an outlet pipe, a radiator tank, an alternator, and a delivery pipe.

Examples of an automobile fuel system component are not especially limited, and may include a fuel delivery pipe and a gasoline tank case. Examples of the interior system component are not especially limited, and may include an instrument panel, a console box, a glove box, a steering wheel, and a trimming.

Examples of the external component are not especially limited, and may include a molding, a lamp housing, a front grill, a mud guard, a side bumper, a door mirror stay, and a roof rail.

Examples of the electrical component are not especially limited, and may include a connector, a wire harness connector, a motor component, a lamp socket, an on-board sensor switch, and a combination switch.

A molded product obtained from the polyamide composition according to the present embodiment, especially from the polyamide composition comprising the (C) copper compound and metal halide, has excellent heat resistance, rigidity, toughness, moldability, low water absorbance and the like. Further, such a molded product also has even better vibration fatigue resistance, fluidity, and heat aging resistance. Accordingly, this molded product can be preferably used as an automobile air intake system component.

The molded product has a strength half-life of preferably 40 days or more, more preferably 45 days or more, and still more preferably 50 days or more. Measurement of the strength half-life can be carried out based on the method described in the below examples.

By setting the strength half-life to be 40 days or more, an automobile air intake system component having excellent heat resistance, especially heat aging resistance, can be obtained.

The molded product has a breaking stress of preferably 45 MPa or more, more preferably 50 MPa or more, and still more preferably 55 MPa or more. Measurement of the breaking stress can be carried out based on the method described in the below examples.

By setting the breaking stress to be 45 MPa or more, an automobile air intake system component having excellent vibration fatigue resistance can be obtained.

The molded product preferably has a water absorbance of 5.0% or less, more preferably 4.0% or less, and still more preferably 3.0% or less. Measurement of the water absorbance can be carried out based on the method described in the below examples.

By setting the water absorbance to be 5.0% or less, an automobile air intake system component having excellent low water absorbance can be obtained.

A molded product obtained from the polyamide composition according to the present embodiment, especially from the polyamide composition comprising the (C) copper compound and metal halide, has excellent heat resistance, rigidity, toughness, moldability, and low water absorbance. Further, such a molded product also has even better LLC resistance. Accordingly, this molded product can be preferably used as an automobile cooling system component.

The molded product has a strength half-life of preferably 40 days or more, more preferably 45 days or more, and still more preferably 50 days or more. Measurement of the strength half-life can be carried out based on the method described in the below examples.

By setting the strength half-life to be 40 days or more, an automobile cooling system component having excellent heat resistance, especially heat aging resistance, can be obtained.

The molded product has a tensile strength retention rate after dipping of preferably 60% or more, more preferably 75% or more, and still more preferably 80% or more. Measurement of the tensile strength after dipping can be carried out based on the method described in the below examples.

By setting the tensile strength retention rate after dipping to be 60% or more, an automobile cooling system component having excellent LLC resistance can be obtained.

The molded product has a water absorbance of preferably 5.0% or less, more preferably 4.0% or less, and still more preferably 3.0% or less. Measurement of the water absorbance can be carried out based on the method described in the below examples.

By setting the water absorbance to be 5.0% or less, an automobile cooling system component having excellent low water absorbance can be obtained.

The molded product of the polyamide or polyamide composition according to the present embodiment can be obtained using commonly known plastic molding methods, such as press molding, injection molding, gas-assisted injection molding, welding molding, extrusion, blow molding, film molding, hollow molding, multilayer molding, and melt spinning.

The molded product obtained from the polyamide or polyamide composition according to the present embodiment has excellent heat resistance, toughness, moldability, and low water absorbance. Therefore, in addition to automobile uses, the polyamide or polyamide composition according to the present embodiment can be preferably used, for example, as a material for various parts, such as in electric and electronic parts, industrial materials, and daily and household articles. Further, the polyamide or polyamide composition according to the present embodiment can be preferably used in extrusion applications.

Examples of the electric and electronic parts are not especially limited, and may include a connector, a switch, a relay, a printed wiring board, an electronic component housing, a power point, a noise filter, a coil bobbin, and a motor end cap.

Examples of the industrial machinery are not especially limited, and may include a gear, a cam, an insulation block, a valve, a power tool component, an agricultural implement component, and an engine cover.

Examples of the daily and household articles are not especially limited, and may include a button, a food container, and office equipment.

Examples of the extrusion applications are not especially limited, and may include a film, a sheet, a filament, a tube, a rod, and a hollow molded product.

EXAMPLES

The present embodiment will now be described in more detail using the following examples and comparative examples. However, the present embodiment is not limited to only these examples.

The raw materials and measurement methods used in the examples and comparative examples are shown below. In the present embodiment, 1 kg/cm$^2$ refers to 0.098 MPa.

Raw Materials

The following compounds were used in the examples.
(a) Dicarboxylic acid
(1) 1,4-Cyclohexanedicarboxylic acid (CHDA), trade name 1,4-CHDA HP Grade (trans/cis (molar ratio)=25/75), manufactured by Eastman Chemical Company (2) Terephthalate acid (TPA), trade name Terephthalate acid, manufactured by Wako Pure Chemical Industries, Ltd.

(3) Adipic acid (ADA), trade name Adipic acid, manufactured by Wako Pure Chemical Industries, Ltd.

(4) Suberic acid (C8DA), trade name Suberic acid, manufactured by Wako Pure Chemical Industries, Ltd.

(5) Azelaic acid (C9DA), trade name Azelaic acid, manufactured by Wako Pure Chemical Industries, Ltd.

(6) Sebacic acid (C10DA), trade name Sebacic acid, manufactured by Wako Pure Chemical Industries, Ltd.

(7) Dodecanedioic acid (C12DA), trade name Dodecanedioic acid, manufactured by Wako Pure Chemical Industries, Ltd.

(8) Tetradecanedioic acid (C14DA), trade name Tetradecanedioic acid, manufactured by Tokyo Chemical Industry Co., Ltd.

(9) Hexadecanedioic acid (C16DA), trade name Hexadecanedioic acid, manufactured by Tokyo Chemical Industry Co., Ltd.

(b) Diamine

(10) 2-Methylpentamethylenediamine (2 MPD), trade name 2-Methyl-1,5-diaminopentane, manufactured by Tokyo Chemical Industry Co., Ltd.

(11) Hexamethylenediamine (HMD), trade name Hexamethylenediamine, manufactured by Wako Pure Chemical Industries, Ltd.

(12) 1,9-Nonamethylenediamine (NMD), trade name 1,9-Nonanediamine, manufactured by Sigma-Aldrich

(13) 2-Methyloctamethylenediamine (2MOD), produced with reference to the production method described in Japanese Patent Laid-Open No. 05-17413.

(14) Mixture of 2,2,4-trimethyl-1,6-hexanediamine and 2,4,4-trimethyl-1,6-hexanediamine (TMHD), trade name C,C,C-1,6-hexanediamine, manufactured by Sigma-Aldrich (B) Inorganic filler

(15) Glass fiber (GF), trade name ECS03T275H, average fiber diameter 10 μm φ, cut length 3 mm, manufactured by Nippon Electric Glass Co., Ltd.

(C) Copper compound and metal halide

(16) Copper iodide (CuI), trade name Copper iodide (I), manufactured by Wako Pure Chemical Industries, Ltd.

(17) Potassium iodide (KI), trade name Potassium iodide, manufactured by Wako Pure Chemical Industries, Ltd.

(18) Ethylene bis-stearylamide, trade name Armowax EBS, manufactured by Lion Corporation (D) Halogen-based flame retardant

(19) Polystyrene bromide, trade name SAYTEX® HP-7010G (bromine content based on elemental analysis: 63 mass %), manufactured by Albemarle Corporation (E) Phosphinate

(20) Aluminum diethylphosphinate (DEPA1), produced with reference to the production method described in Japanese Patent Laid-Open No. 08-73720.

(F) Stabilizer (F-1) Phenolic-based stabilizer

(21) N,N'-hexane-1,6-diylbis[3-(3,5-di-t-butyl-4-hydroxyphenyl propionamide)], trade name IRGANOX® 1098, manufactured by Ciba Japan (F-2) Phosphite-based stabilizer

(22) Bis(2,6-di-t-butyl-4-methylphenyl)pentaerythritol diphosphite, trade name ADEKA STAB® PEP-36, manufactured by ADEKA Corporation (F-3) Hindered amine-based stabilizer

(23) Bis-(2,2,6,6-tetramethyl 4-piperidyl)-sebacate, trade name Sanol® 770, manufactured by Ciba Japan (F-4) Triazine-based stabilizer

(24) 2-(2'-Hydroxy-4'-hexyloxyphenyl)-4,6-diphenyl-1,3,5-triazine, trade name TINUVIN® 167FF, manufactured by Ciba Japan (F-5) Inorganic phosphorus-based stabilizer

(25) Sodium hypophosphite, trade name Sodium hypophosphite, manufactured by Wako Pure Chemical Industries, Ltd.

(G) Flame retardant auxiliary

(26) Diantimony trioxide, trade name Diantimony trioxide, manufactured by Daiichi F.R.

(27) Zinc borate $2ZnO.3B_2O_3.3.5H_2O$, trade name Firebrake® ZB, manufactured by U.S. Borax

(28) Magnesium hydroxide, trade name Kisuma® 5, average particle size: 0.8 μm, manufactured by Kyowa Chemical Industry Co., Ltd.

(H) Polymer comprising an α,β-unsaturated dicarboxylic acid anhydride

(29) Copolymer of styrene and maleic anhydride, trade name DYLARK® 332 (copolymer of styrene 85 mass % and maleic anhydride 15 mass %), manufactured by NOVA Chemicals Amount of Polyamide Component Calculation The mol % of the (a-1) alicyclic dicarboxylic acid was determined by calculating the (number of moles of the (a-1) alicyclic dicarboxylic acid added as a raw material monomer/number of moles of all the (a) dicarboxylic acid added as a raw material monomer)×100.

The mol % of the (b-1) diamine having the substituent branched from the main chain was determined by calculating the (excluding the additionally-added portion, number of moles of the (b-1) diamine having the substituent branched from the main chain added as a raw material monomer/number of moles of all the (b) diamine added as a raw material monomer)×100.

Further, the mol % of the (c) lactam and/or aminocarboxylic acid was determined by calculating the (number of moles of the (c) lactam and/or aminocarboxylic acid added as a raw material monomer/number of moles of all the (a) dicarboxylic acid+number of moles of all the (b) diamine+number of moles of the (c) lactam and/or aminocarboxylic acid added as raw material monomers)×100.

Measurement Methods (1) Melting points Tm1, Tm2 (° C.)

Melting points Tm1, Tm2 were measured using the Diamond-DSC, manufactured by PERKIN-ELMER inc., based on JIS-K7121. Measurement was carried out under conditions of a nitrogen atmosphere, by taking Tm1 (° C.) as the temperature at the endothermic peak (melting peak) which appeared when the temperature of a specimen of about 10 mg was increased to 300 to 350° C. depending on the melting point of the sample at a rate of temperature increase of 20° C./min. Tm2 was taken as the temperature of the maximum peak temperature of the endothermic peaks (melting peaks) which appeared when, after maintaining the temperature in a melt state at the maximum temperature for 2 minutes, lowering the temperature to 30° C. at a rate of temperature decrease of 20° C./min and then after maintaining at 30° C. for 2 minutes, similarly increasing the temperature at a rate of temperature increase of 20° C./min. The total peak surface area was taken as the heat of fusion ΔH (J/g). In cases where there was a plurality of peaks, areas having a ΔH of 1 J/g or more were determined to be peaks. If there are two peaks, for example, one at a melting point of 295° C., ΔH=20 J/q, and another one at a melting point of 325° C., ΔH=5 J/g, the melting point was taken to be 325° C.

(2) Glass Transition Temperature Tg (° C.)

The glass transition temperature was measured using the Diamond-DSC, manufactured by PERKIN-ELMER Inc., based on JIS-K7121. Measurement was carried out under conditions of using liquid nitrogen to rapidly cool a molten sample obtained by melting a specimen with a hot stage (EP80, manufactured by Mettler) to solidify the sample for use as a measurement sample. Using 10 mg of this sample, the temperature was increased to a range of from 30 to 350° C. at a rate of temperature increase of 20° C./min, and the glass transition temperature was measured.

(3) Relative Viscosity ηr at 25° C.

Measurement of the relative viscosity at 25° C. was carried out based on JIS-K6810. More specifically, using 98% sulfuric acid, a 1% concentration solution (ratio of (polyamide 1 g)/(98% sulfuric acid 100 mL)) was prepared, and the relative viscosity was measured under temperature conditions of 25° C.

(4) Melt Shear Viscosity ηs (Pa·s)

Fluidity was evaluated in terms of the melt shear viscosity ηs at a shear rate of 1,000 sec$^{-1}$ under temperature conditions of +20° C. the melting point determined in the above item (1). More specifically, the measurement method was carried out using the twin capillary rheometer RH7-2 model manufactured by ROSAND (UK). Two orifices were used, which had a die diameter of 1.0 mm, a die inlet angle of 180°, and L/D of 16 and 0.25.

(5) Tensile Strength (MPa) and Tensile Elongation (%)

Tensile strength (MPa) and tensile elongation (%) were measured based on ASTM D638 using a dumbbell injection molding test piece (3 mm thick) for ASTM tensile testing. The molding test piece was molded by mounting a dumbbell test piece (3 mm thick) die (die temperature=Tg+20° C.) for ASTM tensile testing (ASTM D638) on an injection molding machine (PS40E, manufactured by Nissei Plastic Industrial Co., Ltd.), and molding at a cylinder temperature of (Tm2+10)° C. to (Tm2+30)° C.

(6) Water Absorbance (%)

The pre-testing mass (mass before water absorbance) of a dumbbell injection molding test piece (3 mm thick) for ASTM tensile testing was measured in a post-molding dry state (dry as mold). The test piece was dipped in 80° C. pure water for 24 hours. The test piece was then removed from the water, and moisture adhering to the surface was wiped off. The test piece was then left for 30 minutes under a constant-temperature constant-humidity (23° C., 50 RH %) atmosphere, and the post-molding mass (mass after water absorbance) was measured. The increase in the mass after water absorbance as compared with the mass before water absorbance was taken as the water absorbance amount. The average ratio of the water absorbance amount with respect to the mass before water absorbance for the number of test runs n=3 was taken as the water absorbance (%).

(7) Copper Concentration, Halogen Concentration, and Molar Ratio of Halogen and Copper (Halogen/Cu)

The copper concentration was quantified by charging sulfuric acid into a specimen, adding nitric acid to the resultant mixture while heating to dissolve the organic component, maintaining the volume of the solution constant with pure water, and quantifying the concentration by ICP emission analysis (high-frequency plasma emission analysis). A Vista-Pro manufactured by Seiko Instruments & Electronics Ltd. was used for the ICP emission analysis apparatus.

The halogen concentration was quantified by, using iodine as an example, combusting a specimen in a flask purged with high-purity oxygen, trapping the produced gas in an absorbing solution, and quantifying the iodine in the trapped solution using potentiometric titration with a 1/100 N silver nitrate solution.

The molar ratio of halogen and copper (halogen/Cu) was calculated using the above respective quantified values from the molecular weights converted into moles.

(8) Strength Half-Life (Days)

The dumbbell injection molding test piece (3 mm thick) for ASTM tensile testing described in the above item (5) was heat treated for a predetermined period in a hot-air oven at 200° C., and the tensile strength was measured based on ASTM-D638. Then, the tensile strength after the heat treatment as compared with the tensile strength before the heat treatment was calculated as the tensile strength retention rate. The length of heat treated time at which the tensile strength retention rate was 50% was taken as the strength half-life.

(9) Breaking Stress (MPa)

The dumbbell injection molding test piece (3 mm thick) for ASTM tensile testing described in the above item (5) was loaded with a tension load by a sinusoidal wave of frequency 20 Hz under a 120° C. atmosphere using the hydraulic servo fatigue testing machine EHF-50-10-3 manufactured by Saginomiya Seisakusho Co., Ltd., to determine the breaking stress (MPa) at 1,000,000 times.

(10) Color Tone b Value

Dumbbell injection molding test pieces (ASTM dumbbell, 3 mm thick) for ASTM tensile testing were obtained by injection molding a polymer pellet with an injection molding machine under injection molding conditions of a cylinder temperature of Tm2+30° C., a die temperature of Tg+20° C., and a molding cycle of 60 seconds. Using the Colorimeter ND-300A manufactured by Nippon Denshoku Industries Co., Ltd., the initial molded product color tone b value was determined. Measurement was carried out using 3 dumbbell injection molding test pieces, measuring each piece 3 times at a middle section of the widened portion on the opposite gate side, and taking the average value thereof.

(11) Color Tone Difference Δb

Dumbbell injection molding test pieces (ASTM dumbbell, 3 mm thick) for ASTM tensile testing were obtained by injection molding a polymer pellet with an injection molding machine under injection molding conditions of a cylinder temperature of Tm2+30° C., a die temperature of Tg+20° C., and a molding cycle of 60 seconds. Using the Colorimeter ND-300A manufactured by Nippon Denshoku Industries Co., Ltd., the color tone b values of the initial molded product and the molded product after 1,000 hours were determined. The difference between these values was taken as Δb. Measurement was carried out using 3 dumbbell injection molding test pieces, measuring each piece 3 times at a middle section of the widened portion on the opposite gate side, and taking the average value thereof.

(12) Color Difference ΔE

The color difference ΔE after 1,000 hours was evaluated for a natural color molded product based on ISO 4892-2 using a dumbbell injection molding test pieces (3 mm thick) for ASTM tensile testing. The Ci4000 (xenon lamp) manufactured by ATLAS was used as the testing machine. Using the Colorimeter ND-300A manufactured by Nippon Denshoku Industries Co., Ltd., the color difference (ΔE) between the initial molded product and the molded product after 1,000 hours was determined. Measurement was carried out using 3 dumbbell injection molding test pieces, measuring each piece 3 times at a middle section of the widened portion on the opposite gate side, and taking the average value thereof.

(13) Trans Isomer Ratio 30 to 40 mg of polyamide was dissolved in 1.2 g of hexafluoroisopropanol deuteride, and the trans isomer ratio was measured by $^1$H-NMR. For 1,4-cyclohexanedicarboxylic acid, the trans isomer ratio was determined from the ratio of the peak surface area at 1.98 ppm derived from trans isomers and the peak surface areas at 1.77 ppm and 1.86 ppm derived from cis isomers.

(14) Flame Resistance

Flame resistance was measured using the UL94 method (standard specified by Underwriters Laboratories Inc., U.S.A.). Molding of the test piece (127 mm long, 12.7 mm wide, and 1/32 inch thick) was carried out by mounting a die (die temperature=Tg+20° C.) of the UL test piece on an injection molding machine (PS40E, manufactured by Nissei Plastic Industrial Co., Ltd.), and performing molding at a cylinder temperature of (Tm2+20)° C. The injection pressure was +2% the full filling pressure during the molding of the UL test piece.

Flame graduation was based on the UL 94 standard (vertical burning test). Further, test pieces which failed V-2 were denoted as V-2 out.

(15) Flow Length (cm)

The flow length was determined by molding a 2 mm thick× 15 mm wide piece with a molding machine set to the below conditions, and evaluating based on the flow length thereof (filled length, cm).

Molding was carried out by mounting a fluidity evaluation (2 mm thick×15 mm wide spiral flow path) die (die temperature=Tg+20° C.) on an injection molding machine (FN3000, manufactured by Nissei Plastic Industrial Co., Ltd.), and performing molding at a cylinder temperature of Tm2+20° C., an injection rate at a 20% setting, and an injection pressure at a 34% setting.

(16) Full Filling Pressure (%)

The full filling pressure (%) during the UL test piece molding described in the above item (14) was shown.

The full filling pressure was determined by standardizing the injection rates (99%) and measuring the minimum pressure capable of completely filling melted resin into the filling end inside the die, and calculating the full filling pressure as a percentage of the maximum pressure that the molding machine can apply.

(17) Tensile Strength Retention Rate after Dipping (%)

The dumbbell injection molding test piece (3 mm thick) for ASTM tensile testing of the above item (5) was dipped for 1,000 hours in a 130° C. aqueous solution of 50% ethylene glycol. After leaving at room temperature, the tensile test of the above item (5) was carried out to measure tensile strength. The tensile strength retention rate after dipping was determined as a ratio with respect to the tensile strength measured after the molding.

Example 1

A polyamide polymerization reaction was carried out by "hot melt polymerization".

896 g (5.20 mol) of (a) CHDA and 604 g (5.20 mol) of (b) 2 MPD were dissolved in 1,500 g of distilled water to produce an equimolar 50 mass % uniform aqueous solution of the raw material monomers. 15 g (0.13 mol) of 2 MPD was additionally added to this uniform solution.

The obtained aqueous solution was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (in the following, pressure in the tank is always expressed as gauge pressure), about 2.5 kg/cm$^2$ (the solution temperature in this system was about 145° C.). While removing water from the system to maintain the pressure in the tank at about 2.5 kg/cm$^2$, heating was continued so that the concentration of the aqueous solution was concentrated to about 75% (the solution temperature in this system was about 160° C.). Removal of water was stopped, and then heating was continued until the pressure in the tank was about 30 kg/cm$^2$ (the solution temperature in this system was about 245° C.) While removing water from the system to maintain the pressure in the tank at about 30 kg/cm$^2$, heating was continued until 50° C. below the final temperature. After the solution temperature increased to 50° C. below the final temperature (here, 300° C.), while continuing heating, the pressure in the tank was lowered over about 120 minutes to atmospheric pressure (gauge pressure of 0 kg/cm$^2$).

Subsequently, the heater temperature was adjusted so that the final temperature of the resin temperature (solution temperature) would be about 350° C. With the resin temperature in that state, the tank contents were kept for 30 minutes under a reduced pressure of 400 Torr by a vacuum apparatus. Then, the pressure was increased with nitrogen, and the resin was formed into a strand from a lower spinneret (nozzle). This strand was water cooled and cut, then discharged in pellet form to obtain a polyamide. Table 4 shows the measurement results of measurements carried out on the obtained polyamide based on the above-described measurement methods.

Examples 2 to 21

Polyamide polymerization ("hot melt polymerization") was carried out by the method described in Example 1, except that the compounds and amounts shown in Table 1 or 2 were used for the (a) dicarboxylic acid, (b) diamine, and (c) lactam and/or aminocarboxylic acid, and that the resin final temperature was the temperature shown in Table 4 or 5. Tables 4 and 5 show the measurement results of measurements carried out on the obtained polyamides based on the above-described measurement methods.

Comparative Example 1

Polyamide polymerization ("hot melt polymerization") was carried out by the method described in Example 1, except that the compounds and amounts shown in Table 3 were used for the (a) dicarboxylic acid, (b) diamine, and (c) lactam and/or aminocarboxylic acid, and that the resin final temperature was the temperature shown in Table 6.

In Comparative Example 1, during the polymerization, since the resin solidified in the autoclave, a strand could not be extracted. Therefore, after cooling, the solidified product was extracted as a lump. This lump was ground with a grinder to form roughly pellet-sized objects. Since foaming was severe during molding, a molded product could not be obtained.

Comparative Examples 2 to 7

Polyamide polymerization ("hot melt polymerization") was carried out by the method described in Example 1, except that the compounds and amounts shown in Table 3 were used for the (a) dicarboxylic acid, (b) diamine, and (c) lactam and/or aminocarboxylic acid, and that the resin final temperature was the temperature shown in Table 6. Table 6 shows the measurement results of measurements carried out on the obtained polyamides based on the above-described measurement methods.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (a) Dicarboxylic Acid | Type | CHDA | CHDA | CHDA | CHDA | CHDA | CHDA | CHDA | CHDA | CHDA | CHDA |
|  | g | 896 | 896 | 896 | 896 | 896 | 896 | 730 | 469 | 719 | 851 |
|  | Moles | 5.20 | 5.20 | 5.20 | 5.20 | 5.20 | 5.20 | 4.24 | 2.72 | 4.18 | 4.94 |
|  | Type | — | — | — | — | — | — | ADA | ADA | TPA | — |
|  | g | — | — | — | — | — | — | 155 | 398 | 174 | — |
|  | Moles | — | — | — | — | — | — | 1.06 | 2.72 | 1.04 | — |
| (b) Diamine | Type | 2MPD | 2MPD | 2MPD | 2MPD | 2MPD | 2MPD | 2MPD | 2MPD | 2MPD | 2MPD |
|  | g | 604 | 544 | 484 | 423 | 363 | 302 | 369 | 380 | 364 | 574 |
|  | Moles | 5.20 | 4.68 | 4.16 | 3.64 | 3.12 | 2.60 | 3.18 | 3.27 | 3.13 | 4.94 |
|  | Type | — | HMD | HMD | HMD | HMD | HMD | HMD | HMD | HMD | — |
|  | g | — | 60 | 121 | 181 | 242 | 302 | 246 | 253 | 243 | — |
|  | Moles | — | 0.52 | 1.04 | 1.56 | 2.08 | 2.60 | 2.12 | 2.18 | 2.09 | — |
|  | Type | 2MPD | 2MPD | 2MPD | 2MPD | 2MPD | 2MPD | 2MPD | 2MPD | 2MPD | 2MPD |
|  | g | 15 | 14 | 12 | 11 | 9 | 8 | 9 | 9 | 9 | 14 |
|  | Moles | 0.13 | 0.12 | 0.10 | 0.09 | 0.08 | 0.07 | 0.08 | 0.08 | 0.08 | 0.12 |
| (c) Lactam and/or Aminocarboxylic Acid | Type | — | — | — | — | — | — | — | — | — | CPL |
|  | g | — | — | — | — | — | — | — | — | — | 75 |
|  | Moles | — | — | — | — | — | — | — | — | — | 0.66 |

TABLE 2

|  |  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| (a) Dicarboxylic Acid | Type | CHDA | CHDA | CHDA | CHDA | CHDA | CHDA | CHDA | CHDA | CHDA | CHDA | CHDA |
|  | g | 730 | 715 | 709 | 702 | 689 | 676 | 664 | 518 | 484 | 518 | 469 |
|  | Moles | 4.24 | 4.16 | 4.12 | 4.08 | 4.00 | 3.93 | 3.86 | 3.01 | 2.81 | 3.01 | 2.72 |
|  | Type | ADA | C8DA | C9DA | C10DA | C12DA | C14DA | C16DA | ADA | ADA | ADA | ADA |
|  | g | 155 | 181 | 194 | 206 | 230 | 254 | 276 | 293 | 274 | 293 | 398 |
|  | Moles | 1.06 | 1.04 | 1.03 | 1.02 | 1.00 | 0.98 | 0.96 | 2.01 | 1.87 | 2.01 | 2.72 |
| (b) Diamine | Type | 2MPD | 2MPD | 2MPD | 2MPD | 2MPD | 2MPD | 2MPD | 2MOD | 2MOD | TMHD | 2MPD |
|  | g | 616 | 604 | 598 | 592 | 581 | 570 | 560 | 397 | 371 | 397 | 316 |
|  | Moles | 5.30 | 5.19 | 5.14 | 5.10 | 5.00 | 4.91 | 4.82 | 2.51 | 2.34 | 2.51 | 2.72 |
|  | Type | — | — | — | — | — | — | — | HMD | NMD | HMD | HMD |
|  | g | — | — | — | — | — | — | — | 291 | 371 | 291 | 316 |
|  | Moles | — | — | — | — | — | — | — | 2.51 | 2.34 | 2.51 | 2.72 |
|  | Type | 2MPD | 2MPD | 2MPD | 2MPD | 2MPD | 2MPD | 2MPD | — | — | — | 2MPD |
|  | g | 15 | 15 | 15 | 15 | 15 | 14 | 14 | — | — | — | 8 |
|  | Moles | 0.13 | 0.13 | 0.13 | 0.13 | 0.12 | 0.12 | 0.12 | — | — | — | 0.07 |
| (c) Lactam and/or Aminocarboxylic Acid | Type | — | — | — | — | — | — | — | — | — | — | — |
|  | g | — | — | — | — | — | — | — | — | — | — | — |
|  | Moles | — | — | — | — | — | — | — | — | — | — | — |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| (a) Dicarboxylic Acid | Type | CHDA | CHDA | CHDA | — | TPA | CHDA | — |
|  | g | 896 | 379 | 287 | — | 689 | 320 | — |
|  | Moles | 5.20 | 2.20 | 1.67 | — | 4.00 | 1.86 | — |
|  | Type | — | ADA | ADA | TPA | C12DA | C12DA | ADA |
|  | g | — | 482 | 568 | 883 | 230 | 641 | 836 |
|  | Moles | — | 3.30 | 3.89 | 5.31 | 1.00 | 2.78 | 5.72 |
| (b) Diamine | Type | 2MPD | 2MPD | — | 2MPD | 2MPD | 2MPD | — |
|  | g | 242 | 383 | -3 | 370 | 581 | 539 | — |
|  | Moles | 2.08 | 3.30 | — | 3.19 | 5.00 | 4.64 | — |
|  | Type | HMD | HMD | HMD | HMD | — | — | HMD |
|  | g | 363 | 256 | 645 | 247 | — | — | 664 |
|  | Moles | 3.12 | 2.20 | 5.55 | 2.13 | — | — | 5.72 |
|  | Type | 2MPD | 2MPD | — | 2MPD | 2MPD | 2MPD | — |
|  | g | 6 | 10 | — | 9 | 15 | 13 | — |
|  | Moles | 0.05 | 0.08 | — | 0.08 | 0.12 | 0.12 | — |
| (c) Lactam and/or Aminocarboxylic Acid | Type | — | — | — | — | — | — | — |
|  | g | — | — | — | — | — | — | — |
|  | Moles | — | — | — | — | — | — | — |

TABLE 4

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (a) Dicarboxylic Acid | Type | CHDA | CHDA | CHDA | CHDA | CHDA | CHDA | CHDA | CHDA | CHDA | CHDA |
|  | Mol % in (a) | 100 | 100 | 100 | 100 | 100 | 100 | 80 | 50 | 80 | 100 |
|  | Type | — | — | — | — | — | — | ADA | ADA | TPA | — |
|  | Mol % in (a) | — | — | — | — | — | — | 20 | 50 | 20 | — |
| (b) Diamine | Type | 2MPD | 2MPD | 2MPD | 2MPD | 2MPD | 2MPD | 2MPD | 2MPD | 2MPD | 2MPD |
|  | Mol % in (b) | 100 | 90 | 80 | 70 | 60 | 50 | 60 | 60 | 60 | 100 |
|  | Type | — | HMD | HMD | HMD | HMD | HMD | HMD | HMD | HMD | — |
|  | Mol % in (b) | — | 10 | 20 | 30 | 40 | 50 | 40 | 40 | 40 | — |
| Mol % of [(a) + (b)] in [(a) + (b) + (c)] |  | 100 | 100 | 100 | 100 | 100 | 100 | 100 | 100 | 100 | 93.7 |
| (c) Lactam and/or Aminocarboxylic Acid | Type | — | — | — | — | — | — | — | — | — | CPL |
| Mol % of (c) in [(a) + (b) + (c)] |  | — | — | — | — | — | — | — | — | — | 6.3 |
| Final Temperature of Resin Temperature | °C. | 350 | 350 | 350 | 350 | 340 | 350 | 320 | 300 | 330 | 330 |
| Melting Point Tm2 | °C. | 327 | 325 | 323 | 327 | 319 | 330 | 290 | 275 | 308 | 306 |
| Trans isomer ratio | % | 70 | 71 | 70 | 70 | 70 | 71 | 70 | 70 | 70 | 68 |
| Glass Transition Temperature Tg | °C. | 143 | 149 | 150 | 146 | 146 | 145 | 120 | 100 | 142 | 143 |
| Relative Viscosity ηr at 25° C. |  | 2.1 | 1.9 | 1.9 | 2.0 | 2.0 | 2.0 | 2.2 | 2.2 | 2.0 | 1.9 |
| Melt Shear Viscosity ηs | Pa·s | 71 | 50 | 55 | 58 | 67 | 73 | 70 | 70 | 85 | 45 |
| Tensile Strength | MPa | 101 | 95 | 95 | 94 | 93 | 92 | 89 | 92 | 91 | 92 |
| Tensile Elongation | % | 7 | 7 | 7 | 7 | 6 | 8 | 12 | 15 | 4 | 10 |
| Water Absorption | % | 2.7 | 2.9 | 2.8 | 2.5 | 2.6 | 2.6 | 4.6 | 5.0 | 2.4 | 3.5 |
| Color Tone b Value |  | −8 | −8 | −7 | −7 | −7 | −7 | −6 | −6 | −5 | −8 |

TABLE 5

|  |  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| (a) Dicarboxylic Acid | Type | CHDA | CHDA | CHDA | CHDA | CHDA | CHDA | CHDA | CHDA | CHDA | CHDA | CHDA |
|  | Mol % in (a) | 80 | 80 | 80 | 80 | 80 | 80 | 80 | 60 | 60 | 60 | 50 |
|  | Type | ADA | C8DA | C9DA | C10DA | C12DA | C14DA | C16DA | ADA | ADA | ADA | ADA |
|  | Mol % in (a) | 20 | 20 | 20 | 20 | 20 | 20 | 20 | 40 | 40 | 40 | 50 |
| (b) Diamine | Type | 2MPD | 2MPD | 2MPD | 2MPD | 2MPD | 2MPD | 2MPD | 2MOD | 2MOD | TMHD | 2MPD |
|  | Mol % in (b) | 100 | 100 | 100 | 100 | 100 | 100 | 100 | 50 | 50 | 50 | 50 |
|  | Type | — | — | — | — | — | — | — | HMD | NMD | HMD | HMD |
|  | Mol % in (b) | — | — | — | — | — | — | — | 50 | 50 | 50 | 50 |
| Mol % of [(a) + (b)] in [(a) + (b) + (c)] |  | 100 | 100 | 100 | 100 | 100 | 100 | 100 | 100 | 100 | 100 | 100 |
| (c) Lactam and/or Aminocarboxylic Acid | Type | — | — | — | — | — | — | — | — | — | — | — |
| Mol % of (c) in [(a) + (b) + (c)] |  | — | — | — | — | — | — | — | — | — | — | — |
| Final Temperature of Resin Temperature | °C. | 320 | 320 | 320 | 320 | 330 | 320 | 320 | 320 | 330 | 320 | 300 |
| Melting Point Tm2 | °C. | 295 | 292 | 290 | 288 | 286 | 279 | 276 | 275 | 289 | 278 | 270 |
| Trans isomer ratio | % | 70 | 71 | 72 | 70 | 72 | 70 | 68 | 70 | 69 | 70 | 71 |
| Glass Transition Temperature Tg | °C. | 125 | 123 | 121 | 120 | 119 | 115 | 110 | 113 | 100 | 102 | 103 |
| Relative Viscosity ηr at 25° C. |  | 2.0 | 2.0 | 2.0 | 2.0 | 2.0 | 2.0 | 2.0 | 2.1 | 1.9 | 2.0 | 2.0 |
| Melt Shear Viscosity ηs | Pa·s | 76 | 73 | 71 | 66 | 66 | 53 | 50 | 61 | 55 | 63 | 68 |
| Tensile Strength | MPa | 97 | 96 | 94 | 92 | 91 | 90 | 87 | 91 | 85 | 83 | 93 |
| Tensile Elongation | % | 7 | 12 | 15 | 23 | 25 | 27 | 29 | 12 | 6 | 7 | 11 |
| Water Absorption | % | 3.5 | 3.0 | 3.0 | 2.9 | 2.8 | 2.8 | 2.6 | 3.9 | 2.8 | 3.7 | 4.8 |
| Color Tone b Value |  | −8 | −7 | −8 | −7 | −8 | −6 | −8 | −8 | −7 | −6 | −8 |

TABLE 6

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| (a) Dicarboxylic Acid | Type | CHDA | CHDA | CHDA | — | TPA | CHDA | — |
|  | Mol % in (a) | 100 | 40 | 30 | — | 80 | 40 | — |
|  | Type | — | ADA | ADA | TPA | C12DA | C12DA | ADA |
|  | Mol % in (a) | — | 60 | 70 | 100 | 20 | 60 | 100 |
| (b) Diamine | Type | 2MPD | 2MPD | — | 2MPD | 2MPD | 2MPD | — |
|  | Mol % in (b) | 40 | 60 | — | 60 | 100 | 100 | — |
|  | Type | HMD | HMD | HMD | HMD | — | — | HMD |
|  | Mol % in (b) | 60 | 40 | 100 | 40 | — | — | 100 |
| Mol % of [(a) + (b)] in [(a) + (b) + (c)] |  | 100 | 100 | 100 | 100 | 100 | 100 | 100 |
| (c) Lactam and/ or Aminocarboxylic Acid | Type | — | — | — | — | — | — | — |
| Mol % of (c) in [(a) + (b) + (c)] |  | — | — | — | — | — | — | — |
| Final Temperature of Resin Temperature | °C. | 380 | 300 | 320 | 340 | 300 | 290 | 290 |
| Melting Point Tm2 | °C. | 352 | 268 | 290 | 310 | 278 | 266 | 262 |
| Trans isomer ratio | % | 72 | 70 | 70 | — | — | 68 | — |
| Glass Transition Temperature Tg | °C. | 145 | 89 | 74 | 135 | 118 | 82 | 55 |
| Relative Viscosity ηr at 25° C. |  | 1.9 | 2.2 | 2.0 | 1.9 | 2.0 | 2.2 | 2.1 |
| Melt Shear Viscosity ηs | Pa·s | Not measurable | 80 | 71 | 150 | 147 | 65 | 70 |
| Tensile Strength | MPa | Molding impossible | 90 | 89 | 87 | 87 | 60 | 80 |
| Tensile Elongation | % |  | 8 | 10 | 2 | 4 | 38 | 25 |
| Water Absorption | % |  | 6.2 | 6.1 | 2.4 | 2.6 | 2.1 | 6.5 |
| Color Tone b Value |  |  | −5 | −7 | 2 | 1 | −7 | −8 |

As is clear from the results of Tables 4 to 6, the polyamides of Examples 1 to 21, in which a specific (a) and (b) were polymerized, had especially excellent properties for all of heat resistance, fluidity, toughness, low water absorbance, and rigidity.

In contrast, in Comparative Example 1, which is a polyamide comprising less than 50 mol % of 2-methylpentamethylenediamine, the resin solidified during the copolymerization. Consequently, not only could the polyamide not be extracted as a strand, but a molded product could not be obtained.

Further, for the polyamide of Comparative Example 4, which was produced by the method disclosed in Patent Document 1, fluidity was too low, and the molding properties were insufficient. In addition, toughness was also insufficient.

Example 22

A polyamide polymerization reaction was carried out by "hot melt polymerization/solid phase polymerization".

The hot melt polymerization was carried out using the same charged amounts and the same procedures as in Example 1 to obtain a polyamide (polyamide (I)). Table 7 shows the measurement results of measurements carried out on the obtained polyamide based on the above-described measurement methods. 1,300 g of the obtained polyamide was charged into a ribbon stirring type heating apparatus for solid phase polymerization (Ribocone, manufactured by Okawara Corporation), and the heating apparatus was purged with nitrogen at room temperature. While still flowing nitrogen, heating was carried out for 12 hours so that the resin temperature was 200° C. Subsequently, while still flowing nitrogen, the temperature was lowered. At about 50° C., the resin was extracted from the apparatus still as a pellet to obtain a polyamide (polyamide (II)). Table 7 shows the measurement results of measurements carried out on the obtained polyamide based on the above-described measurement methods.

Compared with polyamide (I), polyamide (II), which had been subjected to solid phase polymerization, had an increased relative viscosity at 25° C. and an increased tensile elongation. There was no change in the trans isomer ratio before and after the solid phase polymerization. Further, the degree of coloration also did not change.

Table 7 also shows the measurement results of measurements carried out on the polyamide of Example 1 obtained by hot melt polymerization based on the above-described measurement methods.

Example 23

A polyamide polymerization reaction was carried out by "prepolymer/solid phase polymerization".

500 g of distilled water was charged into 896 g (5.20 mol) of (a) CHDA and 604 g (5.20 mol) of (b) 2 MPD to produce an equimolar 33 mass slurry of the raw material monomers. 15 g (0.13 mol) of 2 MPD was additionally added to this slurry.

The obtained slurry was charged into an autoclave having an internal volume of 5.4 L (manufactured by Nitto Kouatsu Co., Ltd.). The contents of the autoclave were purged with nitrogen. After stirring for 30 minutes at the solution temperature of 100° C., the temperature was increased over 2 hours to 200° C. At this stage, the pressure in the autoclave tank was 22 kg/cm$^2$. The temperature was increased to 220° C. The slurry was kept for 2 hours while removing water from the system to maintain the pressure in the tank at 22 kg/cm$^2$. The pressure in the tank was then lowered over 60 minutes to atmospheric pressure (gauge pressure of 0 kg/cm$^2$). Subsequently, the resin temperature (solution temperature) was lowered to room temperature, and a flange at a lower portion of the autoclave was removed, whereby a solid-state polyamide prepolymer was obtained (polyamide (I)). Table 7 shows the measurement results of measurements carried out on the obtained prepolymer based on the above-described measurement methods. The trans isomer ratio of 1,4-cyclohexanedicarboxylic acid of the prepolymer was 85%. Further, coloration was seen for the polyamide (I).

Solid phase polymerization was carried out in the same manner as in Example 22 using 1,300 g of the obtained prepolymer to obtain a polyamide (polyamide (II)). Table 7 shows the measurement results of measurements carried out on the obtained polyamide based on the above-described measurement methods. Compared with the prepolymer, although the polyamide (II) had an increased relative viscosity, coloration was observed.

Example 24

A polyamide polymerization reaction was carried out by "prepolymer/extrusion polymerization".

The prepolymer was produced using the same charged amounts and the same procedures as in Example 23 to obtain a polyamide prepolymer (polyamide (I)). Using 1,300 g of the obtained prepolymer, post-polymerization was carried out using an extrusion polymerization apparatus (KRC Kneader, manufactured by Kurimoto, Ltd.) The prepolymer was introduced with a jacket temperature of 350° C. and a degree of vacuum of −0.5 MPa (gauge pressure) so that the dwell time would be 30 minutes. The strand was cooled and cut to obtain a polyamide as a pellet (polyamide (II)). Table 7 shows the measurement results of measurements carried out on the obtained polyamide based on the above-described measurement methods. Compared with the prepolymer, although the polyamide (II) had an increased relative viscosity at 25° C., coloration was observed.

TABLE 7

|  |  |  | Example 1 | Example 22 | Example 23 | Example 24 |
|---|---|---|---|---|---|---|
| (a) Dicarboxylic Acid | | Type | CHDA | CHDA | CHDA | CHDA |
| | | Mol % in (a) | 100 | 100 | 100 | 100 |
| | | Type | — | — | — | — |
| | | Mol % in (a) | — | — | — | — |
| (b) Diamine | | Type | 2MPD | 2MPD | 2MPD | 2MPD |
| | | Mol % in (b) | 100 | 100 | 100 | 100 |
| | | Type | — | — | — | — |
| | | Mol % in (b) | — | — | — | — |
| Mol % of [(a) + (b)] in [(a) + (b) + (c)] | | | 100 | 100 | 100 | 100 |
| (c) Lactam and/or Aminocarboxylic Acid | | Type | — | — | — | — |
| Mol % of (c) in [(a) + (b) + (c)] | | | — | — | — | — |
| Polymerization Conditions | | | Hot melt polymerization | Hot melt polymerization | Prepolymer | Prepolymer |
| Resin Polymerization Temperature | | ° C. | 350 | 350 | 220 | 220 |
| (I) | Melting Point Tm1 | ° C. | — | 328 | 350 | 350 |
| | Trans isomer ratio | % | — | 70 | 85 | 85 |
| | Relative Viscosity ηr at 25° C. | | — | 2.1 | 1.7 | 1.7 |
| Conditions for Increase in Degree of Polymerization | | | — | Solid phase polymerization | Solid phase polymerization | Extrusion polymerization |
| Temperature for Increase in Degree of Polymerization | | ° C. | — | 200 | 200 | 350 |
| (II) | Melting Point Tm1 | ° C. | 328 | 329 | 350 | 328 |
| | Trans isomer ratio | % | 70 | 71 | 85 | 70 |
| | Glass Transition Temperature Tg | ° C. | 143 | 147 | 145 | 145 |
| | Relative Viscosity ηr at 25° C. | | 2.1 | 2.4 | 2.3 | 2.2 |
| | Melt Shear Viscosity ηs | Pa·s | 71 | 121 | 140 | 100 |
| | Tensile Strength | MPa | 101 | 105 | 100 | 98 |
| | Tensile Elongation | % | 7 | 15 | 6 | 5 |
| | Water Absorption | % | 2.7 | 2.6 | 2.6 | 2.7 |
| | Color Tone b Value | | −8 | −8 | 3 | 4 |

Polyamide Composition Comprising (B) Inorganic Filler

Example 25

The polyamide of Example 1 was used by drying under a nitrogen flow so that the moisture content was adjusted to about 0.2 mass %. Using a twin-screw extruder (TEM 35, φL/D=47.6, set temperature 340° C., screw revolution speed 300 rpm, manufactured by Toshiba Machine Co., Ltd.), this dried polyamide was fed from a top feed opening provided at the uppermost upstream portion of the extruder. Glass fiber (GF) was fed from a side feed opening on a downstream side of the extruder (the resin fed from the top feed opening was in a sufficiently molten state). A melt kneaded product extruded from a die head was cooled in a strand form, which was pelletized to form polyamide composition pellets. The blend amount was 55 parts by mass of glass fiber (GF) based on 100 parts by mass of polyamide. Table 8 shows the measurement results of measurements carried out on the obtained polyamide composition based on the above-described measurement methods.

Examples 26 to 45

Examples 26 to 45 were carried out in the same manner as Example 25, except that the respective polyamides of Examples 2 to 21 were used instead of the polyamide of Example 1. Tables 8 and 9 show the measurement results of measurements carried out on the obtained polyamide compositions based on the above-described measurement methods.

Example 46

Example 46 was carried out in the same manner as Example 29, except that 100 parts by mass of glass fiber (GF) based on 100 parts by mass of polyamide was used. Table 9 shows the measurement results of measurements carried out on the obtained polyamide composition based on the above-described measurement methods.

Comparative Example 8

An attempt was made to carry out Comparative Example 8 in the same manner as Example 25, except the polyamide of Comparative Example 1 was used instead of the polyamide of Example 1. However, the extrusion state was very unstable, and a polyamide composition could not be obtained.

Comparative Examples 9 and 10

Comparative Examples 9 and 10 were carried out in the same manner as Example 25, except that the respective polyamides of Comparative Examples 2 and 3 were used instead of the polyamide of Example 1. Table 10 shows the measurement results of measurements carried out on the obtained polyamide compositions based on the above-described measurement methods.

Comparative Example 11

Comparative Example 11 was carried out in the same manner as Example 25, except that the polyamide of Comparative Example 4 was used instead of the polyamide of Example 1, and 100 parts by mass of glass fiber (GF) based on 100 parts by mass of polyamide was used. Table 10 shows the measurement results of measurements carried out on the obtained polyamide composition based on the above-described measurement methods.

Comparative Examples 12 to 14

Comparative Examples 12 to 14 were carried out in the same manner as Example 25, except that the respective polyamides of Comparative Examples 5 to 7 were used instead of the polyamide of Example 1. Table 10 shows the measurement results of measurements carried out on the obtained polyamide compositions based on the above-described measurement methods.

TABLE 8

| | | | Example 25 | Example 26 | Example 27 | Example 28 | Example 29 | Example 30 | Example 31 | Example 32 | Example 33 | Example 34 |
|---|---|---|---|---|---|---|---|---|---|---|---|---|
| (A) | (a) Dicarboxylic Acid | Type | CHDA | CHDA | CHDA | CHDA | CHDA | CHDA | CHDA | CHDA | CHDA | CHDA |
| | | Mol % in (a) | 100 | 100 | 100 | 100 | 100 | 100 | 80 | 50 | 80 | 100 |
| | | Type | — | — | — | — | — | — | ADA | ADA | TPA | — |
| | | Mol % in (a) | — | — | — | — | — | — | 20 | 50 | 20 | — |
| | (b) Diamine | Type | 2MPD | 2MPD | 2MPD | 2MPD | 2MPD | 2MPD | 2MPD | 2MPD | 2MPD | 2MPD |
| | | Mol % in (b) | 100 | 90 | 80 | 70 | 60 | 50 | 60 | 60 | 60 | 100 |
| | | Type | — | HMD | HMD | HMD | HMD | HMD | HMD | HMD | HMD | — |
| | Mol % in (b) | | — | 10 | 20 | 30 | 40 | 50 | 40 | 40 | 40 | — |
| | Mol % of [(a) + (b)] in [(a) + (b) + (c)] | | 100 | 100 | 100 | 100 | 100 | 100 | 100 | 100 | 100 | 93.7 |
| | (c) Lactam and/or Aminocarboxylic Acid | Type | — | — | — | — | — | — | — | — | — | CPL |
| | Mol % of (c) in [(a) + (b) + (c)] | | — | — | — | — | — | — | — | — | — | 6.3 |
| | Melting Point Tm2 | ° C. | 327 | 325 | 323 | 327 | 319 | 330 | 290 | 275 | 308 | 306 |
| | Glass Transition Temperature Tg | ° C. | 143 | 149 | 150 | 146 | 146 | 145 | 120 | 100 | 142 | 143 |
| | Relative Viscosity ηr at 25° C. | | 2.1 | 1.9 | 1.9 | 2.0 | 2.0 | 2.0 | 2.2 | 2.2 | 2.0 | 1.9 |
| (B) | Inorganic Filler | Type | GF | GF | GF | GF | GF | GF | GF | GF | GF | GF |
| | | Parts by mass based on 100 parts by mass of (A) | 55 | 55 | 55 | 55 | 55 | 55 | 55 | 55 | 55 | 55 |

TABLE 8-continued

|  |  | Example 25 | Example 26 | Example 27 | Example 28 | Example 29 | Example 30 | Example 31 | Example 32 | Example 33 | Example 34 |
|---|---|---|---|---|---|---|---|---|---|---|---|
| Melt Shear Viscosity ηs | Pa·s | 108 | 70 | 79 | 84 | 101 | 111 | 106 | 106 | 133 | 61 |
| Tensile Strength | MPa | 216 | 212 | 212 | 211 | 210 | 210 | 208 | 210 | 209 | 210 |
| Tensile Elongation | % | 3.1 | 3.1 | 3.1 | 3.1 | 3.0 | 3.1 | 3.2 | 3.3 | 3.0 | 3.2 |
| Water Absorption | % | 1.9 | 2.1 | 2.0 | 1.8 | 1.6 | 1.6 | 3.3 | 3.5 | 1.5 | 2.5 |

TABLE 9

|  |  |  | Example 35 | Example 36 | Example 37 | Example 38 | Example 39 | Example 40 |
|---|---|---|---|---|---|---|---|---|
| (A) | (a) Dicarboxylic Acid | Type | CHDA | CHDA | CHDA | CHDA | CHDA | CHDA |
|  |  | Mol % in (a) | 80 | 80 | 80 | 80 | 80 | 80 |
|  |  | Type | ADA | C8DA | C9DA | C10DA | C12DA | C14DA |
|  |  | Mol % in (a) | 20 | 20 | 20 | 20 | 20 | 20 |
|  | (b) Diamine | Type | 2MPD | 2MPD | 2MPD | 2MPD | 2MPD | 2MPD |
|  |  | Mol % in (b) | 100 | 100 | 100 | 100 | 100 | 100 |
|  |  | Type | — | — | — | — | — | — |
|  |  | Mol % in (b) | — | — | — | — | — | — |
|  | Mol % of [(a) + (b)] in [(a) + (b) + (c)] |  | 100 | 100 | 100 | 100 | 100 | 100 |
|  | (c) Lactam and/or Aminocarboxylic Acid | Type | — | — | — | — | — | — |
|  | Mol % of (c) in [(a) + (b) + (c)] |  | — | — | — | — | — | — |
|  | Melting Point Tm2 | °C. | 295 | 292 | 290 | 288 | 286 | 279 |
|  | Glass Transition Temperature Tg | °C. | 125 | 123 | 121 | 120 | 119 | 115 |
|  | Relative Viscosity ηr at 25°C. |  | 2.0 | 2.0 | 2.0 | 2.0 | 2.0 | 2.0 |
| (B) | Inorganic Filler | Type | GF | GF | GF | GF | GF | GF |
|  |  | Parts by mass based on 100 parts by mass of (A) | 55 | 55 | 55 | 55 | 55 | 55 |
| Melt Shear Viscosity ηs | Pa·s |  | 117 | 111 | 108 | 99 | 99 | 75 |
| Tensile Strength | MPa |  | 213 | 212 | 211 | 210 | 209 | 209 |
| Tensile Elongation | % |  | 3.1 | 3.2 | 3.3 | 3.5 | 3.6 | 3.7 |
| Water Absorption | % |  | 2.5 | 2.1 | 2.1 | 2.1 | 2.0 | 2.0 |

|  |  |  | Example 41 | Example 42 | Example 43 | Example 44 | Example 45 | Example 46 |
|---|---|---|---|---|---|---|---|---|
| (A) | (a) Dicarboxylic Acid | Type | CHDA | CHDA | CHDA | CHDA | CHDA | CHDA |
|  |  | Mol % in (a) | 80 | 60 | 60 | 60 | 50 | 100 |
|  |  | Type | C16DA | ADA | ADA | ADA | ADA | — |
|  |  | Mol % in (a) | 20 | 40 | 40 | 40 | 50 | — |
|  | (b) Diamine | Type | 2MPD | 2MOD | 2MOD | TMHD | 2MPD | 2MPD |
|  |  | Mol % in (b) | 100 | 50 | 50 | 50 | 50 | 60 |
|  |  | Type | — | HMD | NMD | HMD | HMD | HMD |
|  |  | Mol % in (b) | — | 50 | 50 | 50 | 50 | 40 |
|  | Mol % of [(a) + (b)] in [(a) + (b) + (c)] |  | 100 | 100 | 100 | 100 | 100 | 100 |
|  | (c) Lactam and/or Aminocarboxylic Acid | Type | — | — | — | — | — | — |
|  | Mol % of (c) in [(a) + (b) + (c)] |  | — | — | — | — | — | — |
|  | Melting Point Tm2 | °C. | 276 | 275 | 289 | 278 | 270 | 319 |
|  | Glass Transition Temperature Tg | °C. | 110 | 113 | 100 | 102 | 103 | 146 |
|  | Relative Viscosity ηr at 25°C. |  | 2.0 | 2.1 | 1.9 | 2.0 | 2.0 | 2.0 |
| (B) | Inorganic Filler | Type | GF | GF | GF | GF | GF | GF |
|  |  | Parts by mass based on 100 parts by mass of (A) | 55 | 55 | 55 | 55 | 55 | 100 |
| Melt Shear Viscosity ηs | Pa·s |  | 70 | 90 | 79 | 93 | 102 | 134 |
| Tensile Strength | MPa |  | 207 | 209 | 205 | 204 | 210 | 210 |
| Tensile Elongation | % |  | 3.7 | 3.2 | 3.0 | 3.1 | 3.2 | 2.0 |
| Water Absorption | % |  | 1.8 | 2.8 | 2.0 | 2.6 | 3.4 | 1.3 |

TABLE 10

|   |   |   | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| (A) | (a) Dicarboxylic Acid | Type | CHDA | CHDA | CHDA | — | TPA | CHDA | — |
|   |   | Mol % in (a) | 100 | 40 | 30 | — | 80 | 40 | — |
|   |   | Type | — | ADA | ADA | TPA | C12DA | C12DA | ADA |
|   |   | Mol % in (a) | — | 60 | 70 | 100 | 20 | 60 | 100 |
|   | (b) Diamine | Type | 2MPD | 2MPD | — | 2MPD | 2MPD | 2MPD | — |
|   |   | Mol % in (b) | 40 | 60 | — | 60 | 100 | 100 | — |
|   |   | Type | HMD | HMD | HMD | HMD | — | — | HMD |
|   |   | Mol % in (b) | 60 | 40 | 100 | 40 | — | — | 100 |
|   | Mol % of [(a) + (b)] in [(a) + (b) + (c)] |   | 100 | 100 | 100 | 100 | 100 | 100 | 100 |
|   | (c) Lactam and/or Aminocarboxylic Acid | Type | — | — | — | — | — | — | — |
|   | Mol % of (c) in [(a) + (b) + (c)] |   | — | — | — | — | — | — | — |
|   | Melting Point Tm2 | °C. | 352 | 268 | 290 | 310 | 278 | 266 | 262 |
|   | Glass Transition Temperature Tg | °C. | 145 | 89 | 74 | 135 | 118 | 82 | 55 |
|   | Relative Viscosity $\eta r$ at 25° C. |   | 1.9 | 2.2 | 2.0 | 1.9 | 2.0 | 2.2 | 2.1 |
| (B) | Inorganic Filler | Type | GF | GF | GF | GF | GF | GF | GF |
|   |   | Parts by mass based on 100 parts by mass of (A) | 55 | 55 | 55 | 100 | 55 | 55 | 55 |
|   | Melt Shear Viscosity $\eta s$ | Pa · s | Not measurable Extrusion impossible | 124 | 108 | 240 | 205 | 70 | 98 |
|   | Tensile Strength | MPa |   | 209 | 208 | 207 | 207 | 189 | 202 |
|   | Tensile Elongation | % |   | 3.1 | 3.2 | 1.9 | 3.0 | 4.0 | 3.6 |
|   | Water Absorption | % |   | 4.4 | 4.3 | 1.4 | 2.0 | 1.3 | 4.6 |

From the results of Tables 8 to 10, the polyamide compositions of Examples 25 to 46, which comprise a polyamide obtained by polymerization of a specific (a) and (b) and an inorganic filler, had especially excellent properties for all of heat resistance, fluidity, toughness, low water absorbance, and rigidity.

In contrast, in Comparative Example 8, which comprises a polyamide obtained by polymerization of less than 50 mol % of 2-methylpentamethylenediamine, the extrusion state was unstable, and a polyamide composition could not be obtained.

Further, for the polyamide compositions of Comparative Examples 9 and 10, which comprise a polyamide obtained by polymerization of less than 50 mol % of an alicyclic dicarboxylic acid, heat resistance and low water absorbance were poor.

In addition, for the polyamide composition of Comparative Example 11, which comprises a polyamide produced by the method disclosed in Patent Document 1, melt shear viscosity was large, fluidity was too low, and the molding properties were insufficient. In addition, tensile elongation was small and toughness was also insufficient.

Polyamide Composition Comprising (C) Copper Compound and Metal Halide

Production Example 1

A mixture of KI and ethylene bis-stearylamide was obtained by mixing 85.1 parts by mass of KI and 10 parts by mass of ethylene bis-stearylamide. The mixture was thoroughly mixed with 4.9 parts by mass of CuI, and the resultant product was granulated with a disk pelleter (F5-11-175, manufactured by Fuji Paudal Co., Ltd.) to obtain granules (1).

Production Example 2

A mixture of KI and ethylene bis-stearylamide was obtained by mixing 80.7 parts by mass of KI and 10 parts by mass of ethylene bis-stearylamide. The mixture was thoroughly mixed with 9.3 parts by mass of CuI, and the resultant product was granulated with a disk pelleter (F5-11-175, manufactured by Fuji Paudal Co., Ltd.) to obtain granules (2).

Production Example 3

A mixture of KI and ethylene bis-stearylamide was obtained by mixing 88.0 parts by mass of KI and 10 parts by mass of ethylene bis-stearylamide. The mixture was thoroughly mixed with 2.0 parts by mass of CuI, and the resultant product was granulated with a disk pelleter (F5-11-175, manufactured by Fuji Paudal Co., Ltd.) to obtain granules (3).

Example 47

A polyamide composition was obtained by blending 6.1 parts by mass of the granules (1) produced in Production Example 1 and 55 parts by mass of inorganic filler (GF) based on 100 parts by mass of the polyamide of Example 1, and melt kneading the resultant mixture with a twin-screw extruder (TEM 35, $\phi$L/D=47.6, set temperature 340° C., screw revolution speed 300 rpm, manufactured by Toshiba Machine Co., Ltd.). Table 11 shows the measurement results of measurements carried out on the obtained polyamide composition based on the above-described measurement methods.

Examples 48 to 67

Examples 48 to 67 were carried out in the same manner as Example 47, except that the respective polyamides of Examples 2 to 21 were used instead of the polyamide of Example 1. Tables 11 and 12 show the measurement results of measurements carried out on the obtained polyamide compositions based on the above-described measurement methods.

Comparative Example 15

An attempt was made to carry out Comparative Example 15 in the same manner as Example 47, except the polyamide of Comparative Example 1 was used instead of the polyamide of Example 1. However, the extrusion state was very unstable, and a polyamide composition could not be obtained.

Comparative Examples 16 to 21

Comparative Examples 16 to 21 were carried out in the same manner as Example 47, except that the respective polyamides of Comparative Examples 2 to 7 were used instead of the polyamide of Example 1. Table 13 shows the measurement results of measurements carried out on the obtained polyamide compositions based on the above-described measurement methods.

Table 14 shows the measurement results of measurements carried out on the polyamide of Example 29 based on the above-described measurement methods.

Example 68

Example 68 was carried out in the same manner as Example 51, except that 3.1 parts by mass of the granules (1) of Production Example 1 based on 100 parts by mass of the polyamide of Example 5 were used. Table 14 shows the measurement results of measurements carried out on the obtained polyamide composition based on the above-described measurement methods.

Example 69

Example 69 was carried out in the same manner as Example 51, except that 9.2 parts by mass of the granules (1) of Production Example 1 based on 100 parts by mass of the polyamide of Example 5 were used. Table 14 shows the measurement results of measurements carried out on the obtained polyamide composition based on the above-described measurement methods.

Example 70

Example 70 was carried out in the same manner as Example 51, except that 12.2 parts by mass of the granules (1) of Production Example 1 based on 100 parts by mass of the polyamide of Example 5 were used. Table 14 shows the measurement results of measurements carried out on the obtained polyamide composition based on the above-described measurement methods.

Example 71

Example 71 was carried out in the same manner as Example 51, except that 3.2 parts by mass of the granules (2) of Production Example 2 based on 100 parts by mass of the polyamide of Example 5 were used. Table 14 shows the measurement results of measurements carried out on the obtained polyamide composition based on the above-described measurement methods.

Example 72

Example 72 was carried out in the same manner as Example 51, except that 15.0 parts by mass of the granules (3) of Production Example 3 based on 100 parts by mass of the polyamide of Example 5 were used. Table 14 shows the measurement results of measurements carried out on the obtained polyamide composition based on the above-described measurement methods.

TABLE 11

| | | | Example 47 | Example 48 | Example 49 | Example 50 | Example 51 | Example 52 | Example 53 | Example 54 | Example 55 | Example 56 |
|---|---|---|---|---|---|---|---|---|---|---|---|---|
| (A) | (a) Dicarboxylic Acid | Type | CHDA | CHDA | CHDA | CHDA | CHDA | CHDA | CHDA | CHDA | CHDA | CHDA |
| | | Mol % in (a) | 100 | 100 | 100 | 100 | 100 | 100 | 80 | 50 | 80 | 100 |
| | | Type | — | — | — | — | — | — | ADA | ADA | TPA | — |
| | | Mol % in (a) | — | — | — | — | — | — | 20 | 50 | 20 | — |
| | (b) Diamine | Type | 2MPD | 2MPD | 2MPD | 2MPD | 2MPD | 2MPD | 2MPD | 2MPD | 2MPD | 2MPD |
| | | Mol % in (b) | 100 | 90 | 80 | 70 | 60 | 50 | 60 | 60 | 60 | 100 |
| | | Type | — | HMD | HMD | HMD | HMD | HMD | HMD | HMD | HMD | — |
| | | Mol % in (b) | — | 10 | 20 | 30 | 40 | 50 | 40 | 40 | 40 | — |
| | Mol % of [(a) + (b)] in [(a) + (b) + (c)] | | 100 | 100 | 100 | 100 | 100 | 100 | 100 | 100 | 100 | 93.7 |
| | (c) Lactam and/or Aminocarboxylic Acid | Type | — | — | — | — | — | — | — | — | — | CPL |
| | Mol % of (c) in [(a) + (b) + (c)] | | — | — | — | — | — | — | — | — | — | 6.3 |
| | Melting Point Tm2 | °C. | 327 | 325 | 323 | 327 | 319 | 330 | 290 | 275 | 308 | 306 |
| | Glass Transition Temperature Tg | °C. | 143 | 149 | 150 | 146 | 146 | 145 | 120 | 100 | 142 | 143 |
| | Relative Viscosity $\eta r$ at 25° C. | | 2.1 | 2.0 | 2.1 | 2.2 | 2.2 | 2.2 | 2.5 | 2.5 | 2.2 | 2.0 |
| (B) | Inorganic Filler | Type | GF | GF | GF | GF | GF | GF | GF | GF | GF | GF |
| | | Parts by mass based on 100 parts by mass of (A) | 55 | 55 | 55 | 55 | 55 | 55 | 55 | 55 | 55 | 55 |
| (C) | Copper Compound | Type | CuI | CuI | CuI | CuI | CuI | CuI | CuI | CuI | CuI | CuI |
| | | Parts by mass based on 100 parts by mass of (A) | 0.30 | 0.30 | 0.30 | 0.30 | 0.30 | 0.30 | 0.30 | 0.30 | 0.30 | 0.30 |
| | Metal Halide | Type | KI | KI | KI | KI | KI | KI | KI | KI | KI | KI |
| | | Parts by mass based on 100 parts by mass of (A) | 5.2 | 5.2 | 5.2 | 5.2 | 5.2 | 5.2 | 5.2 | 5.2 | 5.2 | 5.2 |
| | Copper | Parts by mass based on $10^6$ parts by mass of (A) | 1000 | 1000 | 1000 | 1000 | 1000 | 1000 | 1000 | 1000 | 1000 | 1000 |
| | Halogen/Copper | Mole ratio | 20 | 20 | 20 | 20 | 20 | 20 | 20 | 20 | 20 | 20 |
| | Melt Shear Viscosity $\eta s$ | Pa·s | 108 | 70 | 79 | 84 | 101 | 111 | 106 | 106 | 133 | 61 |
| | Tensile Strength | MPa | 216 | 212 | 212 | 211 | 210 | 210 | 208 | 210 | 209 | 210 |
| | Tensile Elongation | % | 3.1 | 3.1 | 3.1 | 3.1 | 3.0 | 3.1 | 3.2 | 3.3 | 3.0 | 3.2 |
| | Water Absorption | % | 1.9 | 2.1 | 2.0 | 1.8 | 1.6 | 1.6 | 3.3 | 3.5 | 1.5 | 2.5 |
| | Strength Half-life | Days | 50 | 47 | 49 | 51 | 52 | 50 | 55 | 55 | 50 | 47 |
| | Breaking Stress | MPa | 52 | 46 | 51 | 55 | 56 | 51 | 57 | 55 | 53 | 48 |
| | Tensile Strength Retention Rate After Dipping | % | 80 | 80 | 80 | 85 | 90 | 90 | 70 | 65 | 90 | 80 |

TABLE 12

| | | Example 57 | Example 58 | Example 59 | Example 60 | Example 61 | Example 62 | Example 63 | Example 64 | Example 65 | Example 66 | Example 67 |
|---|---|---|---|---|---|---|---|---|---|---|---|---|
| (A) (a) Dicarboxylic Acid | Type | CHDA | CHDA | CHDA | CHDA | CHDA | CHDA | CHDA | CHDA | CHDA | CHDA | CHDA |
| | Mol % in (a) | 80 | 80 | 80 | 80 | 80 | 80 | 80 | 60 | 60 | 60 | 50 |
| | Type | ADA | C8DA | C9DA | C10DA | C12DA | C14DA | C16DA | ADA | ADA | ADA | ADA |
| | Mol % in (a) | 20 | 20 | 20 | 20 | 20 | 20 | 20 | 40 | 40 | 40 | 50 |
| (b) Diamine | Type | 2MPD | 2MPD | 2MPD | 2MPD | 2MPD | 2MPD | 2MPD | 2MOD | 2MOD | TMHD | 2MPD |
| | Mol % in (b) | 100 | 100 | 100 | 100 | 100 | 100 | 100 | 50 | 50 | 50 | 50 |
| | Type | — | — | — | — | — | — | — | HMD | HMD | HMD | HMD |
| | Mol % in (b) | — | — | — | — | — | — | — | 50 | 50 | 50 | 50 |
| Mol % of [(a) + (b)] in [(a) + (b) + (c)] | | 100 | 100 | 100 | 100 | 100 | 100 | 100 | 100 | 100 | 100 | 100 |
| (c) Lactam and/or Aminocarboxylic Acid | Type | — | — | — | — | — | — | — | — | — | — | — |
| | Mol % of (c) in [(a) + (b) + (c)] | — | — | — | — | — | — | — | — | — | — | — |
| Melting Point Tm2 | °C. | 295 | 292 | 290 | 288 | 286 | 279 | 276 | 275 | 289 | 278 | 270 |
| Glass Transition Temperature Tg | °C. | 125 | 123 | 121 | 120 | 119 | 115 | 110 | 113 | 100 | 102 | 103 |
| Relative Viscosity ηr at 25° C. | | 2.1 | 2.2 | 2.2 | 2.2 | 2.1 | 2.2 | 2.2 | 2.4 | 2.0 | 2.2 | 2.3 |
| (B) Inorganic Filler | Type | GF | GF | GF | GF | GF | GF | GF | GF | GF | GF | GF |
| | Parts by mass based on 100 parts by mass of (A) | 55 | 55 | 55 | 55 | 55 | 55 | 55 | 55 | 55 | 55 | 55 |
| (C) Copper Compound | Type | CuI | CuI | CuI | CuI | CuI | CuI | CuI | CuI | CuI | CuI | CuI |
| | Parts by mass based on 100 parts by mass of (A) | 0.30 | 0.30 | 0.30 | 0.30 | 0.30 | 0.30 | 0.30 | 0.30 | 0.30 | 0.30 | 0.30 |
| Metal Halide | Type | KI | KI | KI | KI | KI | KI | KI | KI | KI | KI | KI |
| | Parts by mass based on 100 parts by mass of (A) | 5.2 | 5.2 | 5.2 | 5.2 | 5.2 | 5.2 | 5.2 | 5.2 | 5.2 | 5.2 | 5.2 |
| Copper | Parts by mass based on $10^6$ parts by mass of (A) | 1000 | 1000 | 1000 | 1000 | 1000 | 1000 | 1000 | 1000 | 1000 | 1000 | 1000 |
| Halogen/Copper | Mole ratio | 20 | 20 | 20 | 20 | 20 | 20 | 20 | 20 | 20 | 20 | 20 |
| Melt Shear Viscosity ηs | Pa · s | 117 | 111 | 108 | 99 | 99 | 75 | 70 | 90 | 79 | 93 | 102 |
| Tensile Strength | MPa | 213 | 212 | 211 | 210 | 209 | 209 | 207 | 209 | 205 | 204 | 210 |
| Tensile Elongation | % | 3.1 | 3.2 | 3.3 | 3.5 | 3.6 | 3.7 | 3.7 | 3.2 | 3.0 | 3.1 | 3.2 |
| Water Absorption | % | 2.5 | 2.1 | 2.1 | 2.1 | 2.0 | 2.0 | 1.8 | 2.8 | 2.0 | 2.6 | 3.4 |
| Strength Half-life | Days | 48 | 47 | 48 | 49 | 48 | 44 | 41 | 15 | 12 | 9 | 48 |
| Breaking Stress | MPa | 49 | 52 | 50 | 48 | 45 | 43 | 42 | 40 | 42 | 38 | 47 |
| Tensile Strength Retention Rate After Dipping | % | 75 | 85 | 90 | 90 | 90 | 90 | 90 | 85 | 90 | 85 | 50 |

TABLE 13

|     |     |     | Comparative Example 15 | Comparative Example 16 | Comparative Example 17 | Comparative Example 18 | Comparative Example 19 | Comparative Example 20 | Comparative Example 21 |
| --- | --- | --- | --- | --- | --- | --- | --- | --- | --- |
| (A) | (a) Dicarboxylic Acid | Type | CHDA | CHDA | CHDA | — | TPA | CHDA | — |
|  |  | Mol % in (a) | 100 | 40 | 30 | — | 80 | 40 | — |
|  |  | Type | — | ADA | ADA | TPA | C12DA | C12DA | ADA |
|  |  | Mol % in (a) | — | 60 | 70 | 100 | 20 | 60 | 100 |
|  | (b) Diamine | Type | 2MPD | 2MPD | — | 2MPD | 2MPD | 2MPD | — |
|  |  | Mol % in (b) | 40 | 60 | — | 60 | 100 | 100 | — |
|  |  | Type | HMD | HMD | HMD | HMD | — | — | HMD |
|  |  | Mol % in (b) | 60 | 40 | 100 | 40 | — | — | 100 |
|  | Mol % of [(a) + (b)] in [(a) + (b) + (c)] |  | 100 | 100 | 100 | 100 | 100 | 100 | 100 |
|  | (c) Lactam and/or Aminocarboxylic Acid | Type | — | — | — | — | — | — | — |
|  | Mol % of (c) in [(a) + (b) + (c)] |  | — | — | — | — | — | — | — |
|  | Melting Point Tm2 | ° C. | 352 | 268 | 290 | 310 | 278 | 266 | 262 |
|  | Glass Transition Temperature Tg | ° C. | 145 | 89 | 74 | 135 | 118 | 82 | 55 |
|  | Relative Viscosity $\eta r$ at 25° C. |  | 2.1 | 2.5 | 2.3 | 2.1 | 2.2 | 2.5 | 2.6 |
| (B) | Inorganic Filler | Type | GF | GF | GF | GF | GF | GF | GF |
|  |  | Parts by mass based on 100 parts by mass of (A) | 55 | 55 | 55 | 55 | 55 | 55 | 55 |
| (C) | Copper Compound | Type | Extrusion impossible | CuI | CuI | CuI | CuI | CuI | CuI |
|  |  | Parts by mass based on 100 parts by mass of (A) |  | 0.30 | 0.30 | 0.30 | 0.30 | 0.30 | 0.30 |
|  | Metal Halide | Type |  | KI | KI | KI | KI | KI | KI |
|  |  | Parts by mass based on 100 parts by mass of (A) |  | 5.2 | 5.2 | 5.2 | 5.2 | 5.2 | 5.2 |
|  | Copper | Parts by mass based on $10^6$ parts by mass of (A) |  | 1000 | 1000 | 1000 | 1000 | 1000 | 1000 |
|  | Halogen/Copper | Mole ratio |  | 20 | 20 | 20 | 20 | 20 | 20 |
|  | Melt Shear Viscosity $\eta s$ | Pa · s | Not measurable | 123 | 106 | 228 | 203 | 72 | 100 |
|  | Tensile Strength | MPa | Extrusion impossible | 209 | 207 | 206 | 204 | 189 | 202 |
|  | Tensile Elongation | % |  | 3.2 | 3.4 | 2.9 | 3.0 | 4.0 | 3.8 |
|  | Water Absorption | % |  | 4.3 | 4.4 | 1.5 | 2.1 | 1.5 | 4.6 |
|  | Strength Half-life | Days |  | 50 | 50 | 75 | 65 | 49 | 50 |
|  | Breaking Stress | MPa |  | 50 | 51 | 44 | 43 | 40 | 58 |
|  | Tensile Strength Retention Rate After Dipping | % |  | 55 | 55 | 90 | 90 | 85 | 50 |

TABLE 14

|     |     |     | Example 29 | Example 68 | Example 69 | Example 70 | Example 71 | Example 72 |
| --- | --- | --- | --- | --- | --- | --- | --- | --- |
| (A) | (a) Dicarboxylic Acid | Type | CHDA | CHDA | CHDA | CHDA | CHDA | CHDA |
|  |  | Mol % in (a) | 100 | 100 | 100 | 100 | 100 | 100 |
|  |  | Type | — | — | — | — | — | — |
|  |  | Mol % in (a) | — | — | — | — | — | — |
|  | (b) Diamine | Type | 2MPD | 2MPD | 2MPD | 2MPD | 2MPD | 2MPD |
|  |  | Mol % in (b) | 60 | 60 | 60 | 60 | 60 | 60 |
|  |  | Type | HMD | HMD | HMD | HMD | HMD | HMD |
|  |  | Mol % in (b) | 40 | 40 | 40 | 40 | 40 | 40 |
|  | Mol % of [(a) + (b)] in [(a) + (b) + (c)] |  | 100 | 100 | 100 | 100 | 100 | 100 |
|  | (c) Lactam and/or Aminocarboxylic Acid | Type | — | — | — | — | — | — |
|  | Mol % of (c) in [(a) + (b) + (c)] |  | — | — | — | — | — | — |
|  | Melting Point Tm2 | ° C. | 319 | 319 | 319 | 319 | 319 | 319 |
|  | Glass Transition Temperature Tg | ° C. | 146 | 146 | 146 | 146 | 146 | 146 |
|  | Relative Viscosity $\eta r$ at 25° C. |  | 2.2 | 2.2 | 2.2 | 2.2 | 2.2 | 2.2 |
| (B) | Inorganic Filler | Type | GF | GF | GF | GF | GF | GF |
|  |  | Parts by mass based on 100 parts by mass of (A) | 55 | 55 | 55 | 55 | 55 | 55 |

TABLE 14-continued

|  |  |  | Example 29 | Example 68 | Example 69 | Example 70 | Example 71 | Example 72 |
|---|---|---|---|---|---|---|---|---|
| (C) | Copper Compound | Type | — | CuI | CuI | CuI | CuI | CuI |
|  |  | Parts by mass based on 100 parts by mass of (A) | — | 0.15 | 0.45 | 0.60 | 0.30 | 0.30 |
|  | Metal Halide | Type | — | KI | KI | KI | KI | KI |
|  |  | Parts by mass based on 100 parts by mass of (A) | — | 2.6 | 7.8 | 10.4 | 2.6 | 13.1 |
|  | Copper | Parts by mass based on $10^6$ parts by mass of (A) | — | 500 | 1500 | 2000 | 1000 | 1000 |
|  | Halogen/Copper | Mole ratio | — | 20 | 20 | 20 | 10 | 50 |
| Melt Shear Viscosity ηs |  | Pa·s | 101 | 102 | 101 | 100 | 103 | 101 |
| Tensile Strength |  | MPa | 210 | 210 | 211 | 214 | 210 | 211 |
| Tensile Elongation |  | % | 3.0 | 3.0 | 3.2 | 3.0 | 2.9 | 3.0 |
| Water Absorption |  | % | 1.6 | 1.8 | 1.6 | 1.7 | 1.7 | 1.6 |
| Strength Half-life |  | Days | 2 | 27 | 81 | 119 | 50 | 23 |
| Breaking Stress |  | MPa | — | 56 | 56 | 57 | 56 | 55 |
| Tensile Strength Retention Rate After Dipping |  | % | — | 90 | 88 | 89 | 90 | 90 |

From the results of Tables 11 to 14, the polyamide compositions of Examples 51 to 72, which comprise a polyamide obtained by polymerization of a specific (a) and (b), and a copper compound and metal halide, had especially excellent properties for heat resistance, fluidity, toughness, low water absorbance, and rigidity, as well as for heat aging resistance.

In contrast, in Comparative Example 15, which comprises a polyamide comprising less than 50 mol % of 2-methylpentamethylenediamine, the extrusion state was unstable, and a polyamide composition could not be obtained.

Further, for the polyamide compositions of Comparative Examples 16 and 17, which comprise a polyamide obtained by polymerization of less than 50 mol % of an alicyclic dicarboxylic acid, heat resistance and low water absorbance were poor.

In addition, for the polyamide composition of Comparative Example 18, which comprises a polyamide produced by the method disclosed in Patent Document 1, melt shear viscosity was large, fluidity was too low, and the molding properties were insufficient. In addition, tensile elongation was small and toughness was also insufficient.

Polyamide Composition Comprising (D) Halogen-Based Flame Retardant

Example 73

The polyamide of Example 1 was used by drying under a nitrogen flow so that the moisture content was adjusted to about 0.2 mass %. Using a twin-screw extruder (TEM 35, ϕL/D=47.6, set temperature 340° C., screw revolution speed 300 rpm, and output rate 50 kg/hr, manufactured by Toshiba Machine Co., Ltd.), a pre-blended mixture of the (A) polyamide, a (D) halogen-based flame retardant, a (G) flame retardant auxiliary, and an (H) polymer comprising an α,β-unsaturated dicarboxylic acid anhydride was fed from a top feed opening provided at the uppermost upstream portion of the extruder. A (B) inorganic filler was fed from a side feed opening on a downstream side of the extruder (the resin fed from the top feed opening was in a sufficiently molten state). A melt kneaded product extruded from a die head was cooled in a strand form, which was pelletized to form polyamide composition pellets. The blend amount was, based on 100 parts by mass of the (A) polyamide, 45.0 parts by mass of the (D) halogen-based flame retardant, 7.0 parts by mass of the (G) flame retardant auxiliary, 4.0 parts by mass of the (H) polymer comprising an α,β-unsaturated dicarboxylic acid anhydride, and 70.0 parts by mass of the (B) inorganic filler. Table 15 shows the measurement results of measurements carried out on the obtained polyamide composition based on the above-described measurement methods.

Examples 74 to 93

Examples 74 to 93 were carried out in the same manner as Example 73, except that the polyamides of Examples 2 to 21 were used instead of the polyamide of Example 1. Tables 15 and 16 show the measurement results of measurements carried out on the obtained polyamide compositions based on the above-described measurement methods.

Example 94

Example 94 was carried out in the same manner as Example 77, except that the (H) polymer comprising an α,β-unsaturated dicarboxylic acid anhydride was not blended, and that 15.0 parts by mass of the (G) flame retardant auxiliary and 75.0 parts by mass of the (B) inorganic filler were used. Table 16 shows the measurement results of measurements carried out on the obtained polyamide composition based on the above-described measurement methods.

Example 95

Example 95 was carried out in the same manner as Example 77, except that 7.0 parts by mass of magnesium hydroxide as the (G) flame retardant auxiliary was used. Table 16 shows the measurement results of measurements carried out on the obtained polyamide composition based on the above-described measurement methods.

Comparative Example 22

An attempt was made to carry out Comparative Example 22 in the same manner as Example 73, except the polyamide of Comparative Example 1 was used instead of the polyamide of Example 1. However, the extrusion state was very unstable, and a polyamide composition could not be obtained.

Comparative Examples 23 to 28

Comparative Examples 23 to 28 were carried out in the same manner as Example 73, except that the polyamides of Comparative Examples 2 to 7 were used instead of the polyamide of Example 1. Table 17 shows the measurement results of measurements carried out on the obtained polyamide compositions based on the above-described measurement methods.

TABLE 15

| | | | Example 73 | Example 74 | Example 75 | Example 76 | Example 77 | Example 78 | Example 79 | Example 80 | Example 81 | Example 82 |
|---|---|---|---|---|---|---|---|---|---|---|---|---|
| (A) | (a) Dicarboxylic Acid | Type | CHDA | CHDA | CHDA | CHDA | CHDA | CHDA | CHDA | CHDA | CHDA | CHDA |
| | | Mol % in (a) | 100 | 100 | 100 | 100 | 100 | 100 | 80 | 50 | 80 | 100 |
| | | Type | — | — | — | — | — | — | ADA | ADA | TPA | — |
| | | Mol % in (a) | — | — | — | — | — | — | 20 | 50 | 20 | — |
| | (b) Diamine | Type | 2MPD | 2MPD | 2MPD | 2MPD | 2MPD | 2MPD | 2MPD | 2MPD | 2MPD | 2MPD |
| | | Mol % in (b) | 100 | 90 | 80 | 70 | 60 | 50 | 60 | 60 | 60 | 100 |
| | | Type | — | HMD | HMD | HMD | HMD | HMD | HMD | HMD | HMD | — |
| | | Mol % in (b) | — | 10 | 20 | 30 | 40 | 50 | 40 | 40 | 40 | — |
| | Mol % of [(a) + (b)] in [(a) + (b) + (c)] | | 100 | 100 | 100 | 100 | 100 | 100 | 100 | 100 | 100 | 93.7 |
| | (c) Lactam and/or Aminocarboxylic Acid | Type | — | — | — | — | — | — | — | — | — | CPL |
| | Mol % of (c) in [(a) + (b) + (c)] | | — | — | — | — | — | — | — | — | — | 6.3 |
| | Melting Point Tm2 | °C. | 327 | 325 | 323 | 327 | 319 | 330 | 290 | 275 | 308 | 306 |
| | Glass Transition Temperature Tg | °C. | 143 | 149 | 150 | 146 | 146 | 145 | 120 | 100 | 142 | 143 |
| | Relative Viscosity ηr at 25° C. | | 2.1 | 2.0 | 2.1 | 2.2 | 2.2 | 2.2 | 2.5 | 2.5 | 2.2 | 2.0 |
| Halogen-based Flame Retardant | Brominated Polystyrene | Parts by mass based on 100 parts by mass of (A) | 45 | 45 | 45 | 45 | 45 | 45 | 45 | 45 | 45 | 45 |
| | (G) Flame Retardant Auxiliary | Type | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide |
| | | Parts by mass based on 100 parts by mass of (A) | 7.0 | 7.0 | 7.0 | 7.0 | 7.0 | 7.0 | 7.0 | 7.0 | 7.0 | 7.0 |
| (H) Polymer | Copolymer of Styrene and Maleic Anhydride | Parts by mass based on 100 parts by mass of (A) | 4.0 | 4.0 | 4.0 | 4.0 | 4.0 | 4.0 | 4.0 | 4.0 | 4.0 | 4.0 |
| (B) Inorganic Reinforcing Material | Glass Fiber | Parts by mass based on 100 parts by mass of (A) | 70 | 70 | 70 | 70 | 70 | 70 | 70 | 70 | 70 | 70 |
| | Total of (A), (D), and (H) | Parts by mass | 149 | 149 | 149 | 149 | 149 | 149 | 149 | 149 | 149 | 149 |
| | Amount of α,β-Unsaturated Dicarboxylic Acid Anhydride | Parts by mass | 0.60 | 0.60 | 0.60 | 0.60 | 0.60 | 0.60 | 0.60 | 0.60 | 0.60 | 0.60 |
| | Amount of α,β-Unsaturated Dicarboxylic Acid Anhydride Based on Total of (A), (D), and (H) | Mass % | 0.40 | 0.40 | 0.40 | 0.40 | 0.40 | 0.40 | 0.40 | 0.40 | 0.40 | 0.40 |
| | Flow Length | cm | 21 | 31 | 29 | 27 | 23 | 21 | 22 | 22 | 17 | 34 |
| | Tensile Strength | MPa | 210 | 198 | 198 | 196 | 194 | 192 | 186 | 192 | 190 | 192 |
| | Tensile Elongation | % | 3.5 | 3.5 | 3.5 | 3.5 | 3.3 | 3.4 | 3.4 | 3.3 | 3.0 | 3.6 |
| | Water Absorption | % | 1.2 | 1.3 | 1.3 | 1.1 | 1.0 | 1.0 | 2.0 | 2.2 | 1.0 | 1.6 |
| | UL94VB | (Class) | V-0 | V-0 | V-0 | V-0 | V-0 | V-0 | V-0 | V-0 | V-0 | V-0 |

TABLE 16

| | | | Example 83 | Example 84 | Example 85 | Example 86 | Example 87 | Example 88 | Example 89 | Example 90 | Example 91 | Example 92 | Example 93 | Example 94 | Example 95 |
|---|---|---|---|---|---|---|---|---|---|---|---|---|---|---|---|
| (A) | (a) Dicarboxylic Acid | Type | CHDA | CHDA | CHDA | CHDA | CHDA | CHDA | CHDA | CHDA | CHDA | CHDA | CHDA | CHDA | CHDA |
| | | Mol % in (a) | 80 | 80 | 80 | 80 | 80 | 80 | 80 | 60 | 60 | 60 | 50 | 100 | 100 |
| | | Type | ADA | C8DA | C9DA | C10DA | C12DA | C14DA | C16DA | ADA | ADA | ADA | ADA | — | — |
| | | Mol % in (a) | 20 | 20 | 20 | 20 | 20 | 20 | 20 | 40 | 40 | 40 | 50 | — | — |
| | (b) Diamine | Type | 2MPD | 2MPD | 2MPD | 2MPD | 2MPD | 2MPD | 2MPD | 2MOD | 2MOD | TMHD | 2MPD | 2MPD | 2MPD |
| | | Mol % in (b) | 100 | 100 | 100 | 100 | 100 | 100 | 100 | 50 | 50 | 50 | 50 | 60 | 60 |
| | | Type | — | — | — | — | — | — | — | HMD | NMD | HMD | HMD | HMD | HMD |
| | | Mol % in (b) | — | — | — | — | — | — | — | 50 | 50 | 50 | 50 | 40 | 40 |
| | (c) Lactam and/or Aminocarboxylic Acid | Type | — | — | — | — | — | — | — | — | — | — | — | — | — |
| | | Mol % of [(a)+(b)] in [(a)+(b)+(c)] | 100 | 100 | 100 | 100 | 100 | 100 | 100 | 100 | 100 | 100 | 100 | 100 | 100 |
| | | Mol % of (c) in [(a)+(b)+(c)] | — | — | — | — | — | — | — | — | — | — | — | — | — |
| | Melting Point Tm2 | °C. | 295 | 292 | 290 | 288 | 286 | 279 | 276 | 275 | 289 | 278 | 270 | 319 | 319 |
| | Glass Transition Temperature Tg | °C. | 125 | 123 | 121 | 120 | 119 | 115 | 110 | 113 | 100 | 102 | 103 | 146 | 146 |
| | Relative Viscosity ηr at 25° C. | | 2.1 | 2.2 | 2.2 | 2.2 | 2.1 | 2.2 | 2.2 | 2.4 | 2.0 | 2.2 | 2.3 | 2.2 | 2.2 |
| | Halogen-based Flame Retardant | Brominated Polystyrene | Parts by mass based on 100 parts by mass of (A) | 45 | 45 | 45 | 45 | 45 | 45 | 45 | 45 | 45 | 45 | 45 | 45 | 45 |
| (G) Flame Retardant Auxiliary | | Type | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Diantimony Trioxide | Magnesium hydroxide |
| | | Parts by mass based on 100 parts by mass of (A) | 7.0 | 7.0 | 7.0 | 7.0 | 7.0 | 7.0 | 7.0 | 7.0 | 7.0 | 7.0 | 7.0 | 15.0 | 7.0 |
| (H) Polymer | Copolymer of Styrene and Maleic Anhydride | Parts by mass based on 100 parts by mass of (A) | 4.0 | 4.0 | 4.0 | 4.0 | 4.0 | 4.0 | 4.0 | 4.0 | 4.0 | 4.0 | 4.0 | — | 4.0 |
| (B) Inorganic Reinforcing Material | Glass Fiber | Parts by mass based on 100 parts by mass of (A) | 70 | 70 | 70 | 70 | 70 | 70 | 70 | 70 | 70 | 70 | 70 | 75 | 70 |
| | Total of (A), (D), and (H) | Parts by mass | 149 | 149 | 149 | 149 | 149 | 149 | 149 | 149 | 149 | 149 | 149 | 145 | 149 |
| | Amount of α,β-Unsaturated Dicarboxylic Acid Anhydride | Parts by mass | 0.60 | 0.60 | 0.60 | 0.60 | 0.60 | 0.60 | 0.60 | 0.60 | 0.60 | 0.60 | 0.60 | — | 0.60 |
| | Amount of α,β-Unsaturated Dicarboxylic Acid Anhydride Based on Total of (A), (D), and (H) | Mass % | 0.40 | 0.40 | 0.40 | 0.40 | 0.40 | 0.40 | 0.40 | 0.40 | 0.40 | 0.40 | 0.40 | — | 0.40 |
| | Flow Length | cm | 20 | 21 | 21 | 23 | 23 | 30 | 31 | 26 | 29 | 25 | 23 | 25 | 24 |
| | Tensile Strength | MPa | 202 | 200 | 196 | 192 | 190 | 188 | 182 | 190 | 178 | 174 | 194 | 175 | 193 |
| | Tensile Elongation | % | 3.3 | 3.4 | 3.5 | 3.7 | 3.8 | 3.9 | 3.9 | 3.4 | 3.2 | 3.3 | 3.4 | 3.0 | 3.2 |
| | Water Absorption | % | 1.6 | 1.3 | 1.3 | 1.3 | 1.3 | 1.3 | 1.2 | 1.7 | 1.3 | 1.7 | 2.1 | 1.0 | 1.2 |
| | UL94VB | (Class) | V-0 | V-0 | V-0 | V-0 | V-0 | V-0 | V-0 | V-0 | V-0 | V-0 | V-0 | V-0 | V-0 |

TABLE 17

| | | | Comparative Example 22 | Comparative Example 23 | Comparative Example 24 | Comparative Example 25 | Comparative Example 26 | Comparative Example 27 | Comparative Example 28 |
|---|---|---|---|---|---|---|---|---|---|
| (A) | (a) Dicarboxylic Acid | Type | CHDA | CHDA | CHDA | — | TPA | CHDA | — |
| | | Mol % in (a) | 100 | 40 | 30 | — | 80 | 40 | — |
| | | Type | — | ADA | ADA | TPA | C12DA | C12DA | ADA |
| | | Mol % in (a) | — | 60 | 70 | 100 | 20 | 60 | 100 |
| | (b) Diamine | Type | 2MPD | 2MPD | — | 2MPD | 2MPD | 2MPD | — |
| | | Mol % in (b) | 40 | 60 | — | 60 | 100 | 100 | — |
| | | Type | HMD | HMD | HMD | HMD | — | — | HMD |
| | | Mol % in (b) | 60 | 40 | 100 | 40 | — | — | 100 |
| | Mol % of [(a) + (b)] in [(a) + (b) + (c)] | | 100 | 100 | 100 | 100 | 100 | 100 | 100 |
| | (c) Lactam and/or Aminocarboxylic Acid | Type | — | — | — | — | — | — | — |
| | Mol % of (c) in [(a) + (b) + (c)] | | — | — | — | — | — | — | — |
| | Melting Point Tm2 | °C. | 352 | 268 | 290 | 310 | 278 | 266 | 262 |
| | Glass Transition Temperature Tg | °C. | 145 | 89 | 74 | 135 | 118 | 82 | 55 |
| | Relative Viscosity ηr at 25° C. | | 2.1 | 2.5 | 2.3 | 2.1 | 2.2 | 2.5 | 2.6 |
| Halogen-based Flame Retardant | Brominated Polystyrene | Parts by mass based on 100 parts by mass of (A) | 45 | 45 | 45 | 45 | 45 | 45 | 45 |
| (G) Flame Retardant Auxiliary | | Type | Diantimony Trioxide | Diantimony Trioxide | Diantimony Trioxide | Diantimony Trioxide | Diantimony Trioxide | Diantimony Trioxide | Diantimony Trioxide |
| | | Parts by mass based on 100 parts by mass of (A) | 7.0 | 7.0 | 7.0 | 7.0 | 7.0 | 7.0 | 7.0 |
| (H) Polymer | Copolymer of Styrene and Maleic Anhydride | Parts by mass based on 100 parts by mass of (A) | 4.0 | 4.0 | 4.0 | 4.0 | 4.0 | 4.0 | 4.0 |
| (B) Inorganic Reinforcing Material | Glass Fiber | Parts by mass based on 100 parts by mass of (A) | 70 | 70 | 70 | 70 | 70 | 70 | 70 |
| Total of (A), (D), and (H) | | Parts by mass | 149 | 149 | 149 | 149 | 149 | 149 | 149 |
| Amount of α,β-Unsaturated Dicarboxylic Acid Anhydride | | Parts by mass | 0.60 | 0.60 | 0.60 | 0.60 | 0.60 | 0.60 | 0.60 |
| Amount of α,β-Unsaturated Dicarboxylic Acid Anhydride Based on Total of (A), (D), and (H) | | Mass % | 0.40 | 0.40 | 0.40 | 0.40 | 0.40 | 0.40 | 0.40 |
| Flow Length | | cm | Not measurable | 18 | 21 | 14 | 14 | 31 | 31 |
| Tensile Strength | | MPa | Extrusion impossible | 188 | 186 | 182 | 182 | 128 | 168 |
| Tensile Elongation | | % | | 3.3 | 3.4 | 2.7 | 2.9 | 4.2 | 3.8 |
| Water Absorption | | % | | 2.7 | 2.7 | 1.2 | 1.4 | 0.8 | 3.5 |
| UL94VB | | (Class) | | V-0 | V-0 | V-0 | V-0 | V-0 | V-0 |

From the results of Tables 15 to 17, the polyamide compositions of Examples 73 to 94, which comprise a polyamide obtained by polymerization of a specific (a) and (b) and a halogen-based flame retardant, had especially excellent properties for all of heat resistance, fluidity, toughness, low water absorbance, and rigidity, as well as excellent flame resistance.

In contrast, in Comparative Example 22, which comprises a polyamide obtained by polymerization of less than 50 mol % of 2-methylpentamethylenediamine, the extrusion state was unstable, and a polyamide composition could not be obtained.

Further, for the polyamide compositions of Comparative Examples 23 and 24, which comprise a polyamide obtained by polymerization of less than 50 mol % of an alicyclic dicarboxylic acid, heat resistance and low water absorbance were poor.

In addition, for the polyamide composition of Comparative Example 25, which comprises a polyamide produced by the method disclosed in Patent Document 1, the flow length was short, fluidity was too low, and the molding properties were insufficient. In addition, tensile elongation was small and toughness was also insufficient.

For Comparative Example 28, which comprises PA66, heat resistance and low water absorbance were poor.

Polyamide Composition Comprising (E) Phosphinate and/or Diphosphinate

Example 96

The polyamide of Example 1 was used by drying under a nitrogen flow so that the moisture content was adjusted to about 0.2 mass %. Using a twin-screw extruder having one feed opening (top feed) on the upstream side and another two feed openings, at a middle section of the extruder and at the downstream side near the die (TEM 35, ϕL/D=47.6, set temperature 340° C., screw revolution speed 100 rpm, and output rate 30 kg/hr, manufactured by Toshiba Machine Co., Ltd.), the (A) polyamide was fed from the top feed opening provided at the uppermost upstream portion of the extruder, an (E) phosphinate and a (G) flame retardant auxiliary were fed from the feed opening at the middle section of the extruder, and a (B) inorganic filler was fed from the feed opening on the downstream side near the die. A melt kneaded product extruded from a die head was cooled in a strand form, which was pelletized to form polyamide composition pellets. The blend amount was, based on 100 parts by mass of the (A) polyamide, 42.0 parts by mass of the (E) phosphinate, 2.0 parts by mass of the (G) flame retardant auxiliary, and 48.0 parts by mass of the (B) inorganic filler. Table 18 shows the measurement results of measurements carried out on the obtained polyamide composition based on the above-described measurement methods.

Examples 97 to 116

Examples 97 to 116 were carried out in the same manner as Example 96, except that the polyamides of Examples 2 to 21 were used instead of the polyamide of Example 1. Tables 18 and 19 show the measurement results of measurements carried out on the obtained polyamide compositions based on the above-described measurement methods.

Example 117

Example 117 was carried out in the same manner as Example 100, except that the (G) flame retardant auxiliary was not blended. Table 19 shows the measurement results of measurements carried out on the obtained polyamide composition based on the above-described measurement methods.

Example 118

Example 118 was carried out in the same manner as Example 100, except that 2.0 parts by mass of magnesium hydroxide as the (G) flame retardant auxiliary was used. Table 19 shows the measurement results of measurements carried out on the obtained polyamide composition based on the above-described measurement methods.

Comparative Example 29

An attempt was made to carry out Comparative Example 29 in the same manner as Example 96, except the polyamide of Comparative Example 1 was used instead of the polyamide of Example 1. However, the extrusion state was very unstable, and a polyamide composition could not be obtained.

Comparative Examples 30 to 35

Comparative Examples 30 to 35 were carried out in the same manner as Example 96, except that the polyamides of Comparative Examples 2 to 7 were used instead of the polyamide of Example 1. Table 20 shows the measurement results of measurements carried out on the obtained polyamide compositions based on the above-described measurement methods.

TABLE 18

| | | | | Example 96 | Example 97 | Example 98 | Example 99 | Example 100 |
|---|---|---|---|---|---|---|---|---|
| (A) | (a) Dicarboxylic Acid | | Type | CHDA | CHDA | CHDA | CHDA | CHDA |
| | | | Mol % in (a) | 100 | 100 | 100 | 100 | 100 |
| | | | Type | — | — | — | — | — |
| | | | Mol % in (a) | — | — | — | — | — |
| | (b) Diamine | | Type | 2MPD | 2MPD | 2MPD | 2MPD | 2MPD |
| | | | Mol % in (b) | 100 | 90 | 80 | 70 | 60 |
| | | | Type | — | HMD | HMD | HMD | HMD |
| | | | Mol % in (b) | — | 10 | 20 | 30 | 40 |
| | Mol % of [(a) + (b)] in [(a) + (b) + (c)] | | | 100 | 100 | 100 | 100 | 100 |
| | (c) Lactam and/or Aminocarboxylic Acid | | Type | — | — | — | — | — |
| | Mol % of (c) in [(a) + (b) + (c)] | | | — | — | — | — | — |
| | Melting Point Tm2 | | °C. | 327 | 325 | 323 | 327 | 319 |
| | Glass Transition Temperature Tg | | °C. | 143 | 149 | 150 | 146 | 146 |
| | Relative Viscosity ηr at 25° C. | | | 2.0 | 2.0 | 2.1 | 2.2 | 2.2 |
| (E) Phosphinate | | | Type | DEPAl | DEPAl | DEPAl | DEPAl | DEPAl |
| | | | Parts by mass based on 100 parts by mass of (A) | 42 | 42 | 42 | 42 | 42 |
| (G) Flame Retardant Auxiliary | | | Type | Zinc borate | Zinc borate | Zinc borate | Zinc borate | Zinc borate |
| | | | Parts by mass based on 100 parts by mass of (A) | 2.0 | 2.0 | 2.0 | 2.0 | 2.0 |
| (B) Inorganic Reinforcing Material | | | Type | GF | GF | GF | GF | GF |
| | | | Parts by mass based on 100 parts by mass of (A) | 48 | 48 | 48 | 48 | 48 |
| Full Filling Pressure | | | % | 20 | 33 | 35 | 37 | 40 |
| Tensile Strength | | | MPa | 170 | 167 | 167 | 166 | 164 |
| Tensile Elongation | | | % | 3.0 | 3.0 | 3.0 | 3.0 | 2.9 |
| Water Absorption | | | % | 1.1 | 1.5 | 1.5 | 1.3 | 1.2 |
| UL94VB | | | (Class) | V-0 | V-0 | V-0 | V-0 | V-0 |

| | | | | Example 101 | Example 102 | Example 103 | Example 104 | Example 105 |
|---|---|---|---|---|---|---|---|---|
| (A) | (a) Dicarboxylic Acid | | Type | CHDA | CHDA | CHDA | CHDA | CHDA |
| | | | Mol % in (a) | 100 | 80 | 50 | 80 | 100 |
| | | | Type | — | ADA | ADA | TPA | — |
| | | | Mol % in (a) | — | 20 | 50 | 20 | — |
| | (b) Diamine | | Type | 2MPD | 2MPD | 2MPD | 2MPD | 2MPD |
| | | | Mol % in (b) | 50 | 60 | 60 | 60 | 100 |
| | | | Type | HMD | HMD | HMD | HMD | — |
| | | | Mol % in (b) | 50 | 40 | 40 | 40 | — |
| | Mol % of [(a) + (b)] in [(a) + (b) + (c)] | | | 100 | 100 | 100 | 100 | 93.7 |
| | (c) Lactam and/or Aminocarboxylic Acid | | Type | — | — | — | — | CPL |
| | Mol % of (c) in [(a) + (b) + (c)] | | | — | — | — | — | 6.3 |
| | Melting Point Tm2 | | °C. | 330 | 290 | 275 | 308 | 306 |
| | Glass Transition Temperature Tg | | °C. | 145 | 120 | 100 | 142 | 143 |
| | Relative Viscosity ηr at 25° C. | | | 2.2 | 2.5 | 2.5 | 2.2 | 2.0 |

TABLE 18-continued

|  |  | | | | | |
|---|---|---|---|---|---|---|
| (E) Phosphinate | Type | DEPAI | DEPAI | DEPAI | DEPAI | DEPAI |
|  | Parts by mass based on 100 parts by mass of (A) | 42 | 42 | 42 | 42 | 42 |
| (G) Flame Retardant Auxiliary | Type | Zinc borate | Zinc borate | Zinc borate | Zinc borate | Zinc borate |
|  | Parts by mass based on 100 parts by mass of (A) | 2.0 | 2.0 | 2.0 | 2.0 | 2.0 |
| (B) Inorganic Reinforcing Material | Type | GF | GF | GF | GF | GF |
|  | Parts by mass based on 100 parts by mass of (A) | 48 | 48 | 48 | 48 | 48 |
| Full Filling Pressure | % | 42 | 41 | 41 | 46 | 31 |
| Tensile Strength | MPa | 162 | 157 | 162 | 161 | 162 |
| Tensile Elongation | % | 2.8 | 2.8 | 2.9 | 2.3 | 3.1 |
| Water Absorption | % | 1.2 | 2.4 | 2.6 | 1.1 | 1.8 |
| UL94VB | (Class) | V-0 | V-0 | V-0 | V-0 | V-0 |

TABLE 19

|  |  |  | Example 106 | Example 107 | Example 108 | Example 109 | Example 110 | Example 111 | Example 112 |
|---|---|---|---|---|---|---|---|---|---|
| (A) | (a) Dicarboxylic Acid | Type | CHDA | CHDA | CHDA | CHDA | CHDA | CHDA | CHDA |
|  |  | Mol % in (a) | 80 | 80 | 80 | 80 | 80 | 80 | 80 |
|  |  | Type | ADA | C8DA | C9DA | C10DA | C12DA | C14DA | C16DA |
|  |  | Mol % in (a) | 20 | 20 | 20 | 20 | 20 | 20 | 20 |
|  | (b) Diamine | Type | 2MPD | 2MPD | 2MPD | 2MPD | 2MPD | 2MPD | 2MPD |
|  |  | Mol % in (b) | 100 | 100 | 100 | 100 | 100 | 100 | 100 |
|  |  | Type | — | — | — | — | — | — | — |
|  |  | Mol % in (b) | — | — | — | — | — | — | — |
|  |  | Mol % of [(a) + (b)] in [(a) + (b) + (c)] | 100 | 100 | 100 | 100 | 100 | 100 | 100 |
|  | (c) Lactam and/or Aminocarboxylic Acid | Type | — | — | — | — | — | — | — |
|  |  | Mol % of (c) in [(a) + (b) + (c)] | — | — | — | — | — | — | — |
| Melting Point Tm2 | | °C. | 295 | 292 | 290 | 288 | 286 | 279 | 276 |
| Glass Transition Temperature Tg | | °C. | 125 | 123 | 121 | 120 | 119 | 115 | 110 |
| Relative Viscosity ηr at 25° C. | | | 2.1 | 2.2 | 2.2 | 2.2 | 2.2 | 2.2 | 2.1 |
| (E) Phosphinate | | Type | DEPAI | DEPAI | DEPAI | DEPAI | DEPAI | DEPAI | DEPAI |
|  | | Parts by mass based on 100 parts by mass of (A) | 42 | 42 | 42 | 42 | 42 | 42 | 42 |
| (G) Flame Retardant Auxiliary | | Type | Zinc borate | Zinc borate | Zinc borate | Zinc borate | Zinc borate | Zinc borate | Zinc borate |
|  | | Parts by mass based on 100 parts by mass of (A) | 2.0 | 2.0 | 2.0 | 2.0 | 2.0 | 2.0 | 2.0 |
| (B) Inorganic Reinforcing Material | | Type | GF | GF | GF | GF | GF | GF | GF |
|  | | Parts by mass based on 100 parts by mass of (A) | 48 | 48 | 48 | 48 | 48 | 48 | 48 |
| Full Filling Pressure | | % | 43 | 42 | 42 | 40 | 35 | 33 | 40 |
| Tensile Strength | | MPa | 171 | 169 | 166 | 162 | 159 | 154 | 161 |
| Tensile Elongation | | % | 2.9 | 3.0 | 3.1 | 3.3 | 3.5 | 3.5 | 3.4 |
| Water Absorption | | % | 1.8 | 1.6 | 1.6 | 1.5 | 1.5 | 1.4 | 1.5 |
| UL94VB | | (Class) | V-0 | V-0 | V-0 | V-0 | V-0 | V-0 | V-0 |

|  |  |  | Example 113 | Example 114 | Example 115 | Example 116 | Example 117 | Example 118 |
|---|---|---|---|---|---|---|---|---|
| (A) | (a) Dicarboxylic Acid | Type | CHDA | CHDA | CHDA | CHDA | CHDA | CHDA |
|  |  | Mol % in (a) | 60 | 60 | 60 | 50 | 100 | 100 |
|  |  | Type | ADA | ADA | ADA | ADA | — | — |
|  |  | Mol % in (a) | 40 | 40 | 40 | 50 | — | — |
|  | (b) Diamine | Type | 2MOD | 2MOD | TMHD | 2MPD | 2MPD | 2MPD |
|  |  | Mol % in (b) | 50 | 50 | 50 | 50 | 60 | 100 |
|  |  | Type | HMD | NMD | HMD | HMD | HMD | — |
|  |  | Mol % in (b) | 50 | 50 | 50 | 50 | 40 | — |
|  |  | Mol % of [(a) + (b)] in [(a) + (b) + (c)] | 100 | 100 | 100 | 100 | 100 | 100 |
|  | (c) Lactam and/or Aminocarboxylic Acid | Type | — | — | — | — | — | — |
|  |  | Mol % of (c) in [(a) + (b) + (c)] | — | — | — | — | — | — |

TABLE 19-continued

|  |  |  |  |  |  |  |  |  |
|---|---|---|---|---|---|---|---|---|
| Melting Point Tm2 | °C. | 275 | 289 | 278 | 270 | 319 | 327 |
| Glass Transition Temperature Tg | °C. | 113 | 100 | 102 | 103 | 146 | 143 |
| Relative Viscosity ηr at 25° C. |  | 2.4 | 2.0 | 2.2 | 2.3 | 2.2 | 2.0 |
| (E) Phosphinate | Type | DEPAl | DEPAl | DEPAl | DEPAl | DEPAl | DEPAl |
|  | Parts by mass based on 100 parts by mass of (A) | 42 | 42 | 42 | 42 | 42 | 42 |
| (G) Flame Retardant Auxiliary | Type | Zinc borate | Zinc borate | Zinc borate | Zinc borate | — | Magnesium hydroxide |
|  | Parts by mass based on 100 parts by mass of (A) | 2.0 | 2.0 | 2.0 | 2.0 | — | 2.0 |
| (B) Inorganic Reinforcing Material | Type | GF | GF | GF | GF | GF | GF |
|  | Parts by mass based on 100 parts by mass of (A) | 48 | 48 | 48 | 48 | 48 | 48 |
| Full Filling Pressure | % | 38 | 35 | 39 | 40 | 38 | 21 |
| Tensile Strength | MPa | 161 | 151 | 147 | 164 | 165 | 126 |
| Tensile Elongation | % | 3.0 | 2.8 | 2.9 | 3.0 | 2.9 | 2.8 |
| Water Absorption | % | 2.0 | 1.5 | 1.9 | 2.5 | 1.2 | 1.2 |
| UL94VB | (Class) | V-0 | V-0 | V-0 | V-0 | V-0 | V-0 |

TABLE 20

|  |  |  | Comparative Example 29 | Comparative Example 30 | Comparative Example 31 | Comparative Example 32 | Comparative Example 33 | Comparative Example 34 | Comparative Example 35 |
|---|---|---|---|---|---|---|---|---|---|
| (A) | (a) Dicarboxylic Acid | Type | CHDA | CHDA | CHDA | — | TPA | CHDA | — |
|  |  | Mol % in (a) | 100 | 40 | 30 | — | 80 | 40 | — |
|  |  | Type | — | ADA | ADA | TPA | C12DA | C12DA | ADA |
|  |  | Mol % in (a) | — | 60 | 70 | 100 | 20 | 60 | 100 |
|  | (b) Diamine | Type | 2MPD | 2MPD | — | 2MPD | 2MPD | 2MPD | — |
|  |  | Mol % in (b) | 40 | 60 | — | 60 | 100 | 100 | — |
|  |  | Type | HMD | HMD | HMD | HMD | — | — | HMD |
|  |  | Mol % in (b) | 60 | 40 | 100 | 40 | — | — | 100 |
|  | Mol % of [(a) + (b)] in [(a) + (b) + (c)] |  | 100 | 100 | 100 | 100 | 100 | 100 | 100 |
|  | (c) Lactam and/or Aminocarboxylic Acid | Type | — | — | — | — | — | — | — |
|  | Mol % of (c) in [(a) + (b) + (c)] |  | — | — | — | — | — | — | — |
| Melting Point Tm2 |  | °C. | 352 | 268 | 290 | 310 | 278 | 266 | 262 |
| Glass Transition Temperature Tg |  | °C. | 145 | 89 | 74 | 135 | 118 | 82 | 55 |
| Relative Viscosity ηr at 25° C. |  |  | 2.1 | 2.5 | 2.3 | 2.1 | 2.2 | 2.5 | 2.6 |
| (E) Phosphinate | Type |  | DEPAl | DEPAl | DEPAl | DEPAl | DEPAl | DEPAl | DEPAl |
|  | Parts by mass based on 100 parts by mass of (A) |  | 42 | 42 | 42 | 42 | 42 | 42 | 42 |
| (G) Flame Retardant Auxiliary | Type |  | Zinc borate | Zinc borate | Zinc borate | Zinc borate | Zinc borate | Zinc borate | Zinc borate |
|  | Parts by mass based on 100 parts by mass of (A) |  | 2.0 | 2.0 | 2.0 | 2.0 | 2.0 | 2.0 | 2.0 |
| (B) Inorganic Reinforcing Material | Type |  | GF | GF | GF | GF | GF | GF | GF |
|  | Parts by mass based on 100 parts by mass of (A) |  | 48 | 48 | 48 | 48 | 48 | 48 | 48 |
| Full Filling Pressure | % |  | Extrusion impossible | 44 | 42 | 54 | 54 | 33 | 33 |
| Tensile Strength | MPa |  |  | 159 | 157 | 154 | 154 | 108 | 142 |
| Tensile Elongation | % |  |  | 2.8 | 2.8 | 2.0 | 2.3 | 3.5 | 3.3 |
| Water Absorption | % |  |  | 3.2 | 3.1 | 1.4 | 1.7 | 1.5 | 3.3 |
| UL94VB | (Class) |  |  | V-0 | V-0 | V-0 | V-0 | V-0 | V-0 |

From the results of Tables 18 to 20, the polyamide compositions of Examples 96 to 118, which comprise a polyamide obtained by polymerization of a specific (a) and (b) and a phosphinate, had especially excellent properties for all of heat resistance, fluidity, toughness, low water absorbance, and rigidity, as well as excellent flame resistance.

In contrast, in Comparative Example 29, which comprises a polyamide obtained by polymerization of less than 50 mol % of 2-methylpentamethylenediamine, the extrusion state was unstable, and a polyamide composition could not be obtained.

Further, for the polyamide compositions of Comparative Examples 30 and 31, which comprise a polyamide obtained by polymerization of less than 50 mol % of an alicyclic dicarboxylic acid, heat resistance and low water absorbance were poor.

In addition, for the polyamide composition of Comparative Example 32, which comprises a polyamide produced by the method disclosed in Patent Document 1, the full filling pressure was large, fluidity was too low, and the molding properties were insufficient. In addition, tensile elongation was small and toughness was also insufficient.

For Comparative Example 35, which comprises PA66, heat resistance and low water absorbance were poor.

Polyamide Composition Comprising (F) Stabilizer

Example 119

A polyamide composition was obtained by blending 0.3 parts by mass of a stabilizer (21) N,N'-hexane-1,6-diylbis[3-(3,5-di-t-butyl-4-hydroxyphenyl propionamide)] based on 100 parts by mass of the polyamide of Example 1, and melt kneading the resultant mixture using a twin-screw extruder (TEM 35, ϕL/D=47.6, set temperature 340° C., screw revolution speed 300 rpm, manufactured by Toshiba Machine Co., Ltd.). Table 21 shows the measurement results of measurements carried out on the obtained polyamide composition based on the above-described measurement methods.

Examples 120 to 139

Examples 120 to 139 were carried out in the same manner as Example 119, except that the respective polyamides of Examples 2 to 21 were used instead of the polyamide of Example 1. Tables 21 and 22 show the measurement results of measurements carried out on the obtained polyamide compositions based on the above-described measurement methods.

Comparative Example 36

An attempt was made to carry out Comparative Example 36 in the same manner as Example 119, except the polyamide of Comparative Example 1 was used instead of the polyamide of Example 1. However, the extrusion state was very unstable, and a polyamide composition could not be obtained.

Comparative Examples 37 to 42

Comparative Examples 37 to 42 were carried out in the same manner as Example 119, except that the respective polyamides of Comparative Examples 2 to 7 were used instead of the polyamide of Example 1. Table 23 shows the measurement results of measurements carried out on the obtained polyamide compositions based on the above-described measurement methods.

Example 140

Example 140 was carried out in the same manner as Example 123, except that a stabilizer (22) bis(2,6-di-t-butyl-4-methylphenyl)pentaerythritol diphosphite was used instead of the stabilizer (21) N,N'-hexane-1,6-diylbis[3-(3,5-di-t-butyl-4-hydroxyphenyl propionamide)]. Table 24 shows the measurement results of measurements carried out on the obtained polyamide composition based on the above-described measurement methods.

Example 141

Example 141 was carried out in the same manner as Example 123, except that a stabilizer (23) bis(2,2,6,6-tetramethyl-4-piperidyl)-sebacate was used instead of the stabilizer (21) N,N'-hexane-1,6-diylbis[3-(3,5-di-t-butyl-4-hydroxyphenyl propionamide)]. Table 24 shows the measurement results of measurements carried out on the obtained polyamide composition based on the above-described measurement methods.

Example 142

Example 142 was carried out in the same manner as Example 123, except that a stabilizer (24) 2-(2'-hydroxy-4'-hexyloxyphenyl)-4,6-diphenyl-1,3,5-triazine was used instead of the stabilizer (21) N,N'-hexane-1,6-diylbis[3-(3,5-di-t-butyl-4-hydroxyphenyl propionamide)]. Table 24 shows the measurement results of measurements carried out on the obtained polyamide composition based on the above-described measurement methods.

Example 143

Example 140 was carried out in the same manner as Example 123, except that 0.1 parts by mass of a stabilizer (25) sodium hypophosphite was used instead of the stabilizer (21) N,N'-hexane-1,6-diylbis[3-(3,5-di-t-butyl-4-hydroxyphenyl propionamide)]. Table 24 shows the measurement results of measurements carried out on the obtained polyamide composition based on the above-described measurement methods.

Example 144

Example 144 was carried out in the same manner as Example 123, except that 0.5 parts by mass of the stabilizer (21) N,N'-hexane-1,6-diylbis[3-(3,5-di-t-butyl-4-hydroxyphenyl propionamide)] was used based on 100 parts by mass of the polyamide of Example 5. Table 24 shows the measurement results of measurements carried out on the obtained polyamide composition based on the above-described measurement methods.

Example 145

Example 145 was carried out in the same manner as Example 123, except that 3.0 parts by mass of the stabilizer (21) N,N'-hexane-1,6-diylbis[3-(3,5-di-t-butyl-4-hydroxyphenyl propionamide)] was used based on 100 parts by mass of the polyamide of Example 5. Table 24 shows the measurement results of measurements carried out on the obtained polyamide compositions based on the above-described measurement methods.

Table 24 also shows the measurement results of measurements carried out on the obtained polyamide of Example 5 based on the above-described measurement methods.

Example 146

A polyamide composition was obtained by blending 0.3 parts by mass of the stabilizer (21) N,N'-hexane-1,6-diylbis [3-(3,5-di-t-butyl-4-hydroxyphenyl propionamide)] and 0.3 parts by mass of the stabilizer (22) bis(2,6-di-t-butyl-4-methylphenyl)pentaerythritol diphosphite based on 100 parts by mass of the polyamide of Example 5, and melt kneading the resultant mixture using a twin-screw extruder (TEM 35, ϕL/D=47.6, set temperature 340° C., screw revolution speed 300 rpm, manufactured by Toshiba Machine Co., Ltd.). Table 24 shows the measurement results of measurements carried out on the obtained polyamide composition based on the above-described measurement methods.

Example 147

A polyamide composition was obtained by blending 0.3 parts by mass of the stabilizer (22) bis(2,6-di-t-butyl-4-methylphenyl)pentaerythritol diphosphite and 0.3 parts by mass of the stabilizer (24) 2-(2'-hydroxy-4'-hexyloxyphenyl)-4,6-diphenyl-1,3,5-triazine based on 100 parts by mass of the polyamide of Example 5, and melt kneading the resultant mixture using a twin-screw extruder (TEM 35, φL/D=47.6, set temperature 340° C., screw revolution speed 300 rpm, manufactured by Toshiba Machine Co., Ltd.). Table 24 shows the measurement results of measurements carried out on the obtained polyamide composition based on the above-described measurement methods.

Example 148

A polyamide composition was obtained by blending 0.3 parts by mass of the stabilizer (21) N,N'-hexane-1,6-diylbis[3-(3,5-di-t-butyl-4-hydroxyphenyl propionamide)], 0.3 parts by mass of the stabilizer (22) bis(2,6-di-t-butyl-4-methylphenyl)pentaerythritol diphosphite, and 0.3 parts by mass of the stabilizer (23) bis(2,2,6,6-tetramethyl-4-piperidyl)-sebacate based on 100 parts by mass of the polyamide of Example 5, and melt kneading the resultant mixture using a twin-screw extruder (TEM 35, φL/D=47.6, set temperature 340° C., screw revolution speed 300 rpm, manufactured by Toshiba Machine Co., Ltd.). Table 24 shows the measurement results of measurements carried out on the obtained polyamide composition based on the above-described measurement method.

Example 149

A polyamide composition was obtained by blending 0.3 parts by mass of the stabilizer (21) N,N'-hexane-1,6-diylbis[3-(3,5-di-t-butyl-4-hydroxyphenyl propionamide)], 0.3 parts by mass of the stabilizer (22) bis(2,6-di-t-butyl-4-methylphenyl)pentaerythritol diphosphite, and 0.3 parts by mass of the stabilizer (24) 2-(2'-hydroxy-4'-hexyloxyphenyl)-4,6-diphenyl-1,3,5-triazine based on 100 parts by mass of the polyamide of Example 5, and melt kneading the resultant mixture using a twin-screw extruder (TEM 35, φL/D=47.6, set temperature 340° C., screw revolution speed 300 rpm, manufactured by Toshiba Machine Co., Ltd.). Table 24 shows the measurement results of measurements carried out on the obtained polyamide composition based on the above-described measurement method.

TABLE 21

| | | | Example 119 | Example 120 | Example 121 | Example 122 | Example 123 |
|---|---|---|---|---|---|---|---|
| (A) | (a) Dicarboxylic Acid | Type | CHDA | CHDA | CHDA | CHDA | CHDA |
| | | Mol % in (a) | 100 | 100 | 100 | 100 | 100 |
| | | Type | — | — | — | — | — |
| | | Mol % in (a) | — | — | — | — | — |
| | (b) Diamine | Type | 2MPD | 2MPD | 2MPD | 2MPD | 2MPD |
| | | Mol % in (b) | 100 | 90 | 80 | 70 | 60 |
| | | Type | — | HMD | HMD | HMD | HMD |
| | | Mol % in (b) | — | 10 | 20 | 30 | 40 |
| | Mol % of [(a) + (b)] in [(a) + (b) + (c)] | | 100 | 100 | 100 | 100 | 100 |
| | (c) Lactam and/or Aminocarboxylic Acid | Type | — | — | — | — | — |
| | Mol % of (c) in [(a) + (b) + (c)] | | — | — | — | — | — |
| | Melting Point Tm2 | ° C. | 327 | 325 | 323 | 327 | 319 |
| | Glass Transition Temperature Tg | ° C. | 143 | 149 | 150 | 146 | 146 |
| | Relative Viscosity ηr at 25° C. | | 2.1 | 2.0 | 2.1 | 2.2 | 2.2 |
| (F) | Stabilizer | Type | Stabilizer (21) | Stabilizer (21) | Stabilizer (21) | Stabilizer (21) | Stabilizer (21) |
| | | Parts by mass based on 100 parts by mass of (A) | 0.3 | 0.3 | 0.3 | 0.3 | 0.3 |
| | Melt Shear Viscosity ηs | Pa · s | 71 | 50 | 55 | 58 | 67 |
| | Tensile Strength | MPa | 101 | 95 | 95 | 94 | 93 |
| | Tensile Elongation | % | 7 | 7 | 7 | 7 | 6 |
| | Water Absorption | % | 2.7 | 2.9 | 2.8 | 2.5 | 2.3 |
| | Color Tone Change Δb | | 4 | 5 | 5 | 4 | 4 |
| | Color Difference ΔE | | 2 | 3 | 2 | 3 | 3 |

| | | | Example 124 | Example 125 | Example 126 | Example 127 | Example 128 |
|---|---|---|---|---|---|---|---|
| (A) | (a) Dicarboxylic Acid | Type | CHDA | CHDA | CHDA | CHDA | CHDA |
| | | Mol % in (a) | 100 | 80 | 50 | 80 | 100 |
| | | Type | — | ADA | ADA | TPA | — |
| | | Mol % in (a) | — | 20 | 50 | 20 | — |
| | (b) Diamine | Type | 2MPD | 2MPD | 2MPD | 2MPD | 2MPD |
| | | Mol % in (b) | 50 | 60 | 60 | 60 | 100 |
| | | Type | HMD | HMD | HMD | HMD | — |
| | | Mol % in (b) | 50 | 40 | 40 | 40 | — |
| | Mol % of [(a) + (b)] in [(a) + (b) + (c)] | | 100 | 100 | 100 | 100 | 93.7 |

TABLE 21-continued

|  |  |  |  |  |  |  |  |
|---|---|---|---|---|---|---|---|
| (c) Lactam and/or Aminocarboxylic Acid | Type |  | — | — | — | — | CPL |
|  | Mol % of (c) in [(a) + (b) + (c)] |  | — | — | — | — | 6.3 |
| Melting Point Tm2 | ° C. |  | 330 | 290 | 275 | 308 | 306 |
| Glass Transition Temperature Tg | ° C. |  | 145 | 120 | 100 | 142 | 143 |
| Relative Viscosity ηr at 25° C. |  |  | 2.2 | 2.5 | 2.5 | 2.2 | 2.0 |
| (F) Stabilizer | Type |  | Stabilizer (21) | Stabilizer (21) | Stabilizer (21) | Stabilizer (21) | Stabilizer (21) |
|  | Parts by mass based on 100 parts by mass of (A) |  | 0.3 | 0.3 | 0.3 | 0.3 | 0.3 |
| Melt Shear Viscosity ηs | Pa · s |  | 73 | 70 | 70 | 85 | 45 |
| Tensile Strength | MPa |  | 92 | 89 | 92 | 91 | 92 |
| Tensile Elongation | % |  | 8 | 12 | 15 | 4 | 10 |
| Water Absorption | % |  | 2.3 | 4.6 | 5.0 | 2.1 | 3.5 |
| Color Tone Change Δb |  |  | 5 | 5 | 5 | 5 | 5 |
| Color Difference ΔE |  |  | 3 | 3 | 3 | 3 | 3 |

TABLE 22

|  |  |  | Example 129 | Example 130 | Example 131 | Example 132 | Example 133 | Example 134 |
|---|---|---|---|---|---|---|---|---|
| (A) | (a) Dicarboxylic Acid | Type | CHDA | CHDA | CHDA | CHDA | CHDA | CHDA |
|  |  | Mol % in (a) | 80 | 80 | 80 | 80 | 80 | 80 |
|  |  | Type | ADA | C8DA | C9DA | C10DA | C12DA | C14DA |
|  |  | Mol % in (a) | 20 | 20 | 20 | 20 | 20 | 20 |
|  | (b) Diamine | Type | 2MPD | 2MPD | 2MPD | 2MPD | 2MPD | 2MPD |
|  |  | Mol % in (b) | 100 | 100 | 100 | 100 | 100 | 100 |
|  |  | Type |  |  |  |  |  |  |
|  |  | Mol % in (b) |  |  |  |  |  |  |
|  | Mol % of [(a) + (b)] in [(a) + (b) + (c)] |  | 100 | 100 | 100 | 100 | 100 | 100 |
|  | (c) Lactam and/or Aminocarboxylic Acid | Type | — | — | — | — | — | — |
|  | Mol % of (c) in [(a) + (b) + (c)] |  | — | — | — | — | — | — |
| Melting Point Tm2 | ° C. |  | 295 | 292 | 290 | 288 | 286 | 279 |
| Glass Transition Temperature Tg | ° C. |  | 125 | 123 | 121 | 120 | 119 | 115 |
| Relative Viscosity ηr at 25° C. |  |  | 2.1 | 2.2 | 2.2 | 2.2 | 2.1 | 2.2 |
| (F) Stabilizer | Type |  | Stabilizer (21) | Stabilizer (21) | Stabilizer (21) | Stabilizer (21) | Stabilizer (21) | Stabilizer (21) |
|  | Parts by mass based on 100 parts by mass of (A) |  | 0.3 | 0.3 | 0.3 | 0.3 | 0.3 | 0.3 |
| Melt Shear Viscosity ηs | Pa · s |  | 76 | 73 | 71 | 66 | 53 | 50 |
| Tensile Strength | MPa |  | 97 | 96 | 94 | 92 | 90 | 87 |
| Tensile Elongation | % |  | 7 | 12 | 15 | 23 | 27 | 29 |
| Water Absorption | % |  | 3.5 | 3.0 | 3.0 | 2.9 | 2.8 | 2.6 |
| Color Tone Change Δb |  |  | 5 | 5 | 5 | 4 | 5 | 5 |
| Color Difference ΔE |  |  | 3 | 3 | 3 | 3 | 3 | 3 |

|  |  |  | Example 135 | Example 136 | Example 137 | Example 138 | Example 139 |
|---|---|---|---|---|---|---|---|
| (A) | (a) Dicarboxylic Acid | Type | CHDA | CHDA | CHDA | CHDA | CHDA |
|  |  | Mol % in (a) | 80 | 60 | 60 | 60 | 50 |
|  |  | Type | C16DA | ADA | ADA | ADA | ADA |
|  |  | Mol % in (a) | 20 | 40 | 40 | 40 | 50 |
|  | (b) Diamine | Type | 2MPD | 2MOD | 2MOD | TMHD | 2MPD |
|  |  | Mol % in (b) | 100 | 50 | 50 | 50 | 50 |
|  |  | Type |  | HMD | HMD | HMD | HMD |
|  |  | Mol % in (b) |  | 50 | 50 | 50 | 50 |
|  | Mol % of [(a) + (b)] in [(a) + (b) + (c)] |  | 100 | 100 | 100 | 100 | 100 |
|  | (c) Lactam and/or Aminocarboxylic Acid | Type | — | — | — | — | — |
|  | Mol % of (c) in [(a) + (b) + (c)] |  | — | — | — | — | — |
| Melting Point Tm2 | ° C. |  | 276 | 275 | 289 | 278 | 270 |
| Glass Transition Temperature Tg | ° C. |  | 110 | 113 | 100 | 102 | 103 |

TABLE 22-continued

|  |  |  |  |  |  |  |
|---|---|---|---|---|---|---|
| Relative Viscosity ηr at 25° C. |  | 2.2 | 2.4 | 2.0 | 2.2 | 2.3 |
| (F) Stabilizer | Type | Stabilizer (21) | Stabilizer (21) | Stabilizer (21) | Stabilizer (21) | Stabilizer (21) |
|  | Parts by mass based on 100 parts by mass of (A) | 0.3 | 0.3 | 0.3 | 0.3 | 0.3 |
| Melt Shear Viscosity ηs | Pa·s | 66 | 61 | 55 | 63 | 68 |
| Tensile Strength | MPa | 91 | 91 | 85 | 83 | 93 |
| Tensile Elongation | % | 25 | 12 | 6 | 7 | 11 |
| Water Absorption | % | 2.8 | 3.9 | 2.8 | 3.7 | 4.8 |
| Color Tone Change Δb |  | 5 | 5 | 4 | 5 | 5 |
| Color Difference ΔE |  | 2 | 2 | 2 | 3 | 3 |

TABLE 23

|  |  |  | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| (A) | (a) Dicarboxylic Acid | Type | CHDA | CHDA | CHDA | — | TPA | CHDA | — |
|  |  | Mol % in (a) | 100 | 40 | 30 | — | 80 | 40 | — |
|  |  | Type | — | ADA | ADA | TPA | C12DA | C12DA | ADA |
|  |  | Mol % in (a) | — | 60 | 70 | 100 | 20 | 60 | 100 |
|  | (b) Diamine | Type | 2MPD | 2MPD | — | 2MPD | 2MPD | 2MPD | — |
|  |  | Mol % in (b) | 40 | 60 | — | 60 | 100 | 100 | — |
|  |  | Type | HMD | HMD | HMD | HMD | — | — | HMD |
|  |  | Mol % in (b) | 60 | 40 | 100 | 40 | — | — | 100 |
|  | Mol % of [(a) + (b)] in [(a) + (b) + (c)] |  | 100 | 100 | 100 | 100 | 100 | 100 | 100 |
|  | (c) Lactam and/or Aminocarboxylic Acid | Type | — | — | — | — | — | — | — |
|  | Mol % of (c) in [(a) + (b) + (c)] |  | — | — | — | — | — | — | — |
| Melting Point Tm2 | ° C. |  | 352 | 268 | 290 | 310 | 278 | 266 | 262 |
| Glass Transition Temperature Tg | ° C. |  | 145 | 89 | 74 | 135 | 118 | 82 | 55 |
| Relative Viscosity ηr at 25° C. |  |  | 2.1 | 2.5 | 2.3 | 2.1 | 2.2 | 2.5 | 2.6 |
| (F) Stabilizer | Type |  | Stabilizer (21) | Stabilizer (21) | Stabilizer (21) | Stabilizer (21) | Stabilizer (21) | Stabilizer (21) | Stabilizer (21) |
|  | Parts by mass based on 100 parts by mass of (A) |  | 0.3 | 0.3 | 0.3 | 0.3 | 0.3 | 0.3 | 0.3 |
| Melt Shear Viscosity ηs | Pa·s |  | Not measurable | 81 | 72 | 149 | 146 | 66 | 71 |
| Tensile Strength | MPa |  | Extrusion impossible | 91 | 90 | 86 | 88 | 62 | 80 |
| Tensile Elongation | % |  |  | 8 | 10 | 2 | 4 | 38 | 25 |
| Water Absorption | % |  |  | 6.3 | 6.1 | 2.4 | 2.9 | 2.2 | 6.5 |
| Color Tone Change Δb |  |  |  | 5 | 5 | 5 | 5 | 5 | 5 |
| Color Difference ΔE |  |  |  | 3 | 3 | 3 | 3 | 3 | 3 |

TABLE 24

|  |  |  | Example 5 | Example 140 | Example 141 | Example 142 | Example 143 | Example 144 |
|---|---|---|---|---|---|---|---|---|
| (A) | (a) Dicarboxylic Acid | Type | CHDA | CHDA | CHDA | CHDA | CHDA | CHDA |
|  |  | Mol % in (a) | 100 | 100 | 100 | 100 | 100 | 100 |
|  |  | Type | — | — | — | — | — | — |
|  |  | Mol % in (a) | — | — | — | — | — | — |
|  | (b) Diamine | Type | 2MPD | 2MPD | 2MPD | 2MPD | 2MPD | 2MPD |
|  |  | Mol % in (b) | 60 | 60 | 60 | 60 | 60 | 60 |
|  |  | Type | HMD | HMD | HMD | HMD | HMD | HMD |
|  |  | Mol % in (b) | 40 | 40 | 40 | 40 | 40 | 40 |
|  | Mol % of [(a) + (b)] in [(a) + (b) + (c)] |  | 100 | 100 | 100 | 100 | 100 | 100 |
|  | (c) Lactam and/or Aminocarboxylic Acid | Type | — | — | — | — | — | — |
|  | Mol % of (c) in [(a) + (b) + (c)] |  | — | — | — | — | — | — |
| Melting Point Tm2 | ° C. |  | 319 | 319 | 319 | 319 | 319 | 319 |
| Glass Transition Temperature Tg | ° C. |  | 146 | 146 | 146 | 146 | 146 | 146 |
| Relative Viscosity ηr at 25° C. |  |  | 2.2 | 2.2 | 2.2 | 2.2 | 2.2 | 2.2 |
| (F) Stabilizer | Type |  | — | Stabilizer (22) | Stabilizer (23) | Stabilizer (24) | Stabilizer (25) | Stabilizer (7) |

TABLE 24-continued

|  |  |  |  |  |  |  |  |  |
|---|---|---|---|---|---|---|---|---|
|  |  | Parts by mass based on 100 parts by mass of (A) | — | 0.3 | 0.3 | 0.3 | 0.1 | 0.5 |
|  | Melt Shear Viscosity ηs | Pa·s | 67 | 68 | 65 | 69 | 67 | 66 |
|  | Tensile Strength | MPa | 93 | 92 | 93 | 94 | 93 | 93 |
|  | Tensile Elongation | % | 6 | 6 | 7 | 6 | 7 | 6 |
|  | Water Absorption | % | 2.6 | 2.4 | 2.3 | 2.2 | 2.3 | 2.3 |
|  | Color Tone Change Δb |  | 10 | 5 | 5 | 5 | 5 | 5 |
|  | Color Difference ΔE |  | 11 | 3 | 3 | 3 | 3 | 3 |

|  |  |  | Example 145 | Example 146 | Example 147 | Example 148 | Example 149 |
|---|---|---|---|---|---|---|---|
| (A) | (a) Dicarboxylic Acid | Type | CHDA | CHDA | CHDA | CHDA | CHDA |
|  |  | Mol % in (a) | 100 | 100 | 100 | 100 | 100 |
|  |  | Type | — | — | — | — | — |
|  |  | Mol % in (a) | — | — | — | — | — |
|  | (b) Diamine | Type | 2MPD | 2MPD | 2MPD | 2MPD | 2MPD |
|  |  | Mol % in (b) | 60 | 60 | 60 | 60 | 60 |
|  |  | Type | HMD | HMD | HMD | HMD | HMD |
|  |  | Mol % in (b) | 40 | 40 | 40 | 40 | 40 |
|  | Mol % of [(a) + (b)] in [(a) + (b) + (c)] |  | 100 | 100 | 100 | 100 | 100 |
|  | (c) Lactam and/or Aminocarboxylic Acid | Type | — | — | — | — | — |
|  | Mol % of (c) in [(a) + (b) + (c)] |  | — | — | — | — | — |
|  | Melting Point Tm2 | °C. | 319 | 319 | 319 | 319 | 319 |
|  | Glass Transition Temperature Tg | °C. | 146 | 146 | 146 | 146 | 146 |
|  | Relative Viscosity ηr at 25° C. |  | 2.2 | 2.2 | 2.2 | 2.2 | 2.2 |
| (F) Stabilizer |  | Type | Stabilizer (7) | a) Stabilizer (21) b) Stabilizer (22) | a) Stabilizer (22) b) Stabilizer (24) | a) Stabilizer (21) b) Stabilizer (22) c) Stabilizer (23) | a) Stabilizer (21) b) Stabilizer (22) c) Stabilizer (24) |
|  |  | Parts by mass based on 100 parts by mass of (A) | 3.0 | a) 0.3 b) 0.3 | a) 0.3 b) 0.3 | a) 0.3 b) 0.3 c) 0.3 | a) 0.3 b) 0.3 c) 0.3 |
|  | Melt Shear Viscosity ηs | Pa·s | 67 | 68 | 67 | 66 | 67 |
|  | Tensile Strength | MPa | 94 | 93 | 93 | 94 | 93 |
|  | Tensile Elongation | % | 7 | 6 | 7 | 6 | 6 |
|  | Water Absorption | % | 2.5 | 2.3 | 2.3 | 2.4 | 2.3 |
|  | Color Tone Change Δb |  | 5 | 4 | 4 | 4 | 4 |
|  | Color Difference ΔE |  | 2 | 3 | 3 | 2 | 2 |

From the results of Tables 21 to 24, the polyamide compositions of Examples 117 to 149, which comprise a polyamide obtained by polymerization of a specific (a) dicarboxylic acid and (b) diamine, and a stabilizer, had especially excellent properties for all of heat resistance, fluidity, toughness, low water absorbance, and rigidity, as well as excellent resistance to heat discoloration and weatherability.

In contrast, in Comparative Example 36, which comprises a polyamide obtained by polymerization of less than 50 mol % of 2-methylpentamethylenediamine, the extrusion state was unstable, and a polyamide composition could not be obtained.

Further, for Comparative Examples 37 and 38, which comprise a polyamide obtained by polymerization of less than 50 mol % of an alicyclic dicarboxylic acid, heat resistance and low water absorbance were poor.

In addition, for Comparative Example 39, which comprises a polyamide produced by the method disclosed in Patent Document 1, the melt shear viscosity was large, fluidity was too low, and the molding properties were insufficient. In addition, tensile elongation was small and toughness was also insufficient.

For Comparative Example 42, which comprises PA66, heat resistance and low water absorbance were poor.

The present application is based on a Japanese patent application filed on Mar. 12, 2008 (Japanese Patent Application No. 2008-62811), a Japanese patent application filed on Mar. 24, 2008 (Japanese Patent Application No. 2008-75926), and a Japanese patent application filed on Oct. 10, 2008 (Japanese Patent Application No. 2008-264182), whose contents are hereby incorporated by reference herein.

INDUSTRIAL APPLICABILITY

The present invention can provide a high-melting-point polyamide which has excellent heat resistance, fluidity, toughness, low water absorbance, and rigidity. Further, the polyamide according to the present invention has industrial applicability, and can for example be preferably used as a molding material for various parts, such as in automobiles, electric and electronics, industrial materials, and daily and household articles.

The invention claimed is:
1. A polyamide obtained by polymerizing
    (a) a dicarboxylic acid component comprising at least 70 mol % of 1,4-cyclohexanedicarboxylic acid and at least 0.1 mol % of an aliphatic dicarboxylic acid, and
    (b) a diamine component comprising at least 50 mol % of a diamine having a substituent branched from a main chain,
    wherein the glass transition temperature of the polyamide is higher than 110° C.
2. The polyamide according to claim 1, wherein the aliphatic dicarboxylic acid has 10 or more carbon atoms.

3. The polyamide according to claim 1, wherein the balance of the dicarboxylic acid component is aromatic dicarboxylic acids.

4. The polyamide according to claim 2, wherein the dicarboxylic acid component comprises at least 10 mol % of an aliphatic dicarboxylic acid having 10 or more carbon atoms.

5. The polyamide according to claim 3, wherein the balance of the dicarboxylic acid component is terephthalic acid.

6. The polyamide according to claim 4, wherein the dicarboxylic acid component comprises at least 15 mol % of an aliphatic dicarboxylic acid having 10 or more carbon atoms.

* * * * *